(12) United States Patent
Miyoshi et al.

(10) Patent No.: US 12,434,607 B2
(45) Date of Patent: Oct. 7, 2025

(54) CONVEYANCE SEAT

(71) Applicant: TS TECH CO., LTD., Saitama (JP)

(72) Inventors: Akira Miyoshi, Tochigi (JP);
Munetaka Kowa, Tochigi (JP); Yoichi Tachikawa, Tochigi (JP); Kohei Taguchi, Tochigi (JP); Tomoyuki Kurimoto, Tochigi (JP); Hiroaki Hashizume, Tochigi (JP); Keisuke Mizuno, Tochigi (JP); Hiroyuki Kaku, Tochigi (JP)

(73) Assignee: TS TECH CO., LTD., Saitama (JP)

( * ) Notice: Subject to any disclaimer, the term of this patent is extended or adjusted under 35 U.S.C. 154(b) by 170 days.

(21) Appl. No.: 18/038,463

(22) PCT Filed: Nov. 26, 2021

(86) PCT No.: PCT/JP2021/043508
§ 371 (c)(1),
(2) Date: May 24, 2023

(87) PCT Pub. No.: WO2022/114160
PCT Pub. Date: Jun. 2, 2022

(65) Prior Publication Data
US 2024/0010111 A1   Jan. 11, 2024

Related U.S. Application Data

(60) Provisional application No. 63/118,761, filed on Nov. 27, 2020, provisional application No. 63/157,029, (Continued)

(30) Foreign Application Priority Data

Mar. 24, 2021 (JP) ................................. 2021-049988
Mar. 24, 2021 (JP) ................................. 2021-049989

(51) Int. Cl.
*B60N 2/70* (2006.01)
*B60N 2/00* (2006.01)

(52) U.S. Cl.
CPC ............. *B60N 2/70* (2013.01); *B60N 2/0021* (2023.08); *B60N 2/0033* (2023.08)

(58) Field of Classification Search
CPC ........ B60N 2/70; B60N 2/0021; B60N 2/003; B60N 2/0033
See application file for complete search history.

(56) References Cited

U.S. PATENT DOCUMENTS

2013/0192904 A1* 8/2013 Sprecher ................ B60N 2/002
  177/136
2015/0283923 A1* 10/2015 Kordel .............. B60R 21/01526
  297/452.49

(Continued)

FOREIGN PATENT DOCUMENTS

JP     2006-149585 A    6/2006
JP     2008-212345 A    9/2008

(Continued)

OTHER PUBLICATIONS

International Search Report mailed on Feb. 22, 2022, for the corresponding PCT Application No. PCT/JP2021/043508, with English machine translation.

*Primary Examiner* — Saul Rodriguez
(74) *Attorney, Agent, or Firm* — Michael Best & Friedrich LLP

(57) ABSTRACT

A conveyance seat includes a seat cushion having a urethane pad member, a bead foam molding member harder than the urethane pad member, a skin material, and a seating sensor sensing a seated occupant's seating load, in which the urethane pad member is formed with a first through hole penetrating the urethane pad member in a height direction, the bead foam molding member is formed with a second through hole penetrating the bead foam molding member in the height direction and at least a part of the second through hole is at a position overlapping the first through hole in a (Continued)

top view, the seating sensor includes at least a sensor main body portion and a cable portion energizing the sensor main body portion or transmitting a signal of the sensor main body portion, and the cable portion is inserted through the first through hole and the second through hole.

8 Claims, 58 Drawing Sheets

Related U.S. Application Data filed on Mar. 5, 2021, provisional application No. 63/162,724, filed on Mar. 18, 2021.

(56) References Cited

U.S. PATENT DOCUMENTS

| | | |
|---|---|---|
| 2015/0291072 A1 | 10/2015 | Ito |
| 2020/0039382 A1* | 2/2020 | Ozawa ............... A61B 5/02141 |
| 2020/0163460 A1 | 5/2020 | Miyawaki et al. |
| 2022/0024352 A1* | 1/2022 | Kaku ................... B60N 2/0021 |

FOREIGN PATENT DOCUMENTS

| | | | | |
|---|---|---|---|---|
| JP | 2014-100943 A | 6/2014 | | |
| JP | 2018-076044 A | 5/2018 | | |
| JP | 2020-082992 A | 6/2020 | | |
| WO | WO-2016158758 A1 * | 10/2016 | ............. | B60N 2/002 |
| WO | WO-2020049848 A1 * | 3/2020 | ............. | B60N 2/002 |

* cited by examiner

FRONT  DIRECTLY  BACK
       BELOW

CONVEYANCE SEAT

CROSS-REFERENCE TO RELATED APPLICATIONS

This application is a National Entry application of PCT Application Serial Number PCT/JP2021/043508, filed on Nov. 26, 2021. Further, this application claims priority from U.S. Provisional Application No. 63/118,761, filed on Nov. 27, 2020, U.S. Provisional Application No. 63/157,029, filed on Mar. 5, 2021, U.S. Provisional Application No. 63/162,724, filed on Mar. 18, 2021, Japanese Patent Application Number 2021-049988, filed on Mar. 24, 2021, and Japanese Patent Application Number 2021-049989, filed on Mar. 24, 2021, the entire contents of which are hereby incorporated by reference into this application.

TECHNICAL FIELD

The present invention relates to a conveyance seat, and more particularly, to a conveyance seat including a seat cushion having a bead foam molding member.

BACKGROUND ART

As for the structure that is disclosed in Patent Literature 1, a surface layer pad as a resin foam-molded body and a bead foam molding member (expand polypropylene (EPP)) on the side opposite to the seating surface of the surface layer pad are integrated in layers as a conveyance seat cushion material, the bead foam molding member is provided with a substantially tubular lightening hole extending in the direction of the seating surface from the surface on the side opposite to the seating surface, and the bottom surface portion of the lightening hole on the seating surface side is formed in a substantially hemispherical shape. In addition, according to the disclosure of Patent Literature 1, a through hole penetrating the bead foam molding member in the up to down direction is formed behind the bottomed and substantially tubular lightening hole.

CITATION LIST

Patent Literature

PATENT LITERATURE 1: JP 2020-082992 A

SUMMARY OF INVENTION

Technical Problem

By the way, weight reduction is the greatest advantage of using a bead foam molding member in a vehicle. Therefore, there has been a demand for a bead foam molding member for a vehicle seat that is lighter in weight.

In the structure of the cushion material disclosed in Patent Literature 1, the bottomed and substantially tubular lightening hole is formed in a substantially hemispherical shape in the bead foam molding member. By forming the bottomed and substantially tubular lightening hole in the bead foam molding member, stress concentration applied to the bead foam molding member is mitigated when a seated occupant is seated on the cushion material, and damage such as cracking is unlikely to occur. However, by providing such a recess, the rigidity of the bead foam molding member itself may increase and a seated occupant's seating comfort may be impaired. In addition, the amount of sinking of the cushion material as a whole is small simply by forming a through hole, and thus improving a seated occupant's seating comfort is limited. Therefore, there has been a demand for a technique with which weight reduction can be achieved along with seating comfort improvement for seated occupants.

In addition, there has been a demand for a structure in which it is possible to sense seating at a part efficient for receiving a seated occupant's load in a seat cushion including a bead foam molding member.

Solution to Problem

The above problems can be solved by means of a conveyance seat of the present invention including a seat cushion having a urethane pad member, a bead foam molding member (EPP) harder than the urethane pad member, a skin material, and a seating sensor sensing a seated occupant's seating load, in which the urethane pad member is formed with a first through hole penetrating the urethane pad member in a height direction, the bead foam molding member is formed with a second through hole penetrating the bead foam molding member in the height direction and at least a part of the second through hole is at a position overlapping the first through hole in a top view, the seating sensor includes at least a sensor main body portion and a cable portion energizing the sensor main body portion or transmitting a signal of the sensor main body portion, and the cable portion is inserted through the first through hole and the second through hole.

The urethane pad member softer than the bead foam molding member receives the seated occupant's load, and thus seating comfort is improved. In addition, the seating sensor is disposed at a position overlapping the second through hole formed in the bead foam molding member and is disposed at the urethane pad member softer than the bead foam molding member. As a result, the seated occupant's load is received, and thus seating can be sensed at a part efficient for receiving a seating load.

In addition, in the conveyance seat described above, it is preferable that the first through hole and the second through hole are tapered and increase in width downward from above, and it is preferable that a lower end of the first through hole and an upper end of the second through hole are formed to be substantially equal in width to each other.

By the first through hole and the second through hole being tapered and the lower end of the first through hole and the upper end of the second through hole having the same width, the cable portion can be easily inserted without being caught in inserting the cable portion through the second through hole from the first through hole side.

In addition, in the conveyance seat described above, it is preferable that a lower surface portion of the urethane pad member and an upper surface portion of the bead foam molding member form a gap between the urethane pad member and the bead foam molding member, and it is preferable that the first through hole and the second through hole are formed to communicate with the gap.

Seating comfort is improved by providing the gap. In addition, when the first through hole and the second through hole communicate with each other, positional deviation attributable to manufacturing errors of the first through hole and the second through hole can be compensated for such that communication is possible by the gap.

In addition, in the conveyance seat described above, it is preferable that the second through hole is formed to be at least two in number, and it is preferable that a through hole that is one of the second through holes and through which the cable portion is inserted is disposed behind a through hole that is one of the second through holes and through which the cable portion is not inserted.

By inserting the cable portion through the through hole disposed behind, the cable portion can be easily taken out during manufacturing.

In addition, in the conveyance seat described above, it is preferable that the second through hole has an opening portion formed on an upper surface of the bead foam molding member and another opening portion formed on a rear surface of the bead foam molding member.

By forming the opening portion on the rear surface of the bead foam molding member, the cable portion can be easily taken out during manufacturing.

In addition, in the conveyance seat described above, it is preferable that on a floor where the conveyance seat is placeable, the conveyance seat is disposed in front of a protrusion formed on an upper surface of the floor, and it is preferable that the second through hole is disposed above the protrusion.

By disposing the second through hole above the protrusion of the floor, interference with the protrusion formed on the floor can be suppressed.

In addition, in the conveyance seat described above, it is preferable that on a floor where the conveyance seat is placeable, the conveyance seat is disposed in front of a protrusion formed on an upper surface of the floor, it is preferable that the second through hole is disposed at a position overlapping the protrusion in a front view, and it is preferable that an end portion of the cable portion is accommodated in the protrusion.

The cable portion can be connected to a power source on the vehicle body side in the protrusion formed on the floor with an easy configuration.

Advantageous Effects of Invention

According to the present invention, the urethane pad member softer than the bead foam molding member receives the seated occupant's load, and thus seating comfort is improved. In addition, the seating sensor is disposed at a position overlapping the second through hole formed in the bead foam molding member and is disposed at the urethane pad member softer than the bead foam molding member. As a result, the seated occupant's load is received, and thus seating can be sensed at a part efficient for receiving a seating load.

In addition, by the first through hole and the second through hole being tapered and the lower end of the first through hole and the upper end of the second through hole having the same width, the cable portion can be easily inserted without being caught in inserting the cable portion through the second through hole from the first through hole side.

In addition, seating comfort is further improved by providing the gap. In addition, when the first through hole and the second through hole communicate with each other, positional deviation attributable to manufacturing errors of the first through hole and the second through hole can be compensated for such that communication is possible by the gap.

In addition, by inserting the cable portion through the through hole disposed behind, the cable portion can be easily taken out during manufacturing.

In addition, by forming the opening portion on the rear surface of the bead foam molding member, the cable portion can be easily taken out during manufacturing.

In addition, by disposing the second through hole above the protrusion of the floor, interference with the protrusion formed on the floor can be suppressed.

In addition, the cable portion can be connected to a power source on the vehicle body side in the protrusion formed on the floor with an easy configuration.

DESCRIPTION OF EMBODIMENTS

First Embodiment

Hereinafter, a conveyance seat according to a first embodiment of the present invention will be described with reference to the drawings. However, the embodiment described below is for easy understanding of the present invention and does not limit the present invention. In other words, the present invention can be modified and improved without departing from the spirit thereof, and it is a matter of course that the present invention includes equivalents thereof.

It should be noted that in the following description, a vehicle seat will be taken as an example of the conveyance seat and configuration examples thereof will be described. However, the present invention is not limited to the vehicle seat mounted in a wheeled ground conveyance such as automobiles and railway vehicles and may be a seat mounted in non-ground conveyances such as aircraft and ships.

In addition, in the following description, "front to back direction" is the front to back direction of the vehicle seat and coincides with the direction of travel of the vehicle that travels. In addition, "seat width direction" is the width direction of the vehicle seat and coincides with the right to left direction seen from an occupant seated in the vehicle seat. In addition, "up to down direction" is the up to down direction of the vehicle seat, which coincides with the vertical direction when the vehicle travels on a horizontal surface.

In addition, in the following description, in a case where various directions are described with "seat" as in "seat width direction" and "seat height direction", the directions are indicated with respect to the vehicle seat. In the case of descriptions with "vehicle" such as "vehicle inner side" and "vehicle outer side", the directions are indicated with respect to the vehicle.

In addition, "outer side of the vehicle" in the seat width direction means the side that is closer to the outside of the body of the vehicle (to make it easier to understand, side close to the nearest door), and "inner side of the vehicle" means the side that is closer to the inside of the body of the vehicle (to make it easier to understand, side away from the nearest door).

In addition, unless otherwise specified, "pivoting" in the following description means pivoting about an axis along the seat width direction.

It should be noted that unless otherwise specified, the shape, position, posture, and so on of each portion of the seat described below are on the assumption that the vehicle seat is in a seated state, which will be described later.

Figure 1:
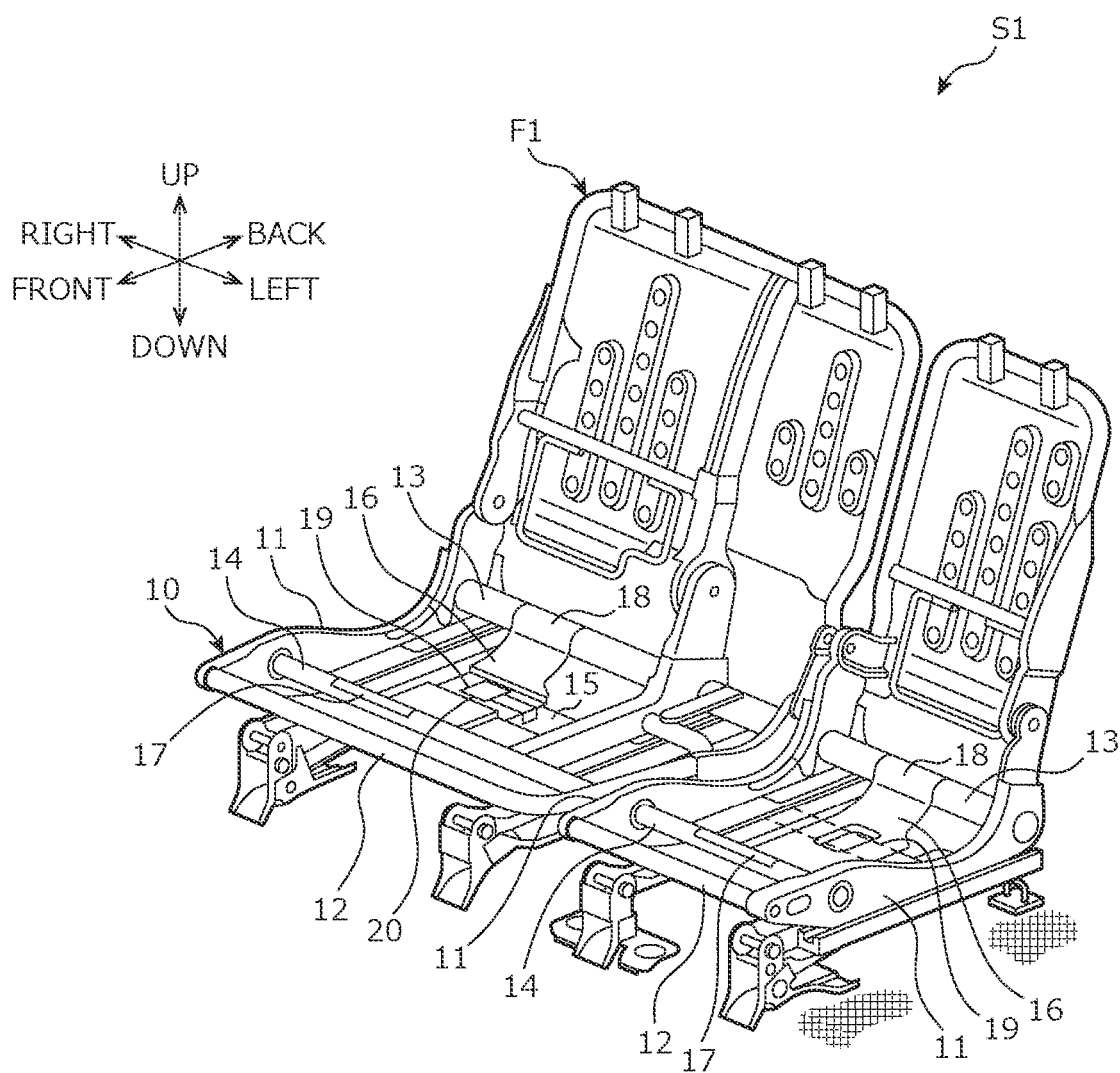
FIG. 1 is a perspective view illustrating a frame of a vehicle seat according to a first embodiment of the present invention.

FIGS. 1 to 4B relate to the first embodiment of the present invention, and FIG. 1 is a perspective view illustrating a frame F1 of a vehicle seat S1. The vehicle seat S1 is an automotive rear seat where three persons can sit. It should be noted that the vehicle seat S1 is not limited to the rear seat. The vehicle seat S1 may be a front seat corresponding to a front seat of a vehicle and can also be used as a second-row middle seat or a third-row rear seat in a vehicle that has three rows of seats in the front to back direction.

The vehicle seat S1 has a seat cushion frame 10 that serves as a seat cushion skeleton. The seat cushion frame 10 is configured from side frames 11 disposed on the right and left, a front connecting frame 12 extending in the right to left direction and connecting the front portions of the right and left side frames 11, and a rear connecting frame 13 extending in the right to left direction and connecting the rear portions of the right and left side frames 11.

In addition, the seat cushion frame 10 includes a submarine prevention member 14 that extends in the right to left direction and is disposed at a position behind the front connecting frame 12 and in front of the rear connecting frame 13 and a reinforcement wire 15 disposed behind the submarine prevention member 14.

In addition, the seat cushion frame 10 is provided with a pressure receiving member 16 that spans the front connecting frame 12 and the rear connecting frame 13 between the right and left side frames 11.

As illustrated in FIG. 1, the pressure receiving member 16 has a front fixed portion 17 with a front end portion fixed to the front connecting frame 12 of the seat cushion frame 10, a rear fixed portion 18 with a rear end portion fixed to the rear connecting frame 13 of the seat cushion frame 10, and a holding portion 19 supported by the reinforcement wire 15.

In addition, the pressure receiving member 16 has a sensor support portion 21 that supports a seating sensor 20 disposed between the front fixed portion 17 and the rear fixed portion 18. The sensor support portion 21 is disposed in front of the reinforcement wire 15.

In addition, a front reinforcement wire 23 that is separate from the reinforcement wire 15 and disposed in front of the sensor support portion 21 is further provided. A reinforcement support portion 22 is the region of the pressure receiving member 16 that is sandwiched between the front reinforcement wire 23 and the reinforcement wire 15 in the front to back direction.

The sensor support portion 21 is disposed at a position overlapping the region of the reinforcement support portion 22 in the front to back direction and the right to left direction.

As illustrated in FIG. 2, the seating sensor 20 is disposed at a position overlapping the region of the reinforcement support portion 22. Therefore, the seating sensor 20 is capable of sensing a seated occupant at a point where the seated occupant can be stably supported.

Figure 2A:
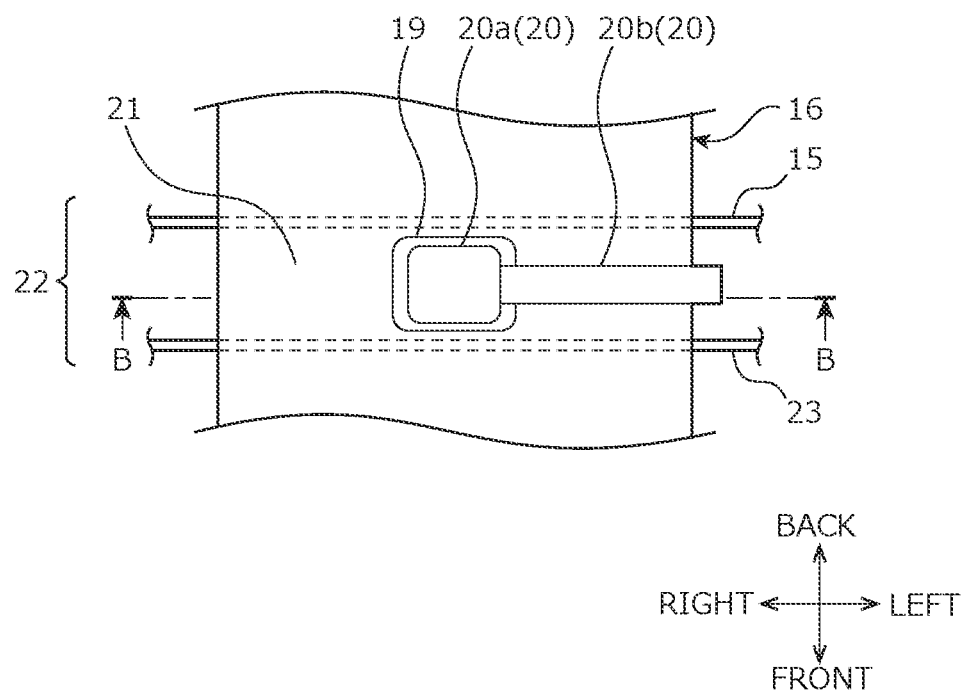
FIG. 2A is a plan view illustrating a pressure receiving member provided with a seating sensor.
Figure 2B:
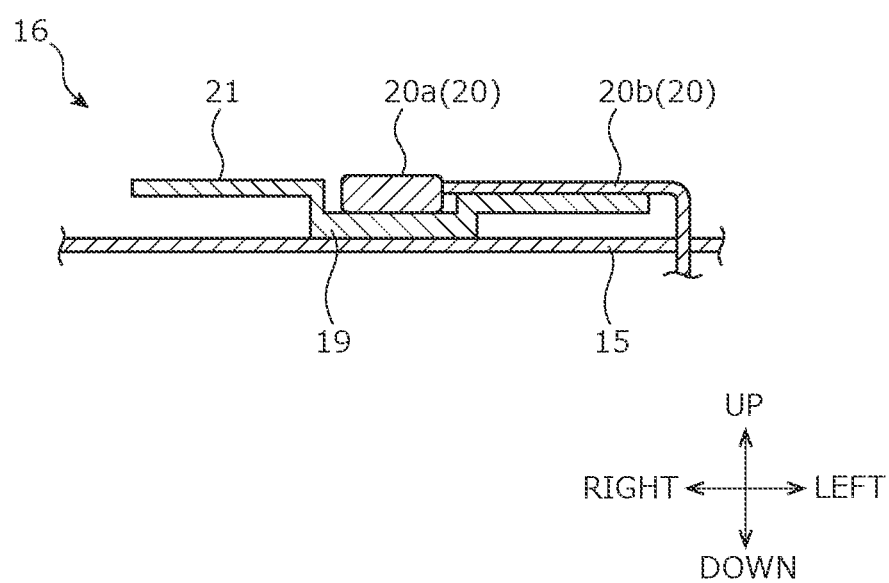
FIG. 2B is a cross-sectional view taken along line B-B of FIG. 2A.

It should be noted that as illustrated in FIGS. 2A and 2B, the seating sensor 20 is configured from a sensor main body portion 20a and a cable portion 20b extending from the sensor main body portion. The cable portion 20b extends to the side portion of the pressure receiving member 16 and is bent downward.

The sensor support portion 21 illustrated in FIG. 2 is disposed in front of the reinforcement wire 15 but may be disposed behind the reinforcement wire 15. In this case, it is preferable that the reinforcement wire is disposed behind the sensor support portion 21.

Figure 3A:
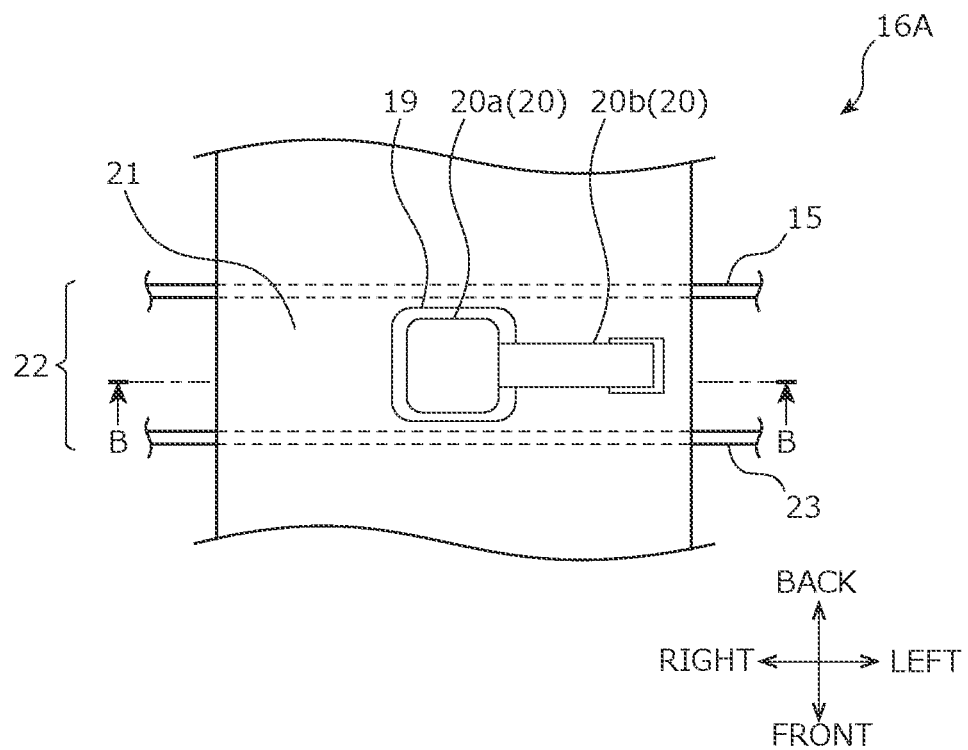
FIG. 3A is a plan view illustrating another example of the pressure receiving member provided with the seating sensor.
Figure 3B:
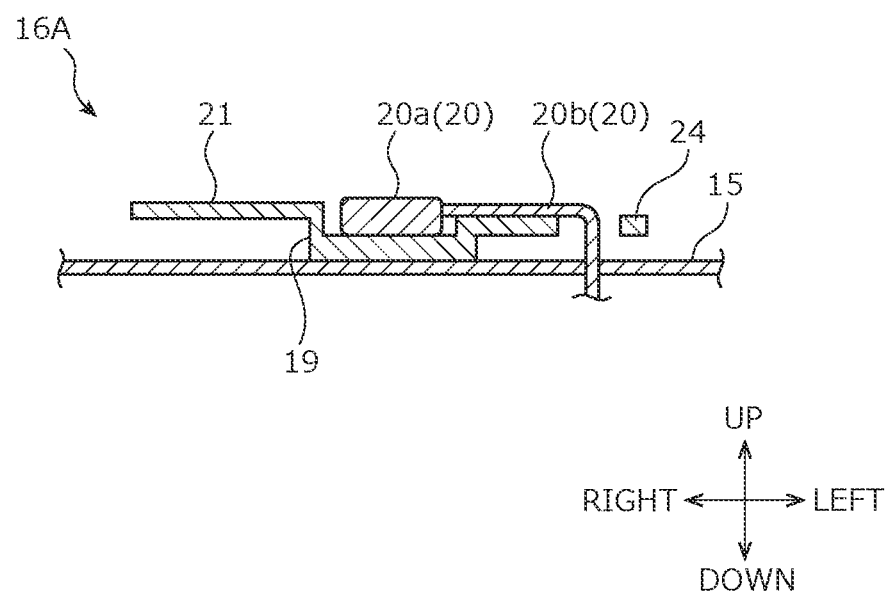
FIG. 3B is a cross-sectional view taken along line B-B of FIG. 3A.

FIGS. 3A and 3B illustrate a pressure receiving member 16A, which is another example. As compared with the pressure receiving member 16 illustrated in FIG. 2A, the pressure receiving member 16A is different in that a through hole 24 through which the cable portion 20b is inserted is formed beside the holding portion 19. The cable portion 20b extends from the sensor main body portion 20a of the seating sensor 20 placed on the holding portion 19. The cable portion 20b extends to the through hole 24, and the cable portion 20b is disposed so as to be inserted through the through hole 24 and extend downward.

Figure 4A:
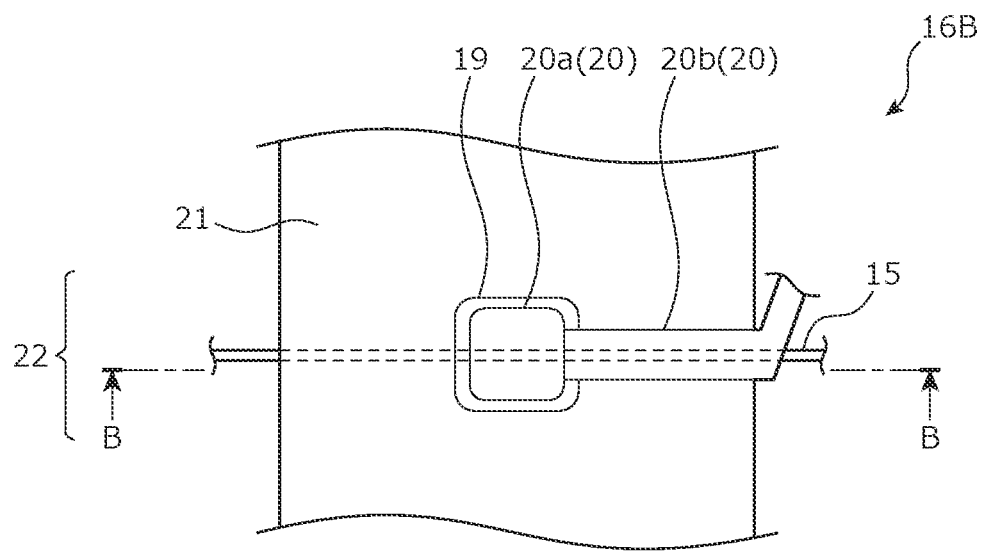
FIG. 4A is a plan view illustrating another example of the pressure receiving member provided with the seating sensor.
Figure 4B:
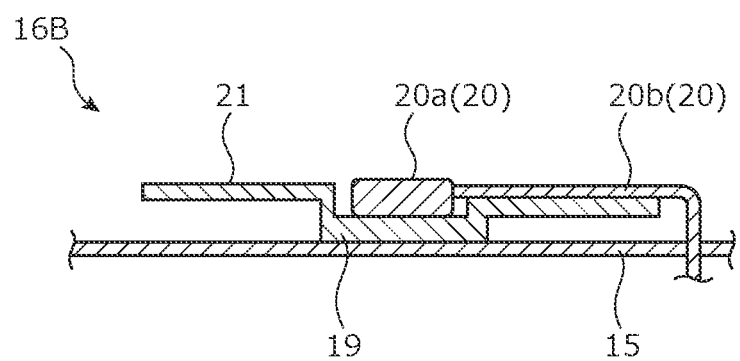
FIG. 4B is a cross-sectional view taken along line B-B of FIG. 4B.

In addition, FIGS. 4A and 4B illustrate a pressure receiving member 16B, which is another example. As compared with the pressure receiving member 16 illustrated in FIG. 2A, the pressure receiving member 16B is different in that the holding portion 19 is directly supported by the reinforcement wire 15. The sensor support portion 21 supporting the seating sensor 20 may be disposed so as to overlap the reinforcement support portion 22 at front and back positions. In this case, the cable portion 20b of the seating sensor 20 may be disposed so as to extend to the end portion of the pressure receiving member 16B along the reinforcement wire 15 and bend downward with the reinforcement wire 15 avoided. The seating sensor 20 is disposed directly above the reinforcement support portion 22, and thus the seating sensor 20 is capable of sensing a seated occupant at a point where the seated occupant can be stably supported.

Second Embodiment

Hereinafter, a vehicle seat according to a second embodiment of the present invention will be described with reference to the drawings. FIGS. 5 to 13 relate to the second embodiment of the present invention.

Figure 5:
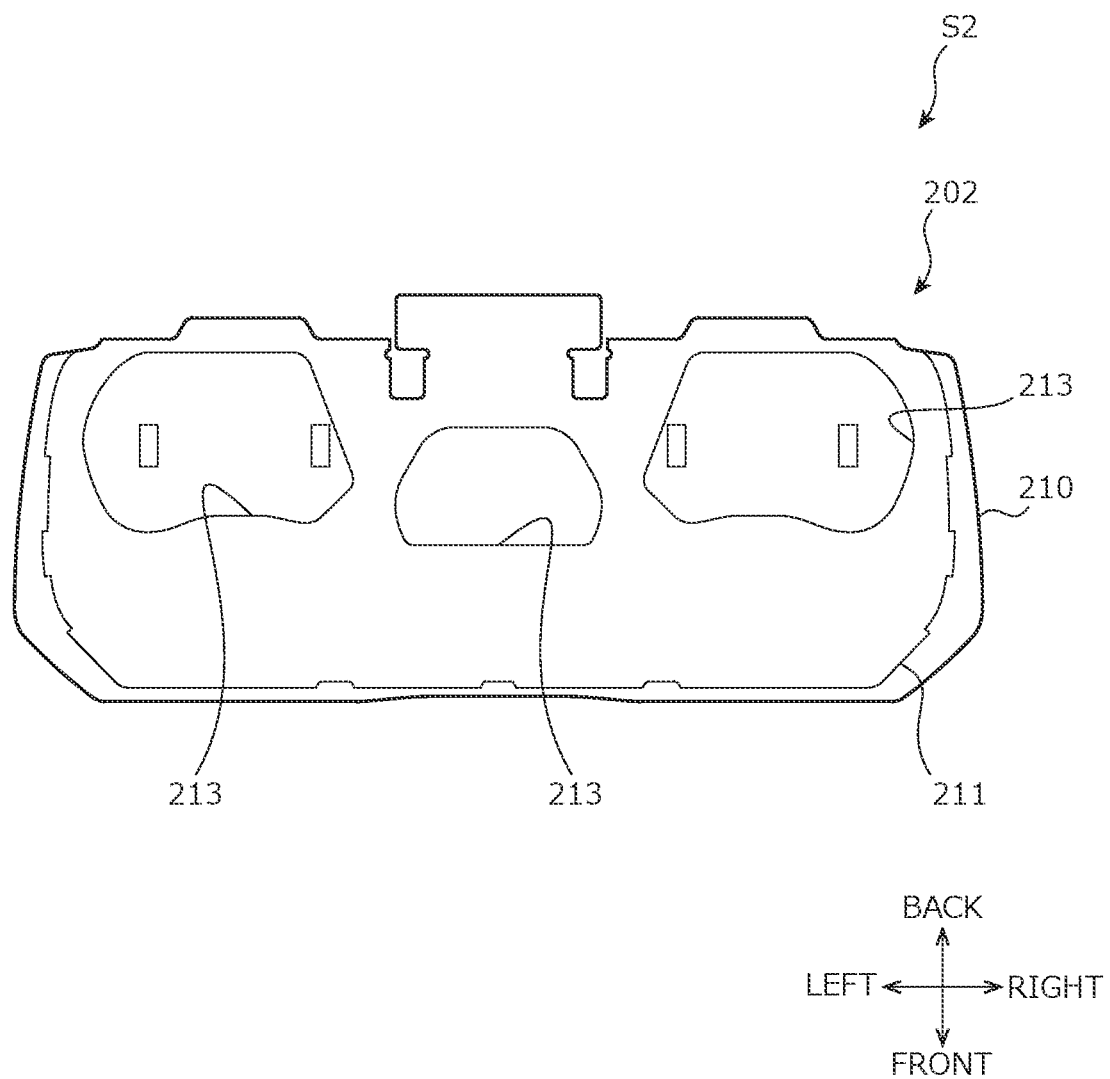
FIG. 5 is a bottom view in which a seat pad of a vehicle seat according to a second embodiment is viewed from below.
Figure 6A:
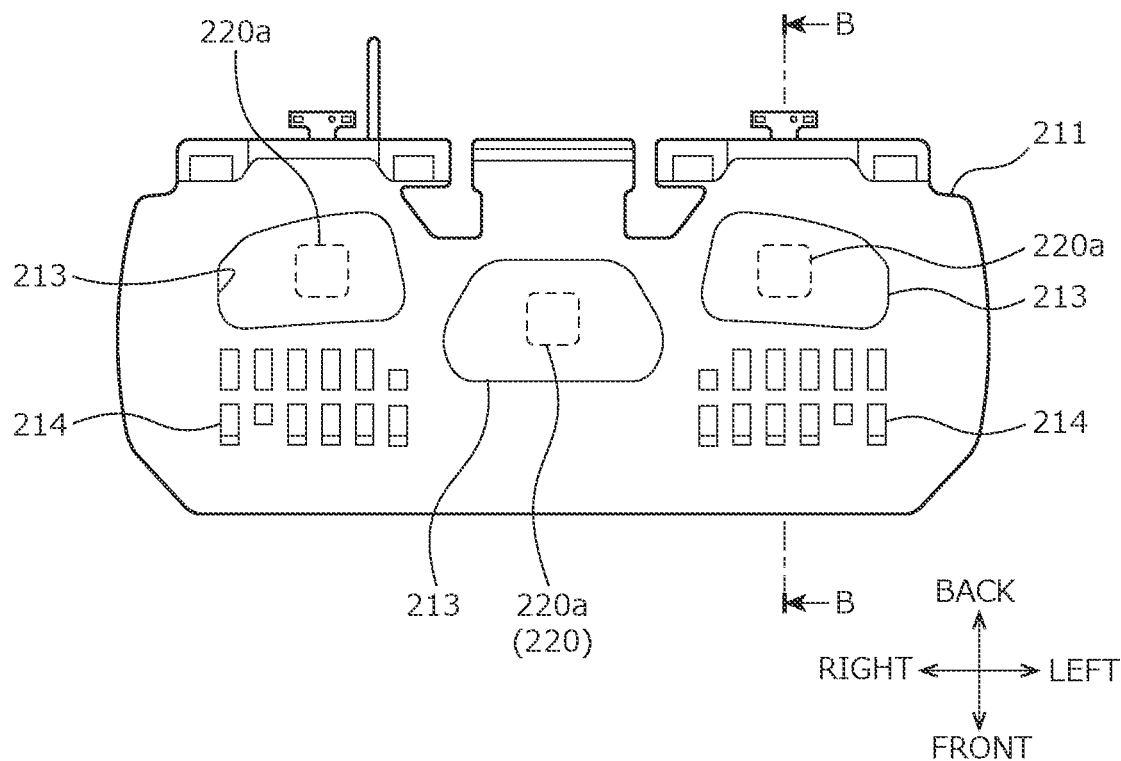
FIG. 6A is a top view illustrating a bead foam molding member that is a first example of the second embodiment and is a diagram illustrating the position of a seating sensor.

FIG. 5 is a bottom view in which a cushion pad 202 is viewed from below a vehicle seat S2. The cushion pad 202 is used for the seat cushion of the vehicle seat S2, which is a first example of the second embodiment. In addition, FIG. 6A is a top view illustrating a bead foam molding member, and FIG. 6B is a cross-sectional view of the seat cushion taken along line B-B of FIG. 6A.

Figure 6B:
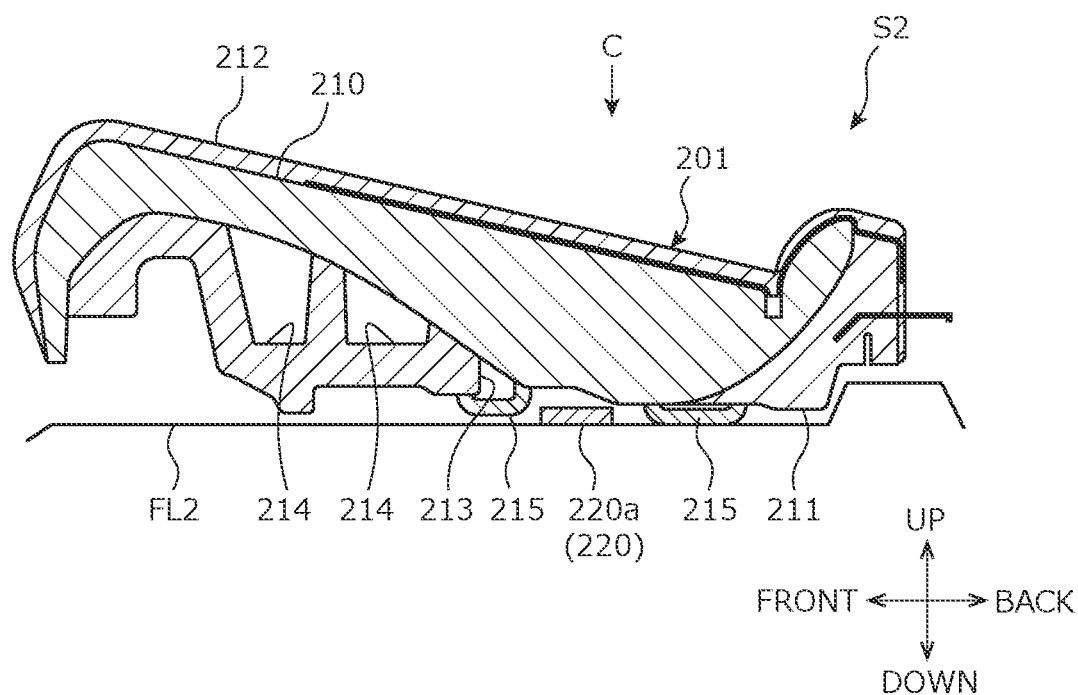
FIG. 6B is a cross-sectional view taken along line B-B of FIG. 6A.

As illustrated in FIGS. 5 and 6B, a seat cushion 201 of the vehicle seat S2 includes the seat cushion 201 configured from a urethane pad member 210, a bead foam molding member 211 (EPP) harder than the urethane pad member 210, and a skin material 212 covering the urethane pad member 210. As illustrated in FIGS. 6A and 6B, a seating sensor 220 sensing the seating load of a seated occupant via the seat cushion 201 is provided at a position overlapping the seat cushion 201 in a top view of the vehicle seat S2 (arrow view C in FIG. 6B).

A through hole 213 is formed to penetrate the bead foam molding member 211 in the height direction, and the upper part of the through hole 213, that is, the upper opening portion is covered with the urethane pad member 210. In addition, the seating sensor 220 is disposed at a position overlapping the through hole 213 in a top view.

In addition, the seating sensor 220 is fixed to the upper surface of a floor FL2 as illustrated in FIG. 6B.

By disposing the seating sensor 220 at a position overlapping the through hole 213 formed in the bead foam molding member 211, the urethane pad member 210 softer than the bead foam molding member 211 receives the load of a seated occupant, and thus seating can be sensed at a part that is efficient for receiving a seating load.

Figure 7:
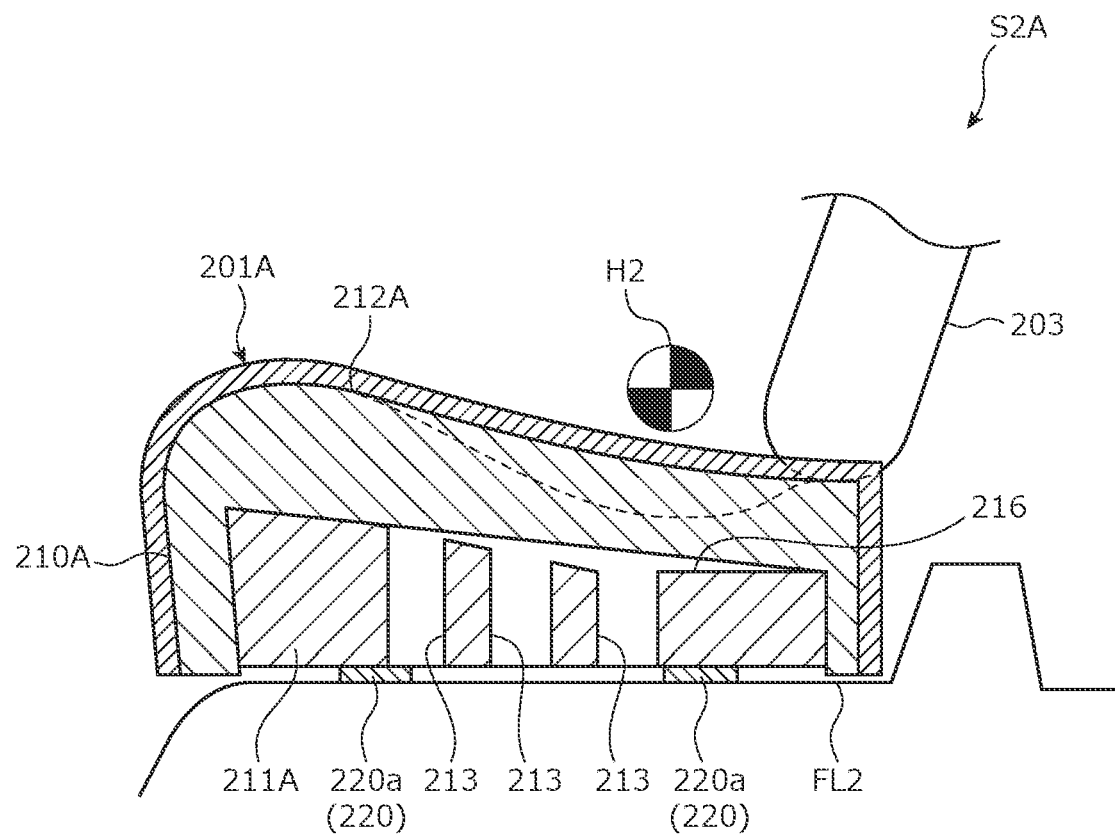
FIG. 7 is an explanatory diagram illustrating the positional relationship between a through hole formed in the bead foam molding member and the seating sensor.
Figure 8A:
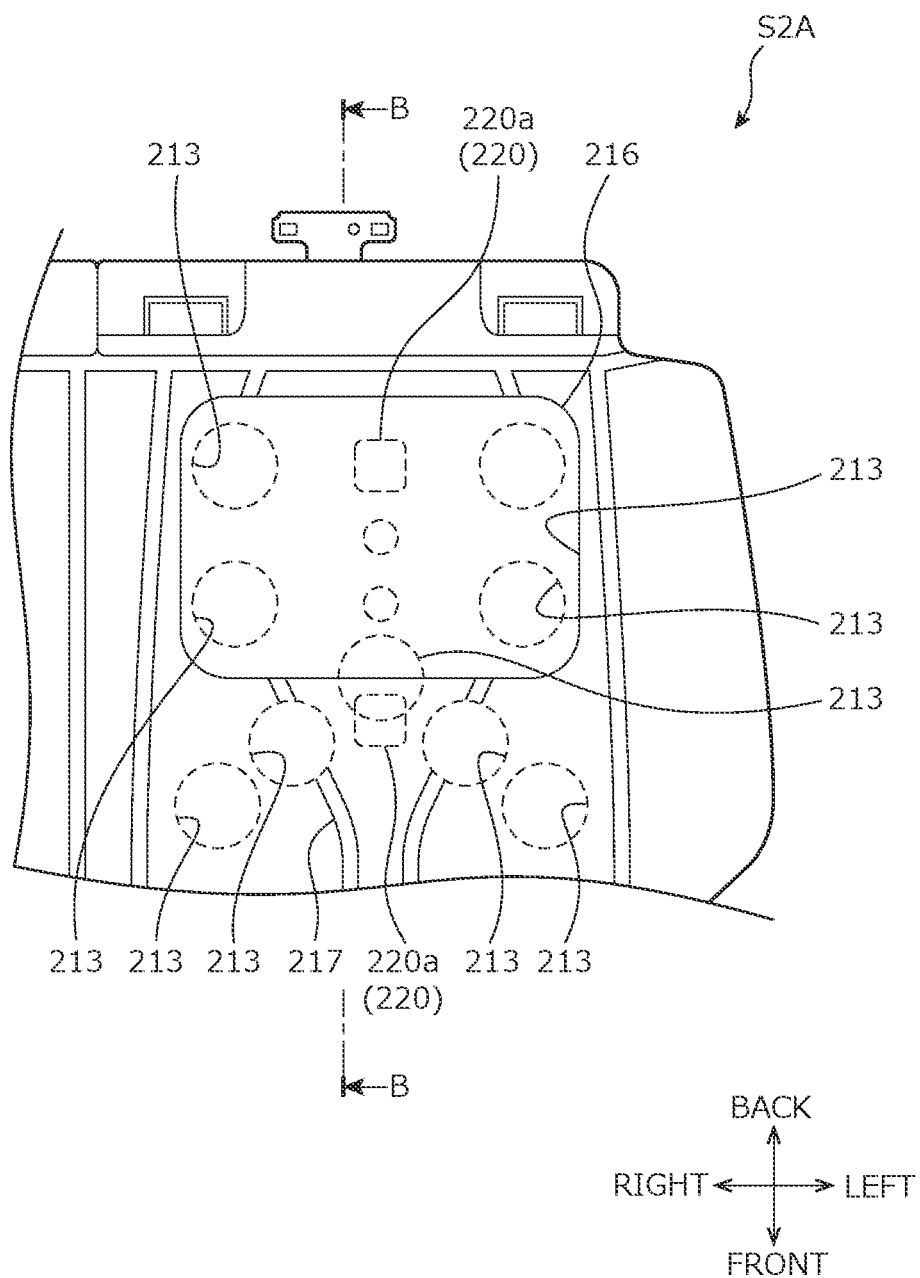
FIG. 8A is a top view of a seat pad illustrating a second example of the second embodiment and is a diagram illustrating the positional relationship between the seating sensor and the through hole formed in the bead foam molding member.

FIGS. 7 to 8A are diagrams illustrating a vehicle seat S2A, which is a second example of the second embodiment. FIG. 7 is a schematic configuration diagram illustrating a seat cushion 201A of the vehicle seat S2A and illustrates a state where the vehicle seat S2A is placed on the vehicle floor FL2.

As in the first example, the seat cushion 201A includes the seat cushion 201 configured from a urethane pad member 210A, a bead foam molding member 211A (EPP) harder than the urethane pad member 210A, and a skin material 212A covering the urethane pad member 210A. In addition, a seat back 203 is provided at the rear end of the seat cushion 201A.

A plurality of the through holes 213 are formed to penetrate the bead foam molding member 211A in the height direction, and the upper part of the through hole 213, that is, the upper opening portion is covered with the urethane pad member 210A. In addition, a gap 216 is formed between the urethane pad member 210A and the bead foam molding member 211A as illustrated in FIG. 7. The gap 216 is formed below a hip point H2, where a load is applied by a seated occupant's buttocks.

It should be noted that the hip point H2 corresponds to the hip joint of a person who is seated on the seat and is a reference point for the positional relationship between the person and the vehicle.

As illustrated in FIG. 8A, the through hole 213 of the bead foam molding member 211A may be formed at a position overlapping a groove portion for disposing the harness that is formed in the urethane pad member 210A. Several through holes 213 may be formed at positions overlapping the gap 216 in a top view.

In addition, a plurality of sensor main body portions 221a of the seating sensor 220 may be disposed side by side in the front to back direction of the vehicle seat S2. In addition, at least a part of at least one of a plurality of the seating sensors 220 may be disposed so as to overlap the through hole 213 and another seating sensor may be disposed so as not to overlap the through hole 213.

Detection accuracy can be enhanced by using each of the seating sensor 220 that overlaps the through hole 213 and the seating sensor 220 that does not overlap the through hole.

Figure 8B:
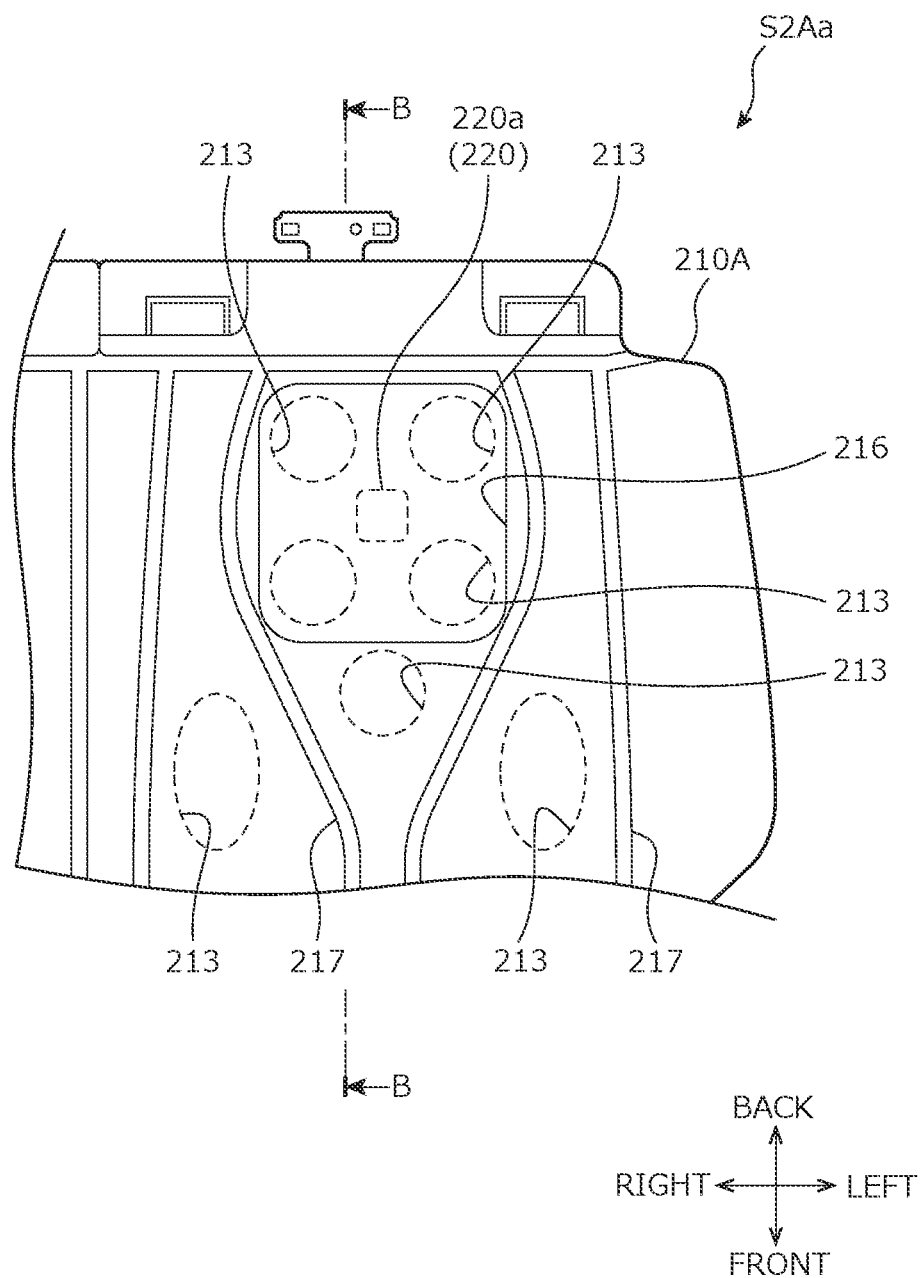
FIG. 8B is a top view of a seat pad illustrating another example of the second example and is a diagram illustrating the positional relationship between the seating sensor and the through hole formed in the bead foam molding member.

The through hole 213 may be formed with a groove portion 217 avoided as in a seat cushion 210Aa of a vehicle seat S2Aa illustrated in FIG. 8B. In addition, a gap 216Aa between the urethane pad member 210A and the bead foam molding member 211A may be disposed with the groove portion 217 avoided.

Figure 9A:
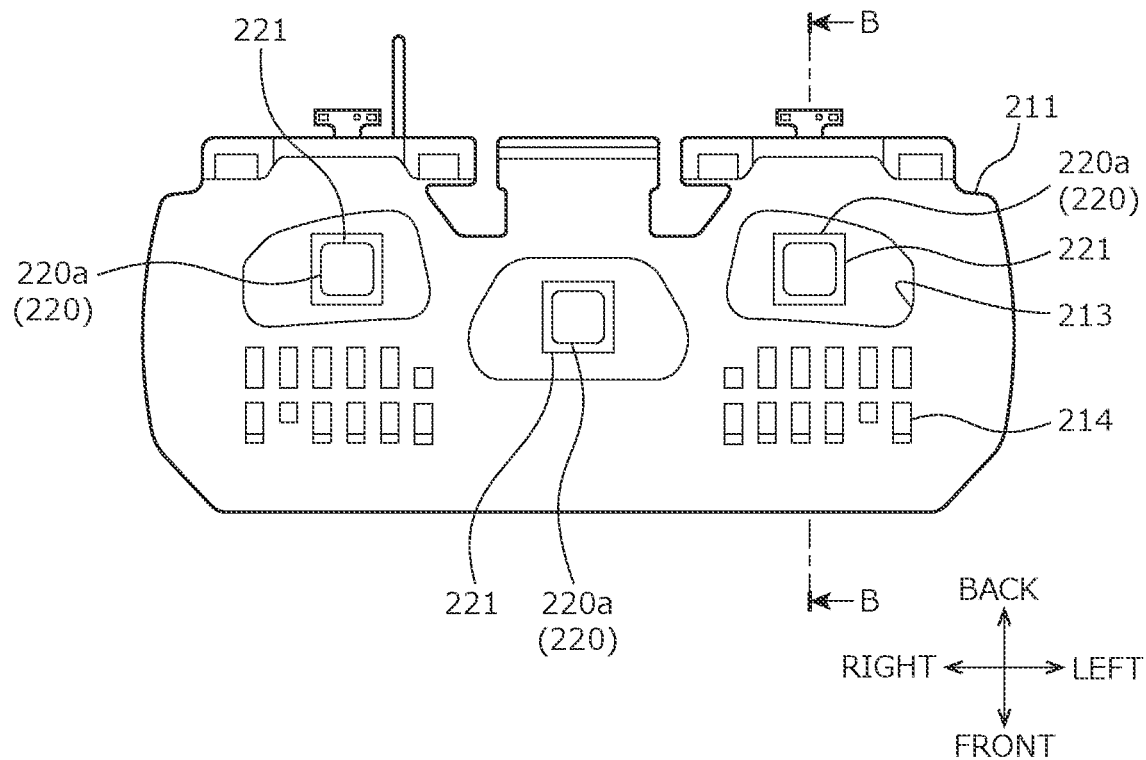
FIG. 9A is a top view of the bead foam molding member and is a diagram illustrating the position of a seating sensor.
Figure 9B:
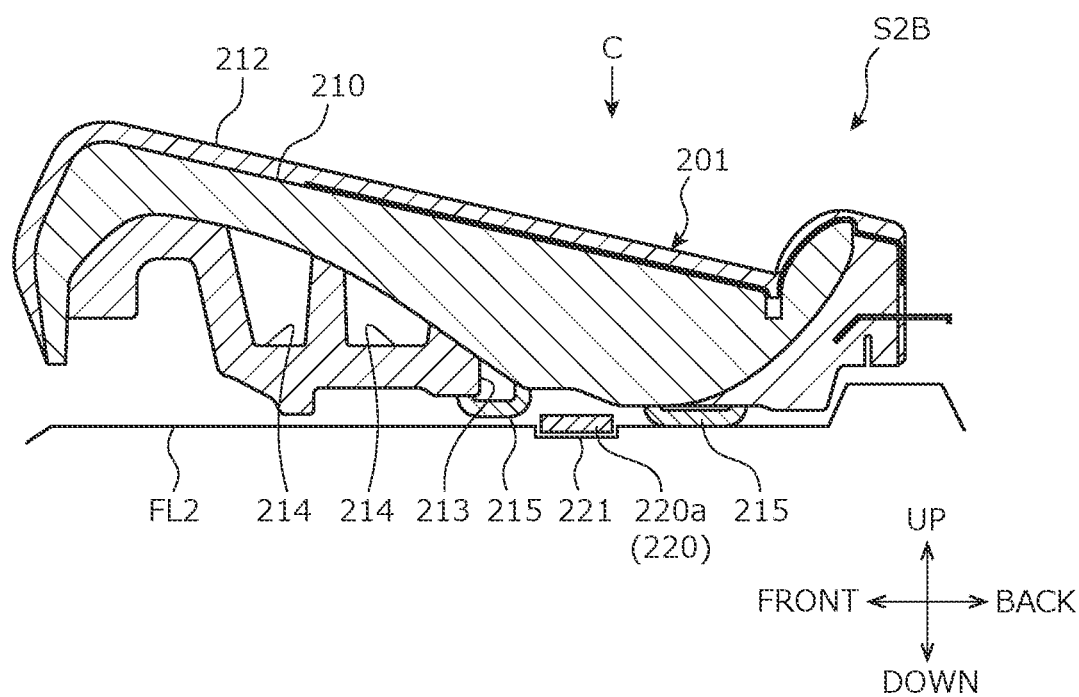
FIG. 9B is a cross-sectional view of the seat pad and is a diagram illustrating the position of a seating sensor.
Figure 10:
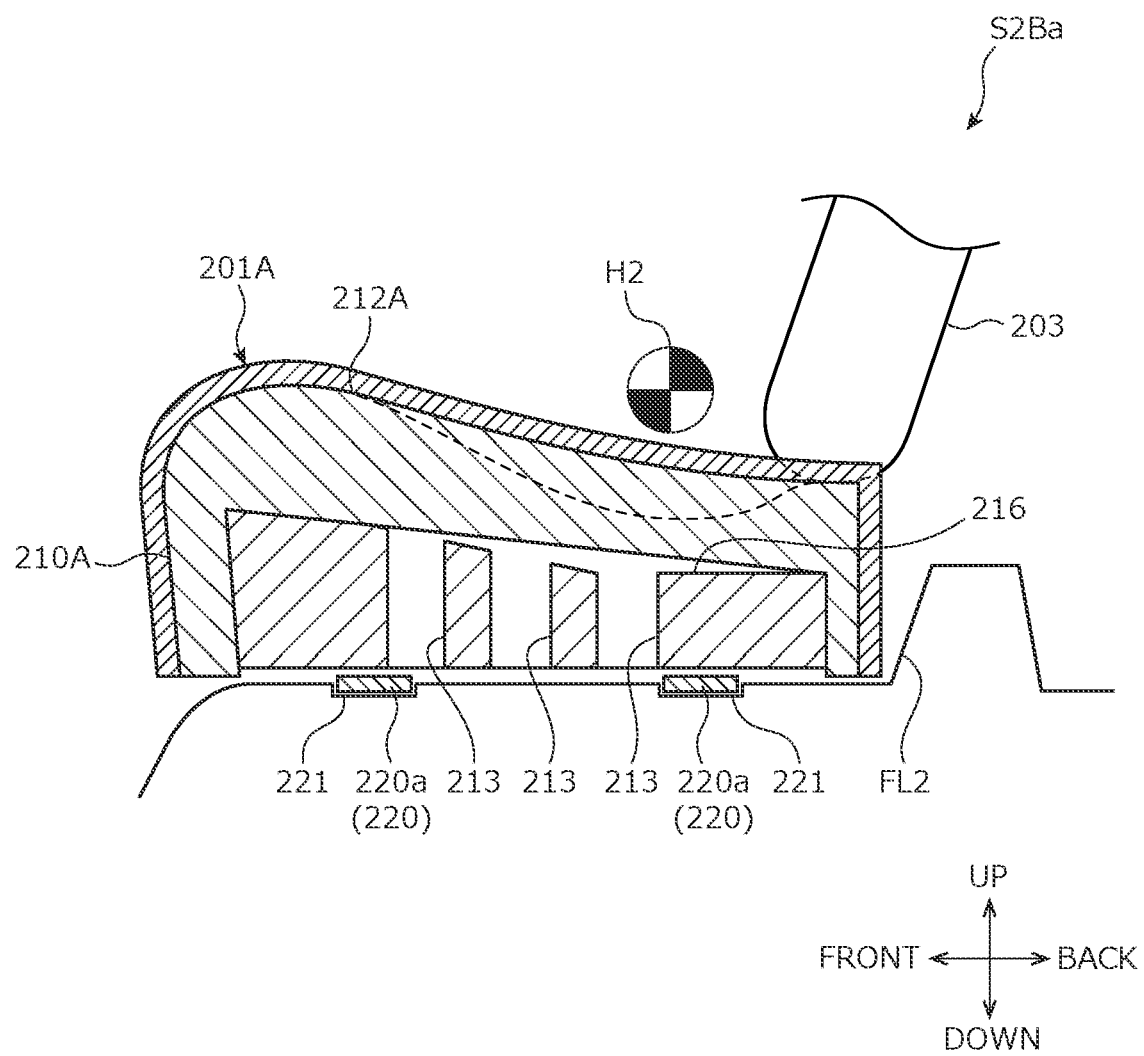
FIG. 10 is an explanatory diagram illustrating the positional relationship between a through hole formed in the bead foam molding member and the seating sensor.

In addition, as in vehicle seats S2B and S2Ba illustrated in FIGS. 9A to 10, an accommodating recess 221 capable of accommodating the lower portion of a sensor main body portion 220a of the seating sensor 220 may be formed on the upper surface of the floor FL2. The height of the accommodating recess 221 may be formed smaller than the height of the sensor main body portion 220a of the seating sensor 220 and, as a result, a part of the seating sensor 220 in the height direction may be exposed on the floor FL2 with the seating sensor 220 stored in the accommodating recess 221 as illustrated in FIGS. 9A and 10. By a part of the sensor main body portion 220a of the seating sensor 220 being provided so as to be exposed on the floor FL2, it is possible to realize, for example, compactness in the height direction while enhancing the detection accuracy of the sensor.

Figure 11A:
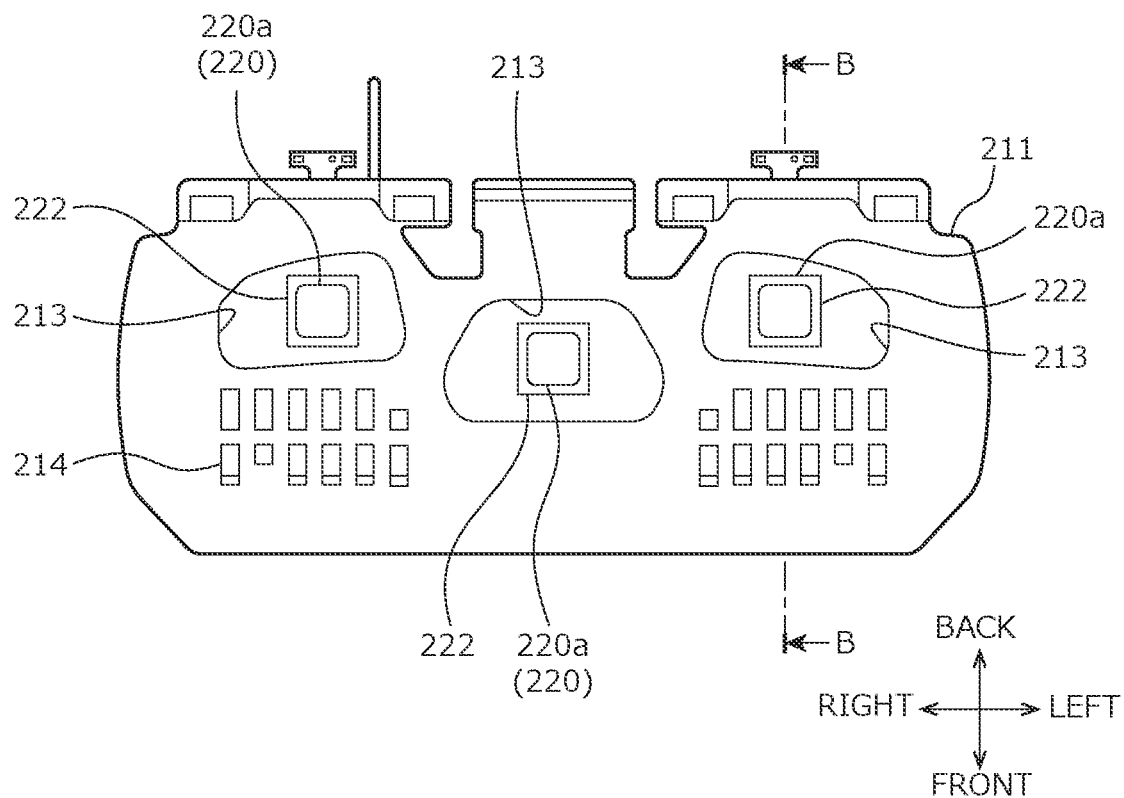
FIG. 11A is a top view of the bead foam molding member and is a diagram illustrating the position of a seating sensor.
Figure 11B:
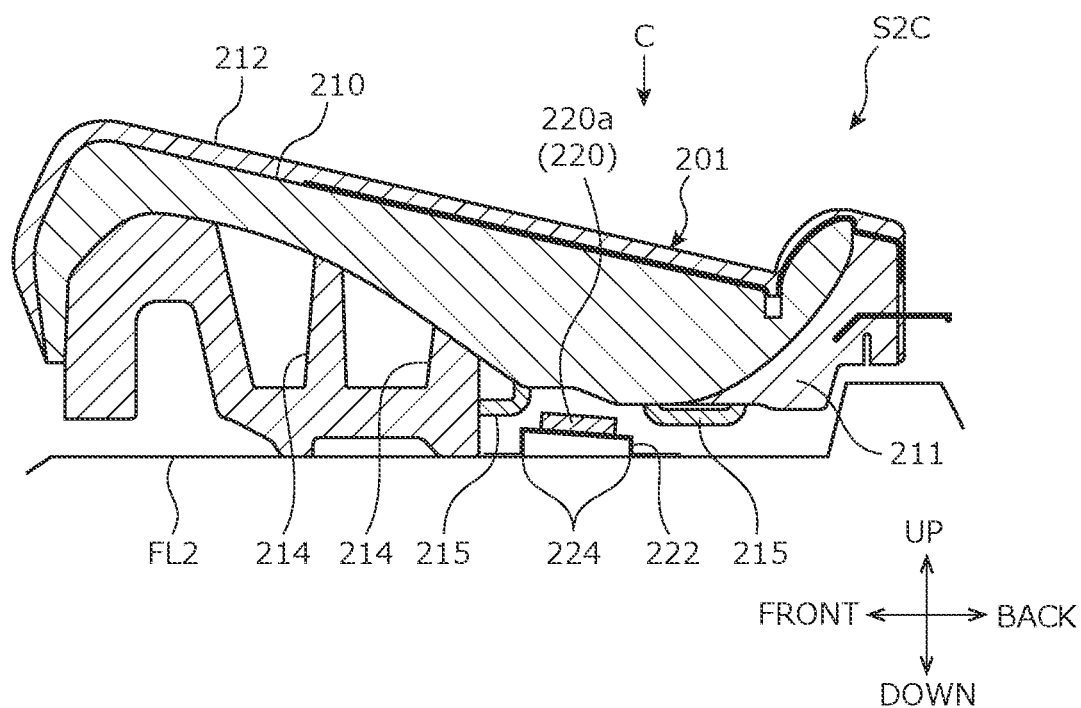
FIG. 11B is a cross-sectional view of the seat pad and is a diagram illustrating the position of a seating sensor.

In addition, as in a vehicle seat S2C illustrated in FIGS. 11A and 11B, the point of the upper surface of the floor FL2 where the seating sensor 220 is disposed may be formed with a raised bottom. An upper bottom point 224 may be realized by a bracket 222 that is attached to the floor FL2 and fixes the seating sensor 220 in a raised bottom state. The floor FL2 may be realized by integral molding with the upper bottom point 224.

By disposing the sensor main body portion 220a of the seating sensor 220 at the upper bottom point 224, it is possible to reduce the distance between the lower surface of the seat cushion 201 pushing out the seating sensor 220 and the seating sensor 220.

Figure 12A:
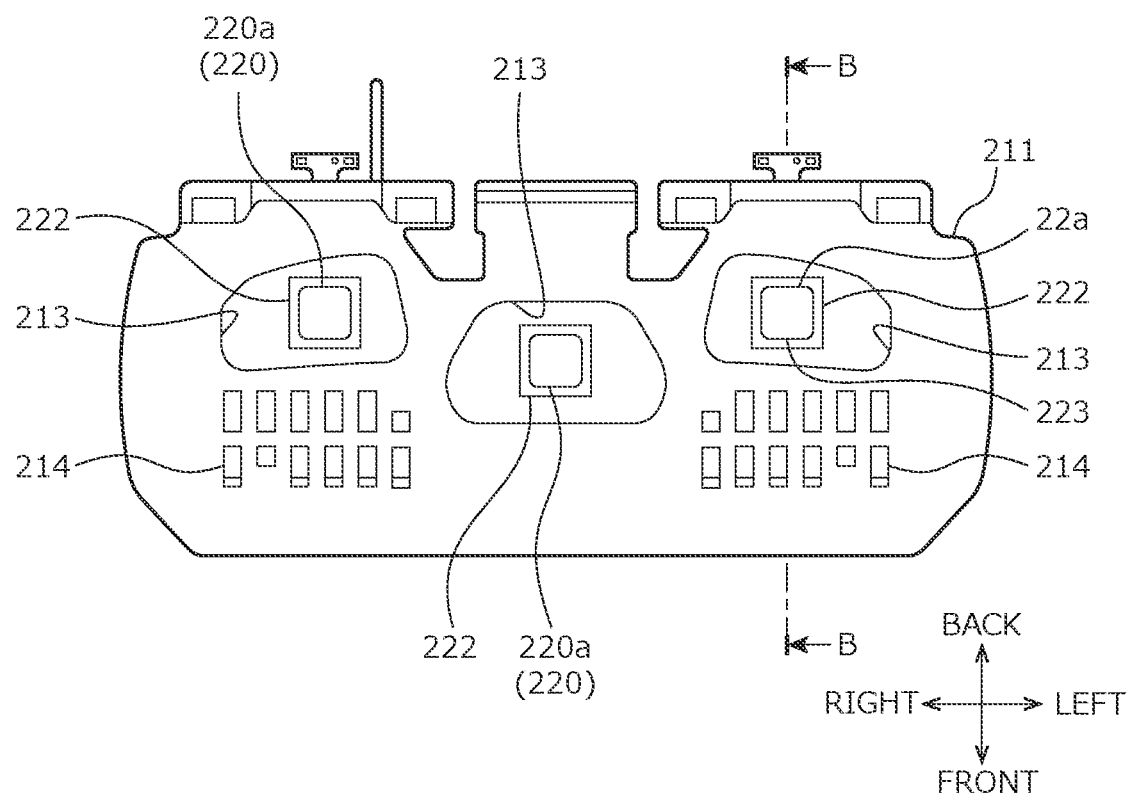
FIG. 12A is a top view of the bead foam molding member and is a diagram illustrating the position of a seating sensor.
Figure 12B:
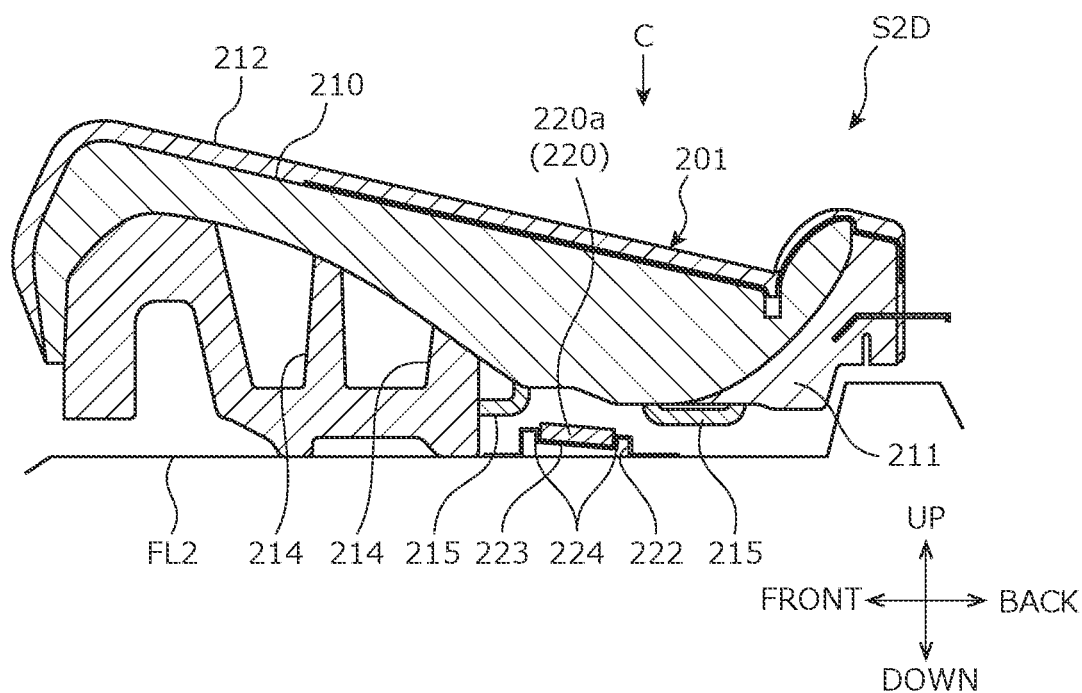
FIG. 12B is a cross-sectional view of the seat pad and is a diagram illustrating the position of a seating sensor.

Further, as in a vehicle seat S2D illustrated in FIGS. 12A and 12B, a positioning portion 223 positioning the sensor main body portion 220a may be formed at the position of the upper bottom point 224 of the upper surface of the floor FL2 that overlaps the sensor main body portion 220a of the seating sensor 220 in a top view (arrow view C). The positioning portion 223 is not limited to a recess and may be a mark.

The positioning portion 223 is recessed on the upper surface of the bracket 222 to match the outer shape of the sensor main body portion 220a. By providing the positioning portion, workability can be improved in disposing the seating sensor 220.

Figure 13A:
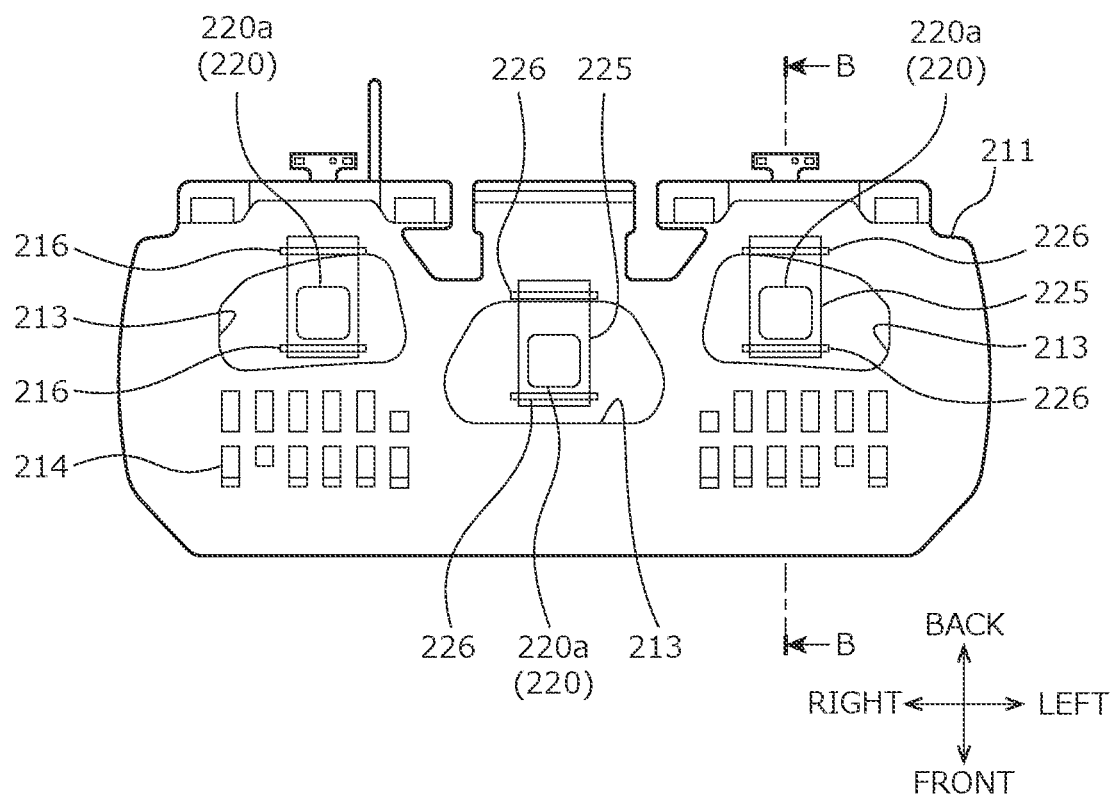
FIG. 13A is a top view of the bead foam molding member and is a diagram illustrating the position of a seating sensor.
Figure 13B:
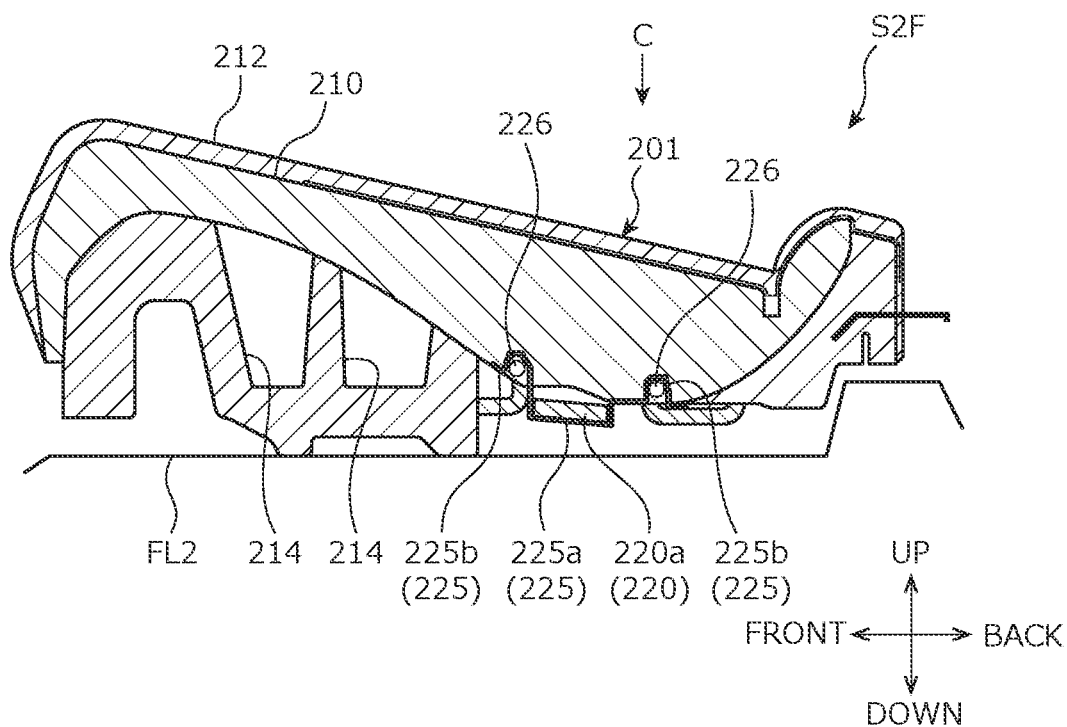
FIG. 13B is a cross-sectional view of the seat pad and is a diagram illustrating the position of a seating sensor.

As in a vehicle seat S2F illustrated in FIGS. 13A and 13B, the sensor main body portion 220a of the seating sensor 220 may be fixed by a sensor support member 225 fixed to the lower surface portion of the urethane pad member 210 of the seat cushion 201. The sensor support member 225 is fixed by being hooked onto an insert wire 226 embedded in the urethane pad member 210.

Vehicle seat assembly can be completed by fixing the seating sensor 220 to the seat cushion 201 with the sensor support member 225. In addition, the seating sensor 220 can be fixed at a position close to the lower surface portion of the seat cushion.

The urethane pad member 210 of the seat cushion 201 is foamed with the insert wire 226 enclosed. In addition, the sensor support member 225 includes a sensor holding portion 225a that supports the sensor main body portion 220a of the seating sensor 220 and a hooking portion 225b hooked onto the insert wire 226 in the up to down direction of the seating sensor 220.

The sensor support member 225 that supports the seating sensor 220 can be fixed to the urethane pad member 210 of the seat cushion 201 with a simple configuration.

The lower surface portion of the sensor support member 225 that is in the vicinity of the hooking portion 225b may be disposed on the upper surface of the bead foam molding member 211.

The vicinity of the hooking portion 225b of the sensor support member 225 is supported by the upper surface of the bead foam molding member 211 harder than the urethane pad member 210, and thus the sensor support member 225 that supports the seating sensor 220 can be fixed with a simple configuration.

Third Embodiment

Hereinafter, a vehicle seat according to a third embodiment of the present invention will be described with reference to the drawings. FIGS. 14 to 23 relate to the third embodiment of the present invention.

Figure 14:
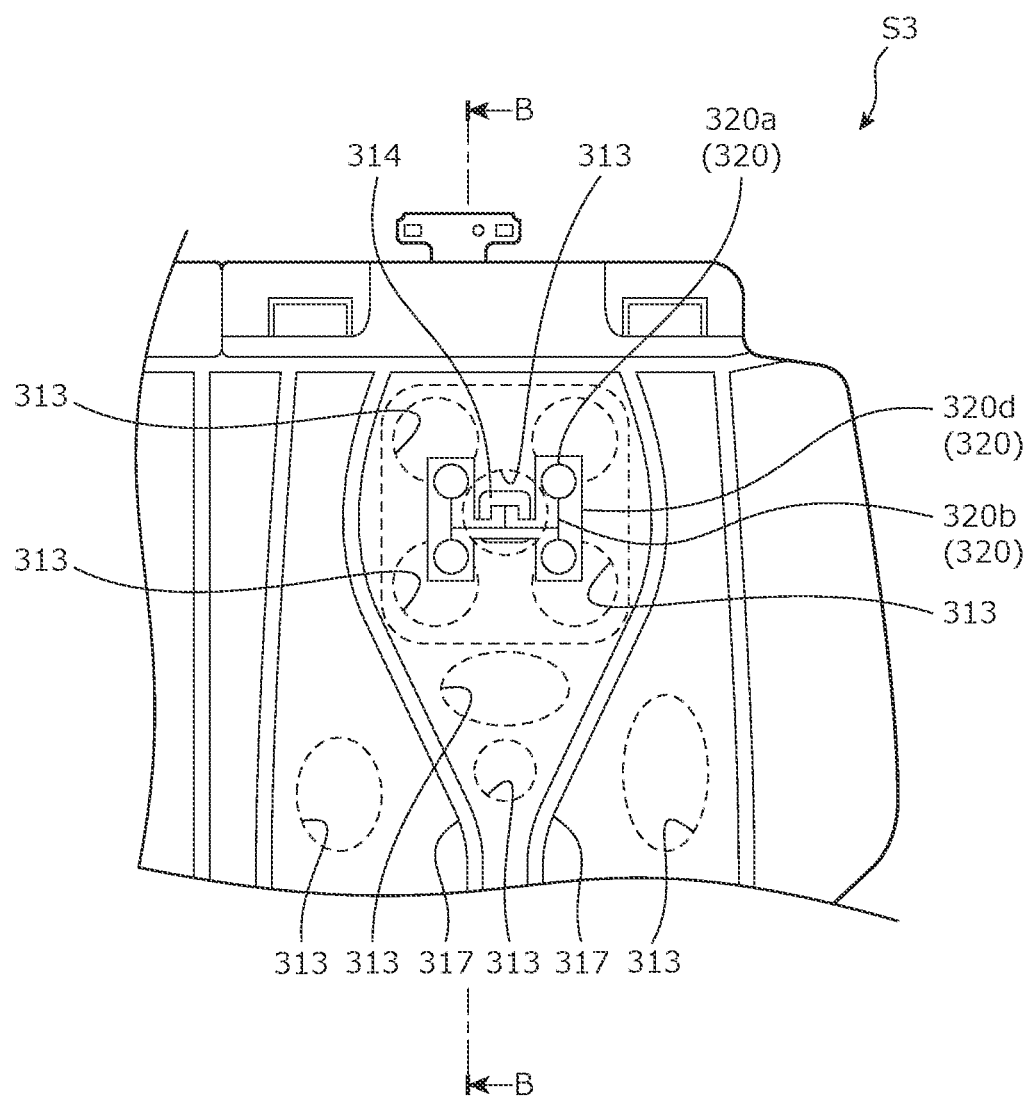
FIG. 14 is a top view illustrating a part of a seat pad of a vehicle seat according to a third embodiment and is a diagram illustrating the positions of a seating sensor and a through hole formed in a bead foam molding member.
Figure 15:
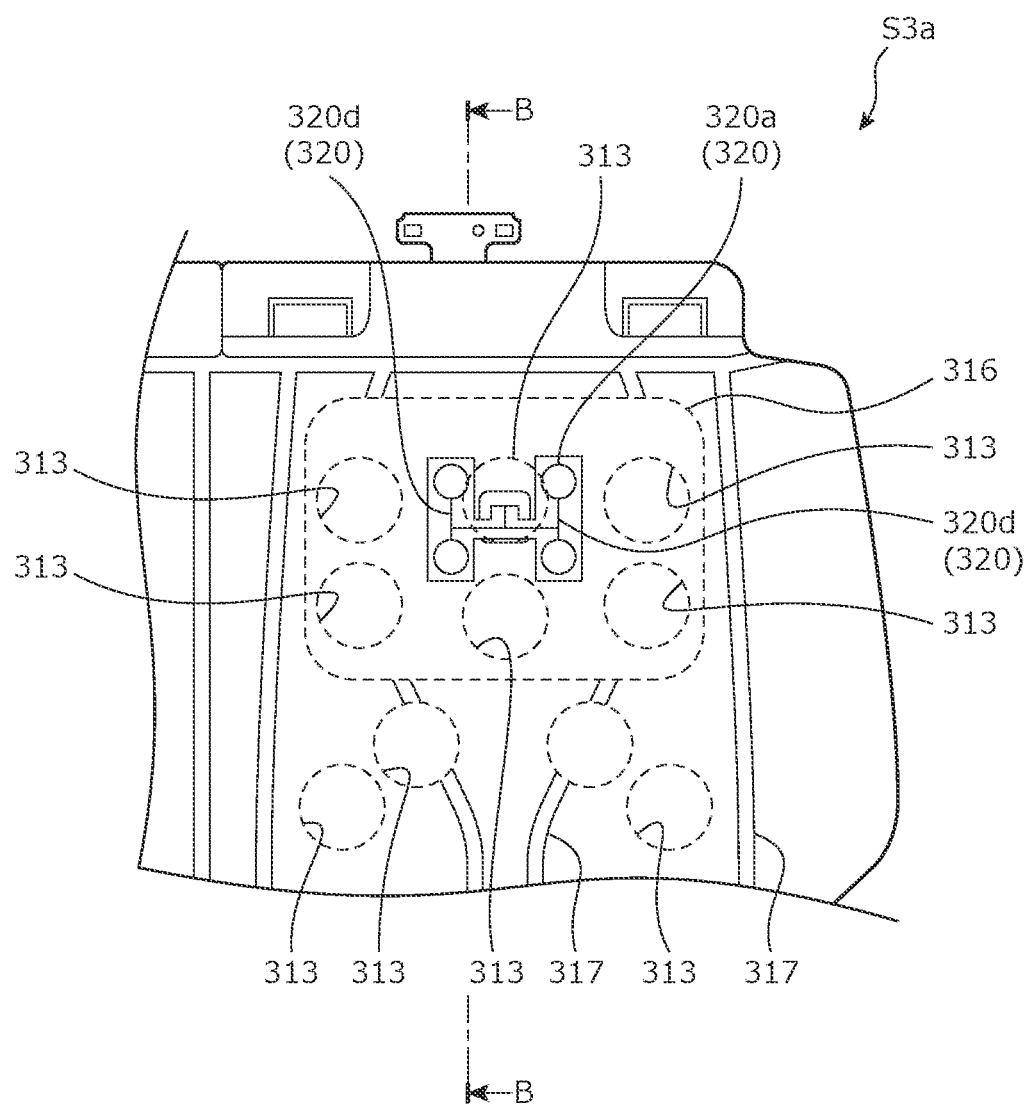
FIG. 15 is a top view illustrating a part of the seat pad and is a diagram illustrating the positions of the seating sensor and the through hole formed in the bead foam molding member.
Figure 16:
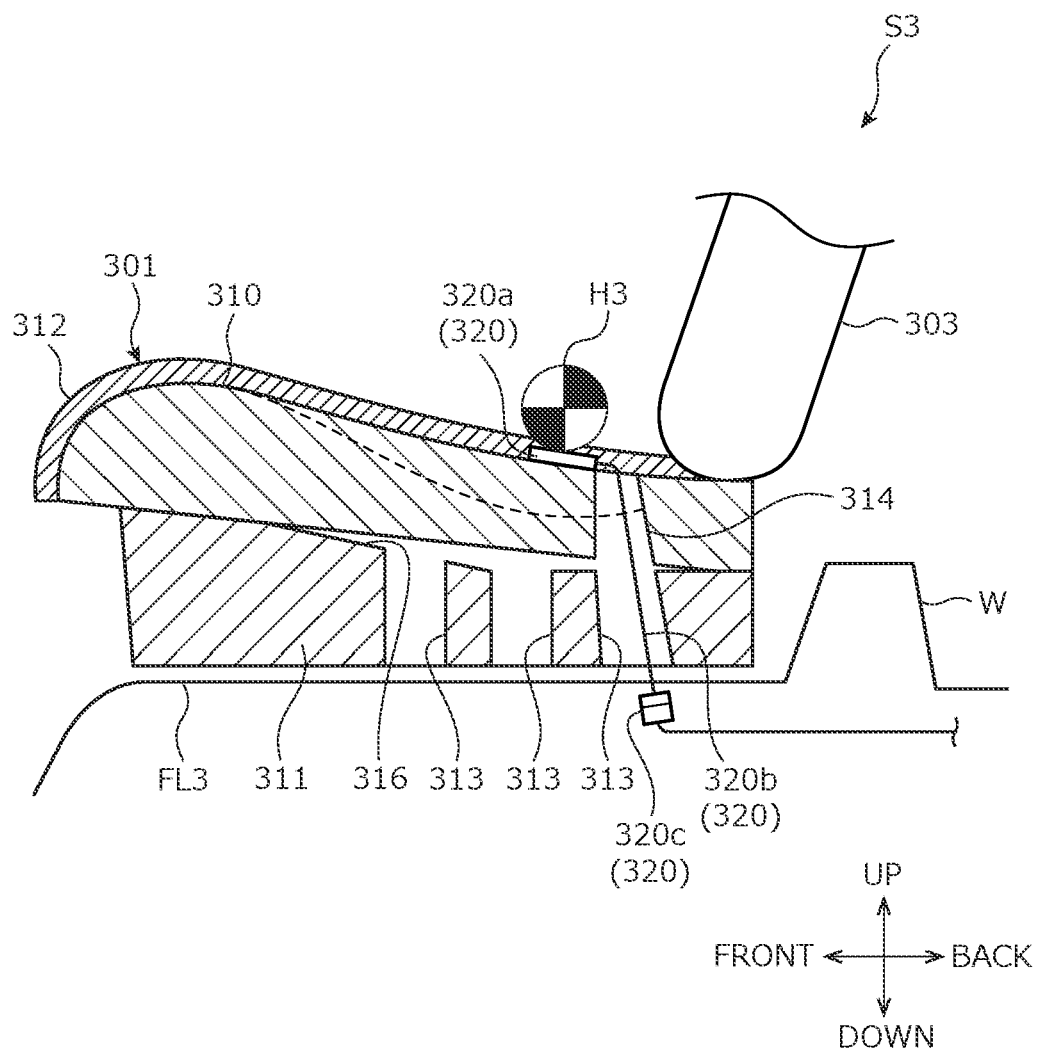
FIG. 16 is an explanatory diagram illustrating the positional relationship between a through hole formed in a urethane pad and a through hole of a bead foam molding member.

FIG. 14 is a top view of a cushion pad 302 used for a seat cushion 301 of a vehicle seat S3, which is a first example of the third embodiment. FIG. 15 illustrates a seat cushion 301a, which is another example. FIG. 16 is an explanatory diagram illustrating the configuration of the seat cushion 301.

The seat cushion 301 of the vehicle seat S3 is configured from a urethane pad member 310, a bead foam molding member 311 (EPP) harder than the urethane pad member 310, and a skin material 312 covering the urethane pad member 310. In addition, as illustrated in FIGS. 14 and 16, a seating sensor 320 is provided on the upper surface of the urethane pad member 310 and covered with the skin material 312. In addition, a seat back 303 is provided at the rear end of the seat cushion 301.

A urethane through hole 314 (first through hole) is formed to penetrate the urethane pad member 310 in the height direction (up to down direction). In addition, an EPP through hole 313 (second through hole), at least a part of which is disposed at a position overlapping the urethane through hole 314 in a top view, is formed to penetrate the bead foam molding member 311 in the height direction (up to down direction)

By a seated occupant applying a load at the position of a hip point H3, the seating sensor 320 senses the seating load. The seating sensor 320 includes at least a sensor main body portion 320a and a cable portion 320b energizing the sensor main body portion 320a or transmitting a signal to the sensor main body portion 320a. A connector portion 320c is provided at the tip of the cable portion 320b and can be connected to a cable and a power source provided on the vehicle body side.

In addition, as illustrated in FIG. 14, the seating sensor 320 includes four sensor main body portions 320a, are disposed in an H-shaped sensor base portion 320d, and are connected by the cable portion 320b. As illustrated in FIG. 14, a part of each sensor main body portion 320a is disposed so as to partially overlap the EPP through hole 313 in a top view.

As illustrated in FIG. 16, the cable portion 320b of the seating sensor 320 is inserted through the urethane through hole 314 and the EPP through hole 313, and the connector portion 320c is connected to the connector portion in a floor FL3.

Since the seating sensor 320 is disposed on the upper surface of the urethane pad member 310 softer than the bead foam molding member 311, the load of a seated occupant is received, and thus seating can be sensed at a part that is efficient for receiving a seating load.

As illustrated in FIG. 16, the urethane through hole 314 and the EPP through hole 313 are tapered so as to increase in width downward from above. In addition, the urethane through hole 314 and the EPP through hole 313 are formed such that the lower end of the urethane through hole 314 and the upper end of the EPP through hole 313 are substantially equal in width. As a result, when the cable portion is inserted through the EPP through hole 313 from the urethane through hole 314 side, the cable portion can be easily inserted without being caught.

In addition, a gap 316 is formed between the upper surface portion of the bead foam molding member 311 and the lower surface portion of the urethane pad member 310 as illustrated in FIG. 16. The seating sensor 320 is disposed so as to overlap the gap 316 in a top view.

This gap improves the seating comfort of the vehicle seat S3. In addition, the urethane through hole 314 and the EPP through hole 313 are provided in communication with the gap 316. When the urethane through hole 314 and the EPP through hole 313 communicate, positional deviation attributable to manufacturing errors of the urethane through hole 314 and the EPP through hole 313 can be compensated for such that communication is possible by the gap.

In the seat cushion illustrated in FIG. 14, the EPP through hole 313 is formed to avoid the position of a groove portion 317 through which a harness is passed.

As in the seat cushion illustrated in FIG. 15, the EPP through hole 313 may be formed so as to positionally overlap the groove portion 317 in a top view.

In addition, a plurality of the EPP through holes 313 are formed as illustrated in FIGS. 14 and 16. In other words, it is preferable that at least two EPP through holes 313 are formed. In addition, the EPP through hole 313 that penetrates the cable portion 320b is disposed behind the EPP through hole 313 that does not penetrate the cable portion 320b. In other words, the cable portion 320b is inserted through the EPP through hole 313 that is positioned behind. By being inserted through the EPP through hole 313 that is positioned behind, the cable portion can be easily taken out during manufacturing.

Figure 17:
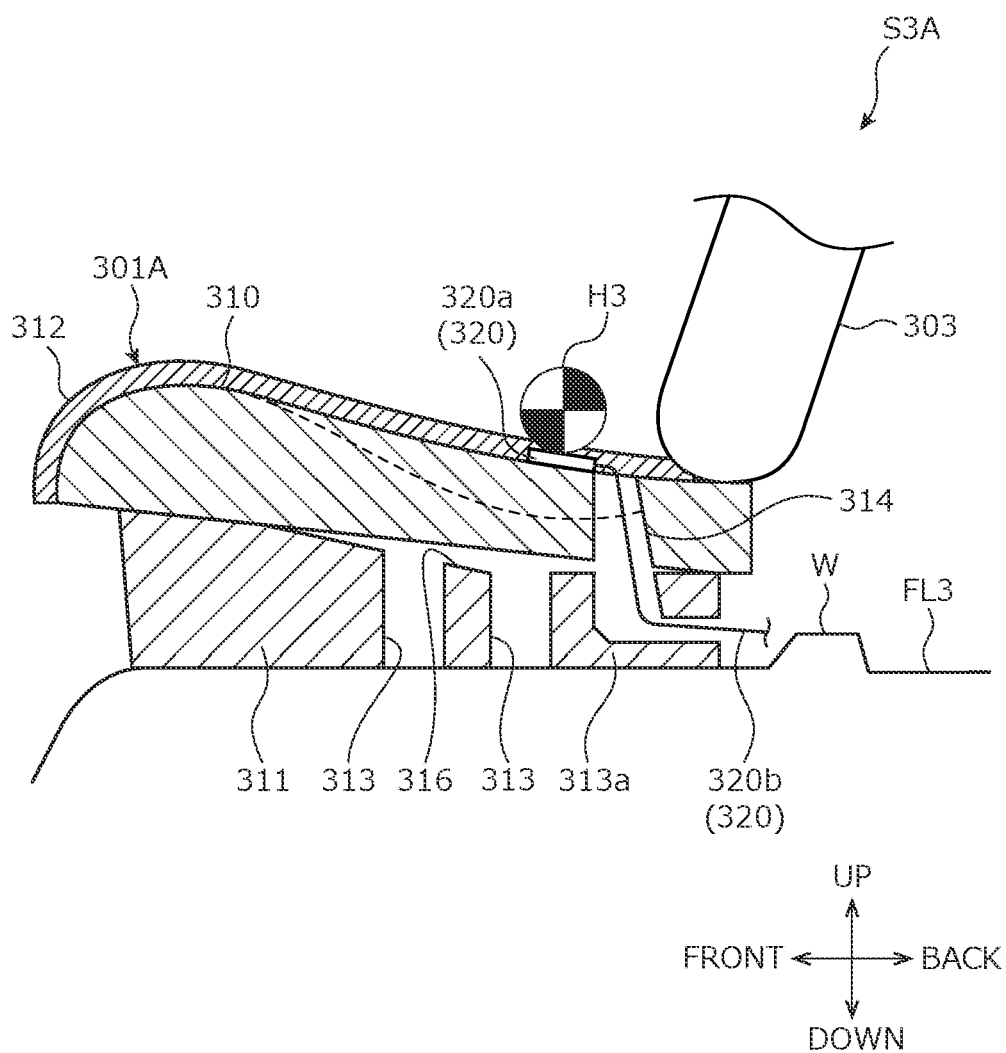
FIG. 17 is an explanatory diagram illustrating the positional relationship between the through hole formed in the urethane pad and the through hole of the bead foam molding member.

In addition, although the EPP through hole 313 formed in the bead foam molding member 311 is formed as a through hole extending in the up to down direction in the seat cushion 301 illustrated in FIG. 16, as in a vehicle seat S3A, which is a second example and illustrated in FIG. 17, an EPP through hole 313a may be formed so as to be bent rearward midway so as to have an L-shaped cross section such that the cable portion 320b extends behind a seat cushion 301A. In other words, one opening portion of the EPP through hole 313a may be formed on the upper surface of the bead foam molding member 311 and another opening portion may be formed on the rear surface of the bead foam molding member 311.

By the cable portion 320b being configured to extend from the rear of the vehicle seat S3, the cable portion 320b can be easily taken out during manufacturing. In addition, wiring work is facilitated with the vehicle seat S3 installed on the floor FL3.

The vehicle seat S3A is disposed on the upper surface of the floor FL3 where the vehicle seat S3A can be placed. A protrusion W is formed on the upper surface of the floor FL3. It is preferable that the EPP through hole 313a is disposed above the protrusion W formed on the floor FL3 as illustrated in FIG. 17. Interference with the protrusion W formed on the floor FL3 can be suppressed.

Figure 18:
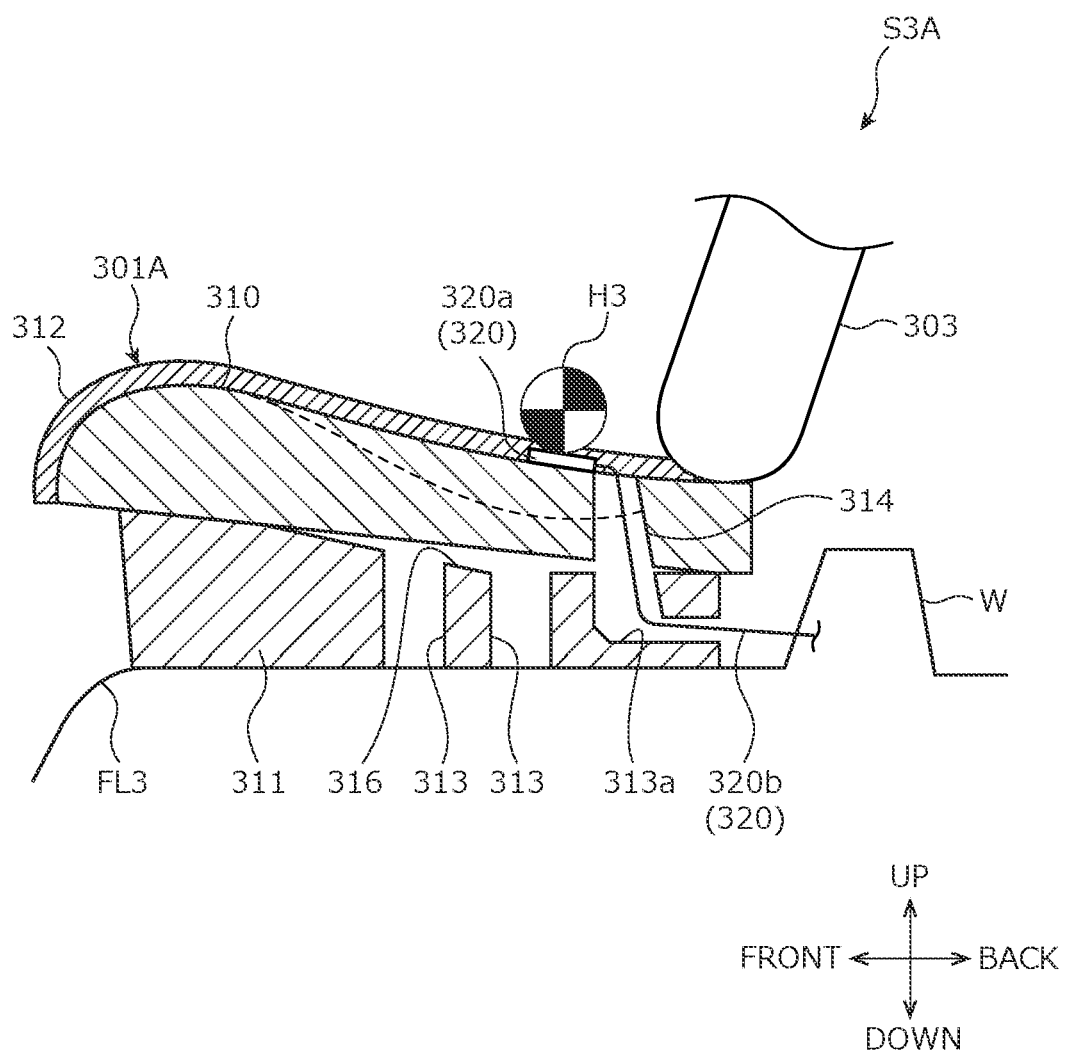
FIG. 18 is an explanatory diagram illustrating the positional relationship between the through hole formed in the urethane pad and the through hole of the bead foam molding member.

In addition, as illustrated in FIG. 18, the other EPP through hole may be disposed at a position overlapping the protrusion W in a front view, and the cable portion 320b may be accommodated in the protrusion W. The cable portion 320b can be connected to, for example, a power source on the vehicle body side in the protrusion W formed on the floor FL3 with an easy configuration.

Figure 19:
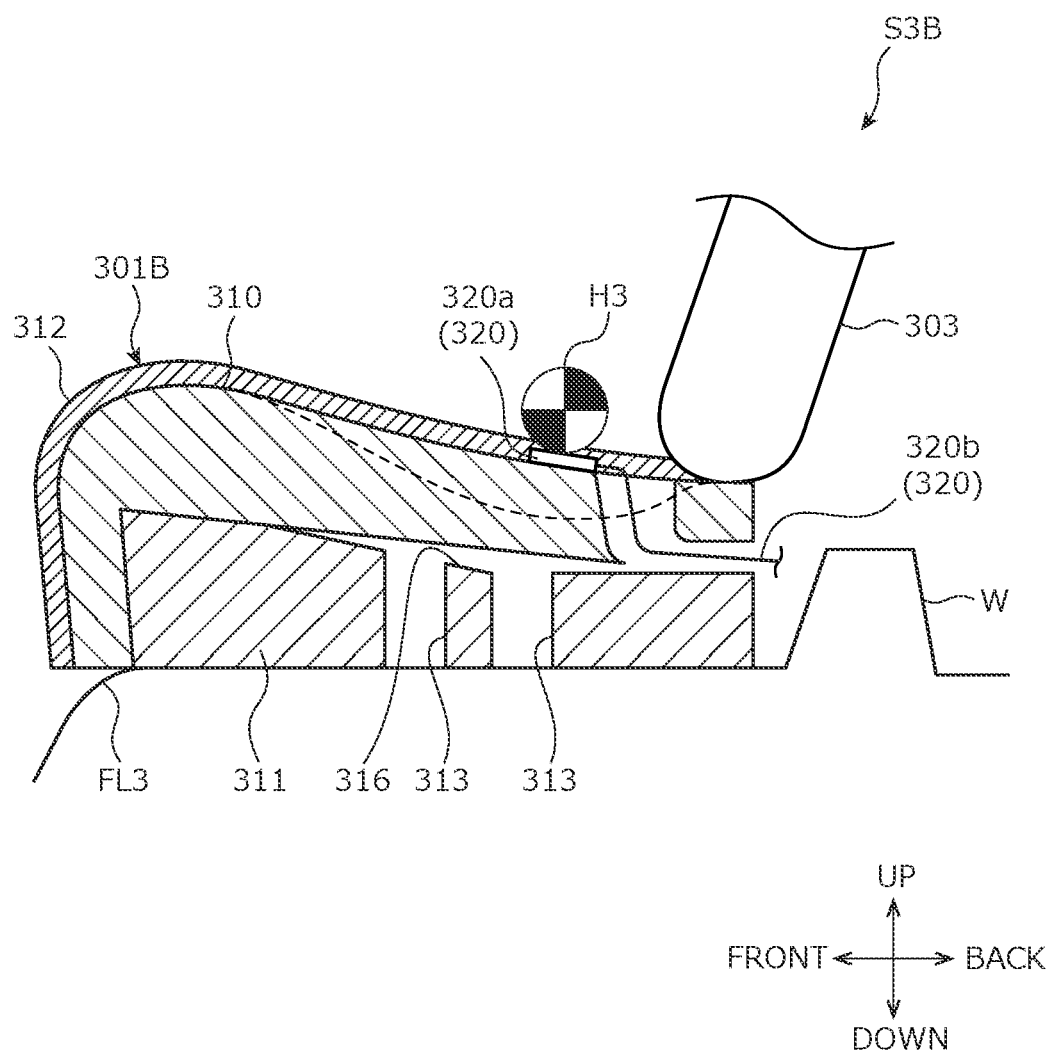
FIG. 19 is an explanatory diagram illustrating the position of the through hole formed in the urethane pad.

In addition, as in a seat cushion 301B of a vehicle seat S3B, which is a third example and illustrated in FIG. 19, the cable portion 320b may extend rearward from between the urethane pad member 310 and the bead foam molding member 311.

Figure 20:
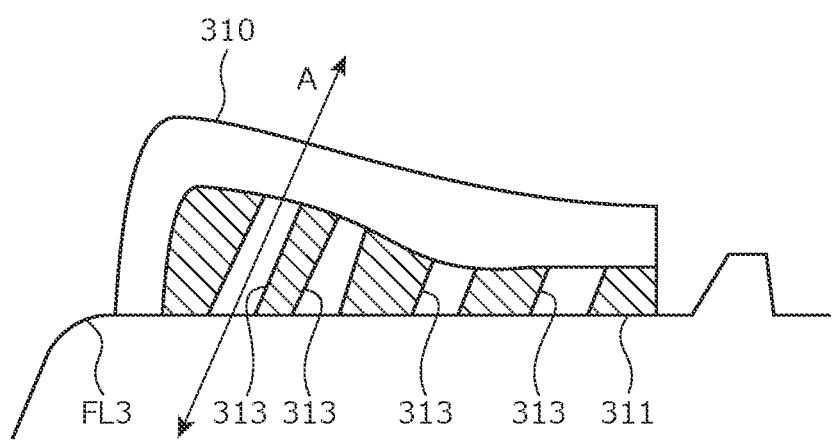
FIG. 20 is a cross-sectional view illustrating a seat pad.

Hereinafter, setting will be described as to forming the EPP through hole 313 of the bead foam molding member 311 used in the present embodiment. In a case where the EPP through hole 313 formed in the height direction is formed in the bead foam molding member 311, it is preferable to set the direction in which the mold is pulled out so as to match a direction A in which the EPP through hole 313 extends as illustrated in FIG. 20.

In addition, a seat buckle 340 for fixing a seat cushion 301C to the floor FL3 is provided at the rear end portion of the seat cushion 301C.

Figure 21:
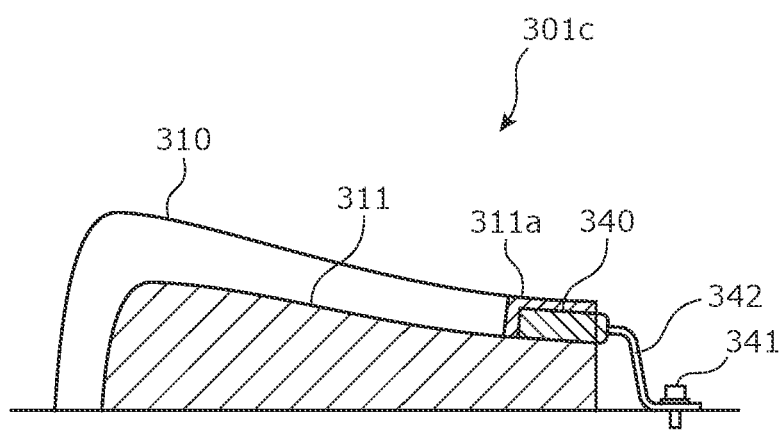
FIG. 21 is an explanatory diagram illustrating a seat buckle.
Figure 22:
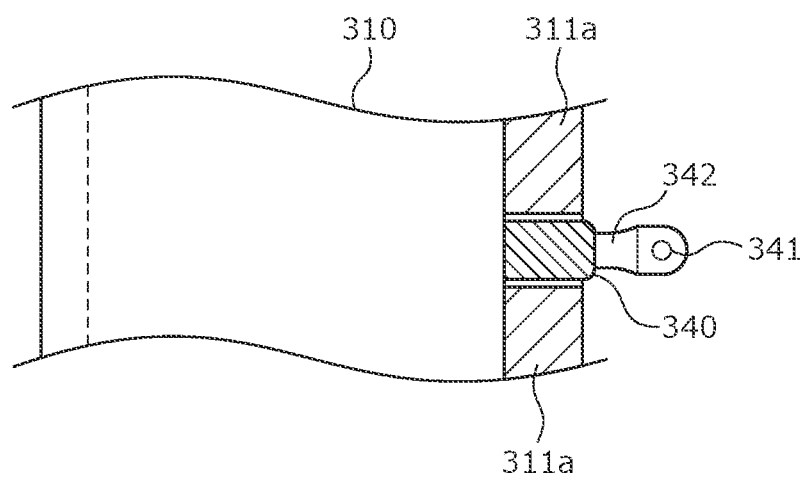
FIG. 22 is an explanatory diagram illustrating the seat buckle.

As illustrated in FIG. 21, the seat cushion 301C is fixed to the floor FL3 with a bolt 341 via a bracket 342 with the seat buckle 340 provided at the rear portion of the seat cushion 301C.

In a case where the seat buckle 340 is fixed to the seat cushion 301, it is preferable to form protrusions 311a on the bead foam molding member 311 and dispose and fix the seat buckle 340 therebetween. By sandwiching with the bead foam molding member 311 harder than the urethane pad member 310, fixing can be performed more firmly.

Figure 23:
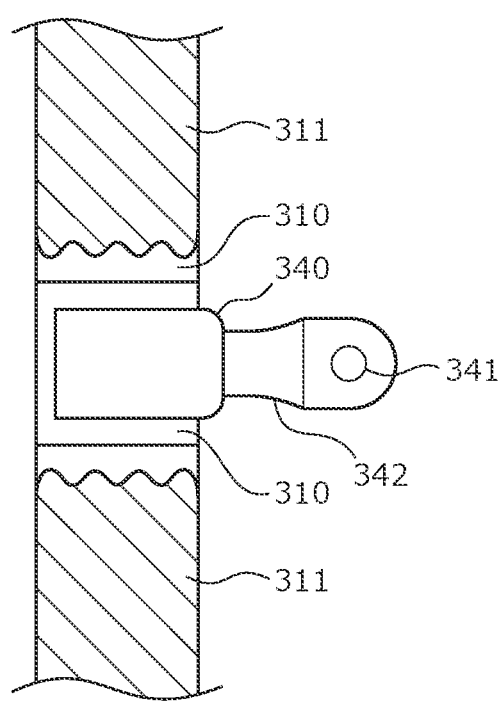
FIG. 23 is a diagram illustrating a holding portion holding a seat back.

In addition, as illustrated in FIG. 23, the urethane pad member 310 may be disposed at the part of contact with the side surface of the seat buckle 340 and the connection surface between the urethane pad member 310 and the bead foam molding member 311 may be wavy in a plan view (top view). The side surface of the seat buckle 340 can be protected by the contact of the urethane pad member 310, and firm support is possible by holding using the bead foam molding member 311.

Fourth Embodiment

Figure 24:
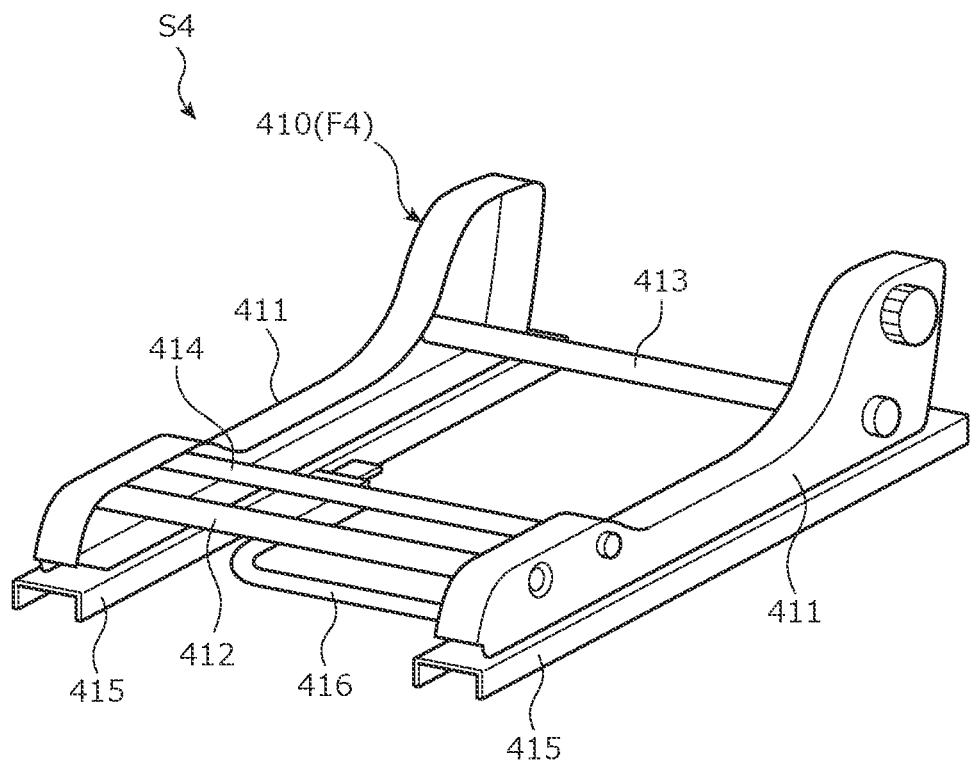
FIG. 24 is a perspective view illustrating a rail member of a fourth embodiment.

Hereinafter, a vehicle seat S4 according to a fourth embodiment of the present invention will be described with reference to the drawings. FIG. 24 is a perspective view illustrating the seat cushion frame of the vehicle seat S4 and slide rails for sliding the vehicle seat S4 in the front to back direction.

Figure 25:
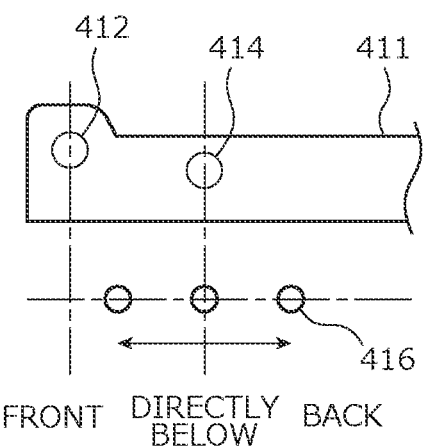
FIG. 25 is an explanatory diagram illustrating the positions of connecting frames connecting upper rails.
Figure 25:
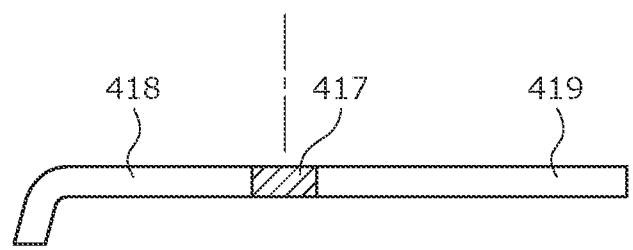

As illustrated in FIG. 24, a seat cushion frame 410 has a pair of side frames 411, and a front connecting frame 412 and a rear connecting frame 413 are provided to connect the side frames 411. Upper rails 415 are respectively provided at the lower portions of the side frames. A lower rail is provided on the floor to move the upper rail 415, and the upper rail 415 is capable of sliding in the front to back direction on the lower rail. As illustrated in the drawing, the front connecting frame 412 is disposed in front of a submarine pipe 414 in a case where the upper rail 415 is positioned at the rearmost end. In addition, as illustrated in the upper drawing in FIG. 25, the position of a towel bar 416 may be disposed in front of the submarine pipe 414 or may be disposed at an overlapping position (directly below). In addition, it may be disposed behind. As illustrated in the lower drawing in FIG. 25, a front foot plate 418 and a rear foot plate 419 may be connected at a two-ply position 417.

Fifth Embodiment

Hereinafter, a vehicle seat S5 according to a fifth embodiment of the present invention will be described with reference to FIGS. 26A to 27. Illustrated in FIG. 26A are a bracket 510 fixing the slide rail provided on the vehicle seat S5 to a floor FL5 and a fitting groove 520 where the bracket 510 is fitted.

Figure 26A:
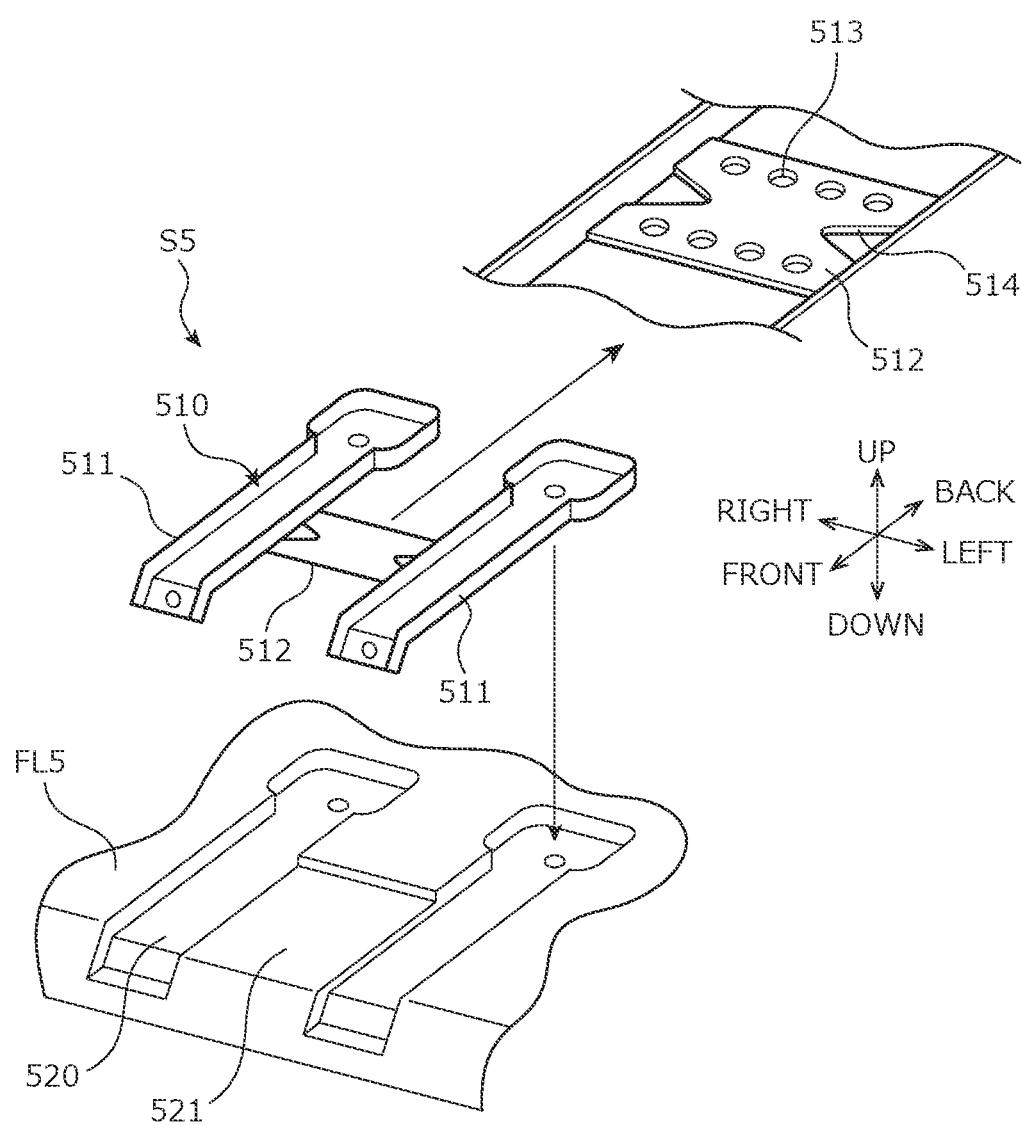
FIG. 26A is a perspective view illustrating a bracket according to a first example of a fifth embodiment.

As illustrated in FIG. 26A, the bracket 510 fixing the slide rail (not illustrated) is configured from a pair of fixing members 511 fixing the slide rail and a reinforcement plate 512 connecting the fixing members 511. In addition, an H-shaped groove is formed in the floor FL5 in accordance with the shape of the bracket 510, and the H-shaped fitting groove 520 is formed such that the bracket 510 can be fitted.

As illustrated in the enlarged view in FIG. 26A, the reinforcement plate 512 may be formed with a plurality of lightening holes 513 or V-shaped slits 514 for weight reduction.

In addition, in the H-shaped fitting groove 520, a plate escape step 521 is formed at the position where the reinforcement plate 512 is fitted such that the reinforcement plate 512 is capable of escaping.

Figure 26B:
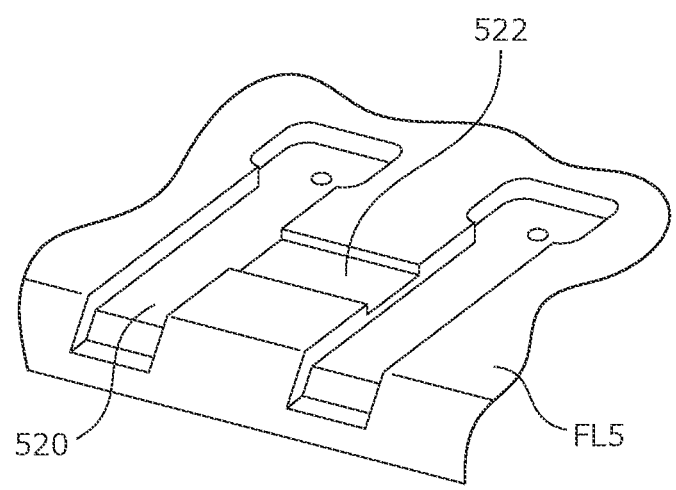
FIG. 26B is a diagram illustrating another example of a groove portion into which the bracket is fitted.

It should be noted that as illustrated in FIG. 26B, an escape groove 522 may be formed at the position where the reinforcement plate 512 is fitted.

Figure 26C:
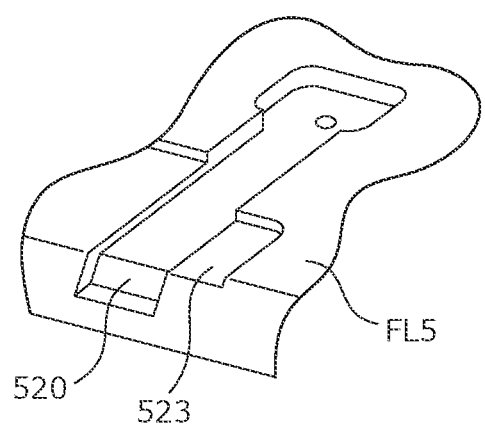
FIG. 26C is a diagram illustrating a recess formed on a floor.

In addition, the bracket 510 may be provided with a biasing member attachment portion to attach a biasing member such as a damper and a spring and, as illustrated in FIG. 26C, the floor FL5 may be formed with a recess 523 for releasing the biasing member attachment portion.

Figure 27:
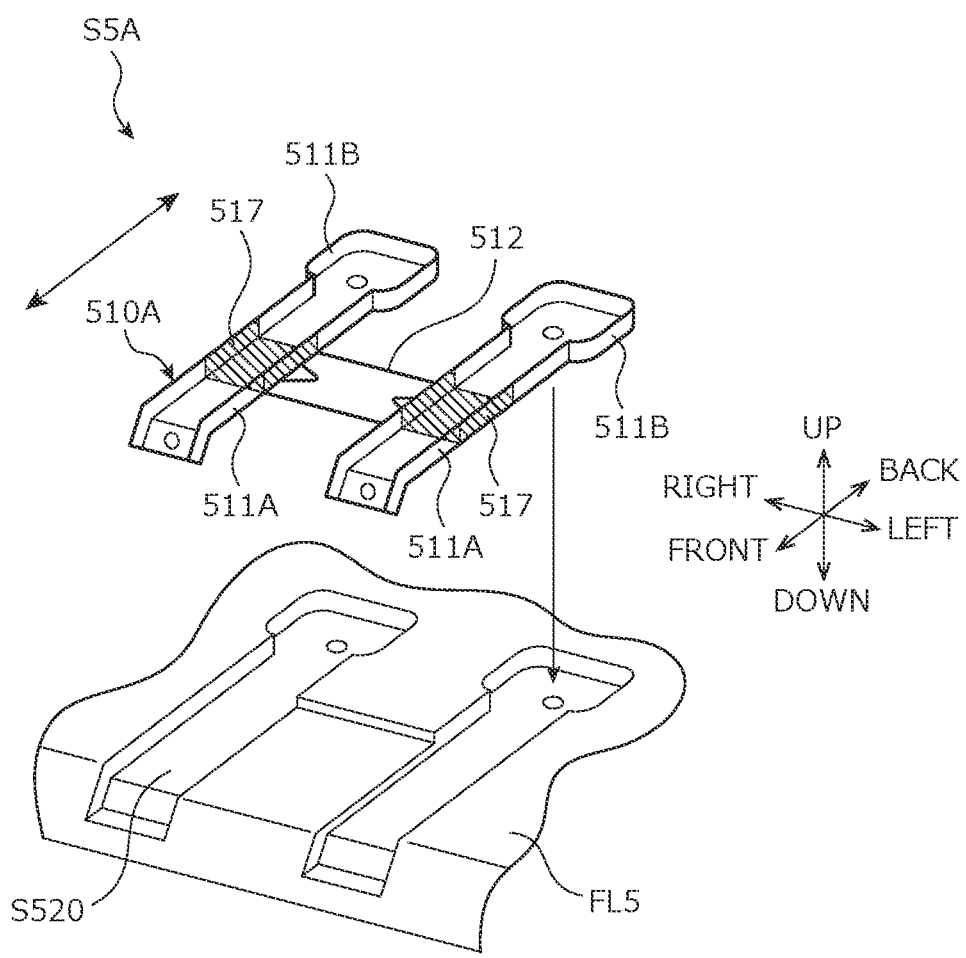
FIG. 27 is a perspective view illustrating a bracket according to a second example of the fifth embodiment.

FIG. 27 illustrates a bracket 510A, which is another example. As illustrated in FIG. 27, each of the fixing members 511 of the bracket 510A is divided into a front bracket 511A and a rear bracket 511B at the front and rear, and the two divided brackets are connected at a reinforcement portion 517 (two-ply portion). In addition, the front bracket 511A and the rear bracket 511B may be provided with pipes at the same front and back positions as the frame and the reinforcement portion.

Sixth Embodiment

Figure 28:
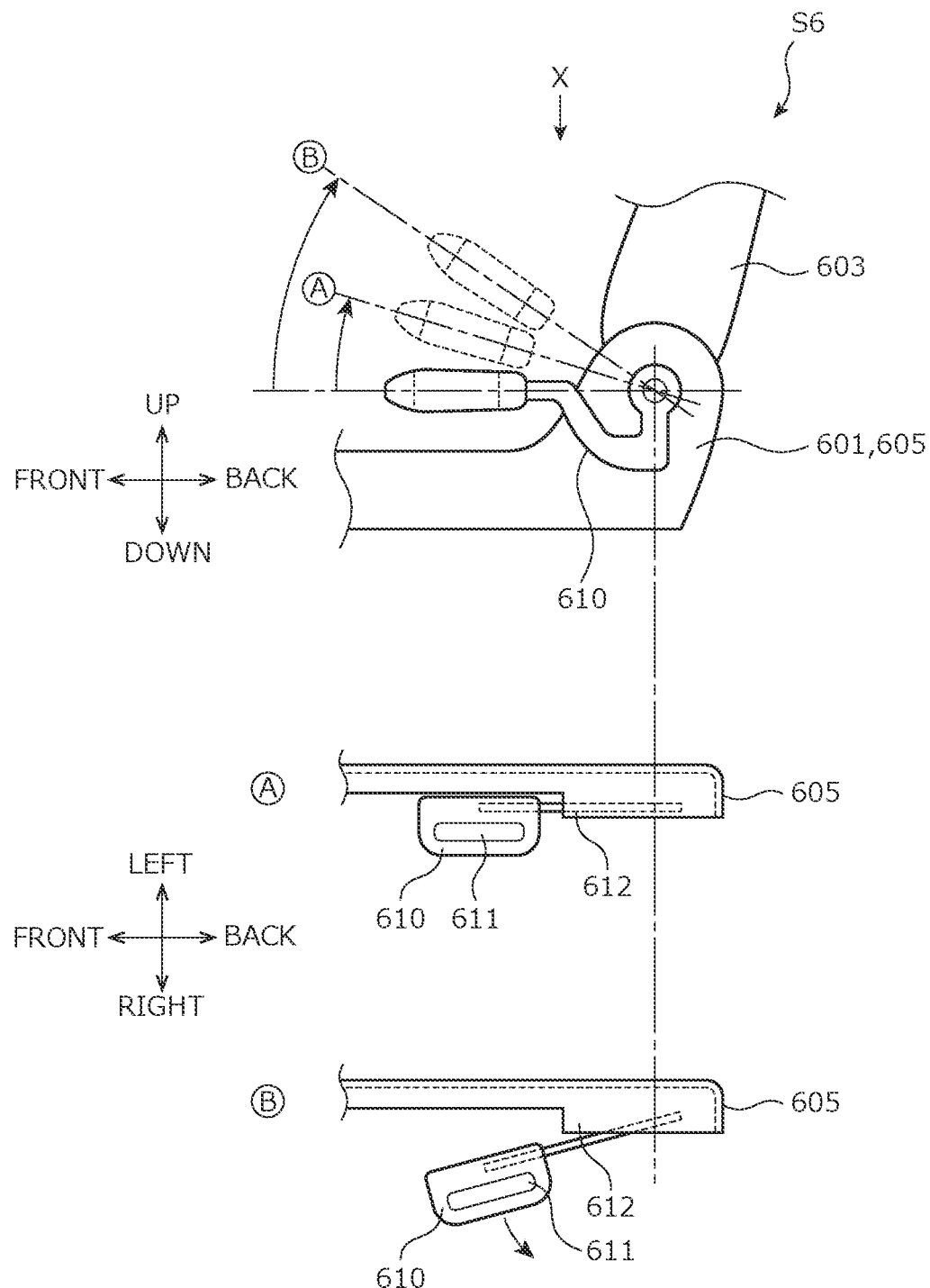
FIG. 28 is a diagram illustrating the function of an operating lever that is a sixth embodiment.

Hereinafter, a vehicle seat S6 according to a sixth embodiment of the present invention will be described with reference to FIG. 28. FIG. 28 is an explanatory diagram illustrating the operation of an operating lever 610 provided on the vehicle seat S6. The vehicle seat S6 includes a seat cushion 601 and a seat back 603 connected to the rear end portion of the seat cushion 601. The seat back 603 is pivotable by a reclining function. The reclining function is covered with a reclining cover 605.

In addition, the vehicle seat S6 can be switched between a walk-in state (walk-in arrangement) and a fall-down state (fall-down arrangement) by the single operating lever 610.

The walk-in state is, for example, a state where the seat back 603 is tilted forward while the entire seat is slid forward in order to facilitate rear seat boarding and alighting. The fall-down state is, for example, a state where the seat back 603 is folded forward and superimposed on the upper surface of the seat cushion 601.

The middle drawing in FIG. 28 is a top view (arrow view X) of the operation of the operating lever in putting the vehicle seat S6 into the walk-in state and illustrates a state where the operating lever is only pulled up. The operating lever is provided with a finger gripping margin 611 (hole portion). An occupant can enter the walk-in state by putting a finger on the gripping margin 611 and pulling it up. During the upward pulling, locking occurs at a stopper 612 provided on the side portion (reclining cover) of the seat cushion, and thus the upward pulling operation is limited as illustrated in the middle drawing in FIG. 27.

The lower drawing in FIG. 28 is a top view (arrow view X) of the operation of the operating lever in putting the vehicle seat S6 into the fall-down state and illustrates the operation of pulling up the operating lever after temporary lateral pulling. As a result of the temporary lateral pulling, the operating lever can be pulled up with the stopper 612 of the reclining cover avoided. As illustrated in the upper drawing in FIG. 28, the vehicle seat S6 can be put into the fall-down state by pulling up the operating lever to become higher.

Seventh Embodiment

Hereinafter, a method for arranging a vehicle seat S7 according to a seventh embodiment of the present invention will be described. The method for arranging the vehicle seat S7 according to the seventh embodiment relates to an arrangement lever device and an arrangement method for an automotive seat including a lever member capable of changing the vehicle seat to a fall-down state by a reclining operation and changing the vehicle seat to a walk-in state by a walk-in operation.

In the structure disclosed in JP 2008-074149 A, the seat back of a conveyance seat is folded forward toward the seat cushion by pulling up a reclining lever from the seating posture state of the seat back. However, a walk lever does not move because the reclining lever operation is not transmitted to the walk lever and a slide rail does not move because the slide lock of the slide rail is not unlocked.

In addition, in the structure disclosed in JP 2008-074149 A, when a walk lever is pulled up from the seating posture state of a seat back, a reclining lock is unlocked by pulling down a first link plate to swing a first swing arm, the seat back is tilted forward by the spring force of a spiral spring pivoting a back bracket, and the overhanging piece of the back bracket abuts against the outer shaft portion of a guide pin to regulate the forward tilting of the seat back.

However, in the structure disclosed in JP 2008-074149 A, it is necessary to operate two different lever members depending on the application, which may increase the number of lever member components and the number of lever members, and thus it may be troublesome for users.

Therefore, there has been a demand for a technique with which a vehicle seat is switchable between a plurality of states.

The above problems can be solved by a seat arrangement method for a vehicle seat including a lever member allowing a two-stage operation, a vehicle seat slide device, a slide lock device switchable between a slidable state and a slide lock state of the slide device, and a reclining device capable of pivoting a seat back of the vehicle seat relative to a seat cushion. The method includes a first step in which the seat back is folded forward to a predetermined angle by operating the reclining device via a first transmission member transmitting an operating force of the lever member by performing a first-stage operation on the lever member, a second step in which the slide device is shifted from a non-slidable state to the slidable state by shifting the slide lock device from a lock state to an unlock state by pulling a second transmission member in conjunction with the forward folding of the seat back, and a third step in which the vehicle seat moves forward by an occupant pushing out the vehicle seat forward and shifts to a walk-in state by completing the movement.

It is possible to move the vehicle seat forward while folding the seat back of the vehicle seat forward with the simple single-lever technique. As a result, for example, the occupant's movement in the vehicle can be made freer and the space behind the vehicle seat can be widened.

In addition, according to the above seat arrangement method, the lever member may be made inoperable in the second step and the lever member may be made operable again in the second step.

The forward folding and slide movement operations of the seat back of the vehicle seat are not operated at the same time, and thus regulation is possible such that the seat back is not slid when folded forward.

In addition, the above seat arrangement method may include, without performing the first step to the second step, a fourth step in which the seat back is folded forward to a predetermined angle by operating the reclining device via the first transmission member transmitting the operating force of the lever member by performing the first-stage operation on the lever member, a fifth step in which the slide device is shifted from the slide lock state to the slidable state by shifting the slide lock device from the non-slidable state to the unlock state by pulling the second transmission member in conjunction with the forward folding of the seat back, and a sixth step in which the seat back can be folded forward to an angle exceeding the predetermined angle when the lever member is further operated after the second step, the slide lock device is locked again by the seat back entering a fall-down state where the seat back is folded forward so as to overlap the seat cushion, and the slide device shifts to the non-slidable state as a result.

With the single lever member operated, it is also possible to shift the seat back to the fall-down state where the seat back is folded forward with respect to the seat cushion.

In addition, it is preferable that the slide lock and the seat back lock are released by the first lever operation and the seat back is folded to approximately 60 degrees (first stage).

In addition, it is preferable that the forward folding of the slide lock and the seat back is locked and the lever member is also locked with the seat back folded forward to degrees.

In addition, further forward folding of the seat back may be possible when the same lever member is operated again in the forward folding state. Then, the lever member functions as a full-flat lever (second stage).

In addition, it is preferable to provide a cam on the slide such that parts that extend and retract with the same stroke are made, the slide can be locked within a certain range, and the slide cannot be locked out of the range.

Hereinafter, the operation of switching between the walk-in state and the fall-down state using one lever member 710 and 711 will be described with reference to the drawings.

Figure 29A:
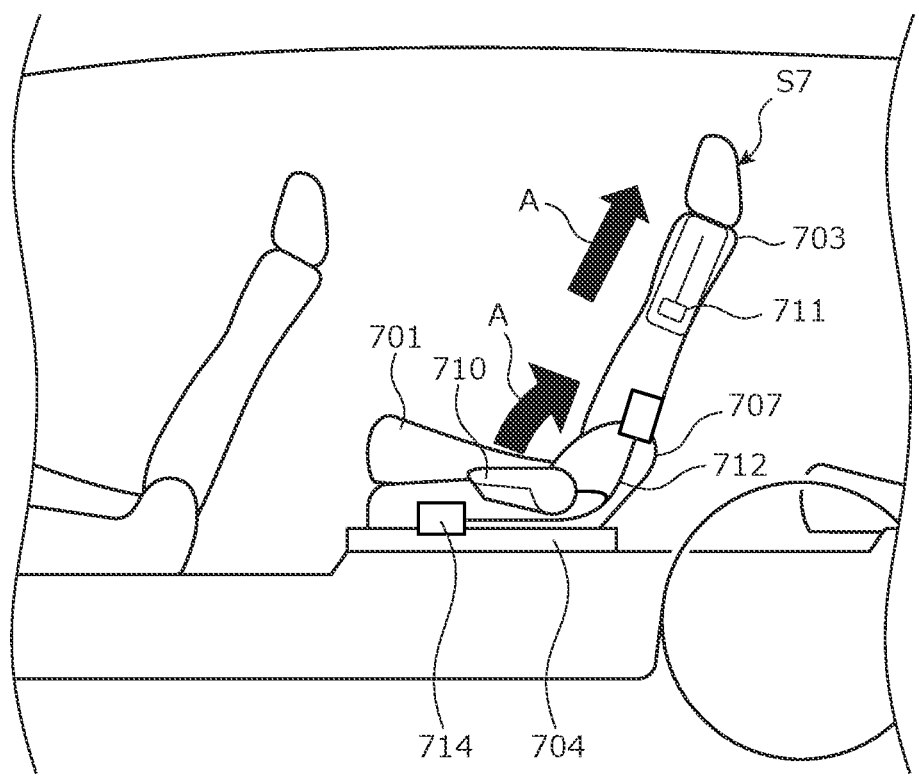
FIG. 29A is a schematic diagram illustrating a vehicle seat of a seventh embodiment.
Figure 29B:
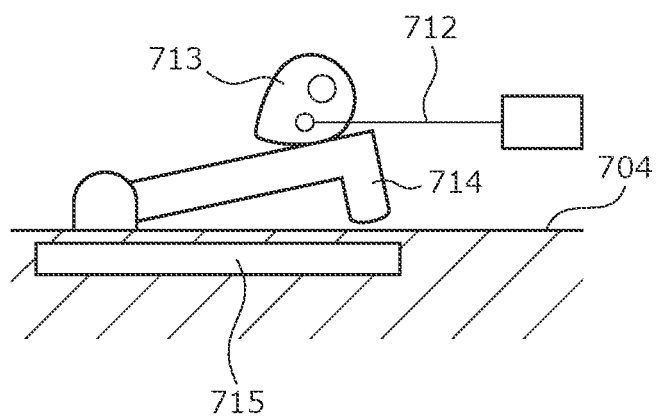
FIG. 29B is a diagram illustrating the state of a slide lock member that is in a seated state.

First, operating the lever with a seat back 703 in a seated state will be described. FIG. 29A is a schematic diagram of the vehicle seat S7, and FIG. 29B illustrates the state of a slide lock member 715 in the seated state. At this time, the slide lock member 715 provided at a rail member 704 is in a slide lock state. A slide lock release member 714 is disposed above the slide lock member 715. A cam 713 connected to the lever member 710 and 711 by a cable 712 is provided on the slide lock release member 714.

The seat back 703 is folded forward by operating the lever member 710 and 711 (pulling up in the arrow A direction in the drawing) as illustrated in FIG. 29A (first step). It should be noted that the lever member 710 and 711 may be the shoulder lever 711 disposed at the shoulder side portion of the seat back 703 or may be the reclining lever 710 for moving a reclining device 707 disposed at the side portion of a seat cushion 701. The operation is performed using either the shoulder lever 711 or the reclining lever 710.

Figure 30A:
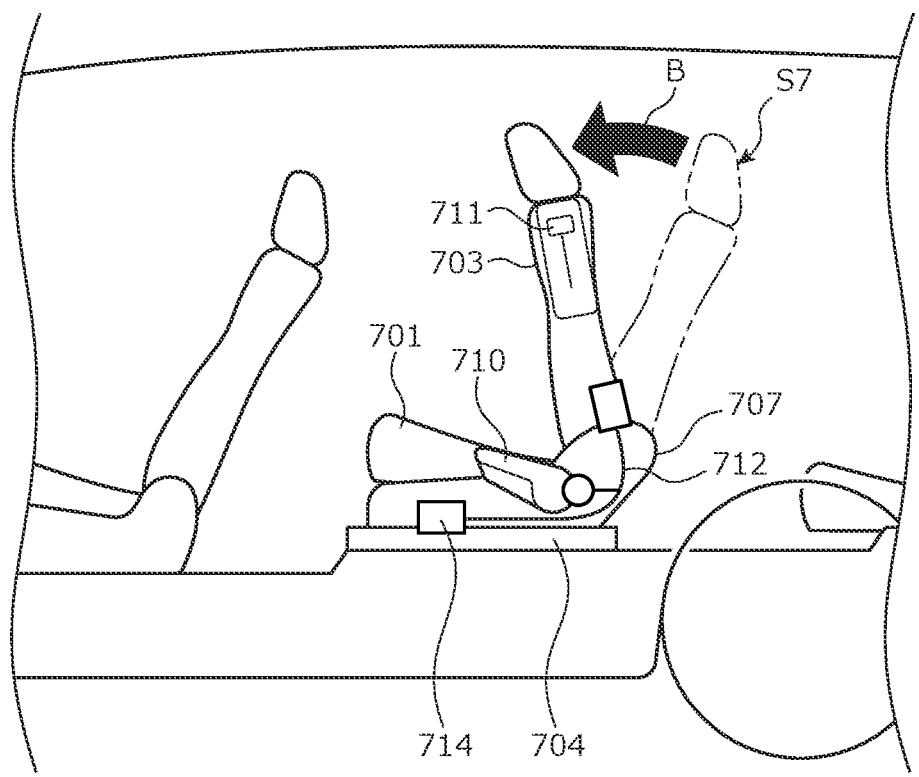
FIG. 30A is a diagram illustrating a state where a seat back is folded forward.
Figure 30B:
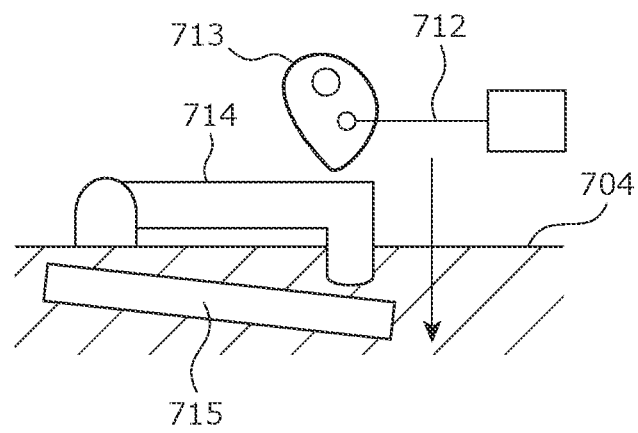
FIG. 30B is a diagram illustrating a state where a slide lock has been shifted to an unlock state.

Next, a state at a time when the seat back 703 is folded forward will be described with reference to FIGS. 30A and 30B. As illustrated in FIG. 30A, the seat back 703 is folded forward (arrow B in the drawing), and the cable 712 interlocked with the forward folding of the seat back 703 is pulled (second step). Then, as illustrated in FIG. 30B, the slide lock is shifted from a lock state to an unlock state (third step).

In other words, by pulling the cam 713 in the third step, the slide lock release member 714 pushes out the slide lock member 715 and the slide lock is shifted from a lock state to an unlock state. At this time, the stopper of the lever member is also released (fourth step).

Figure 31:
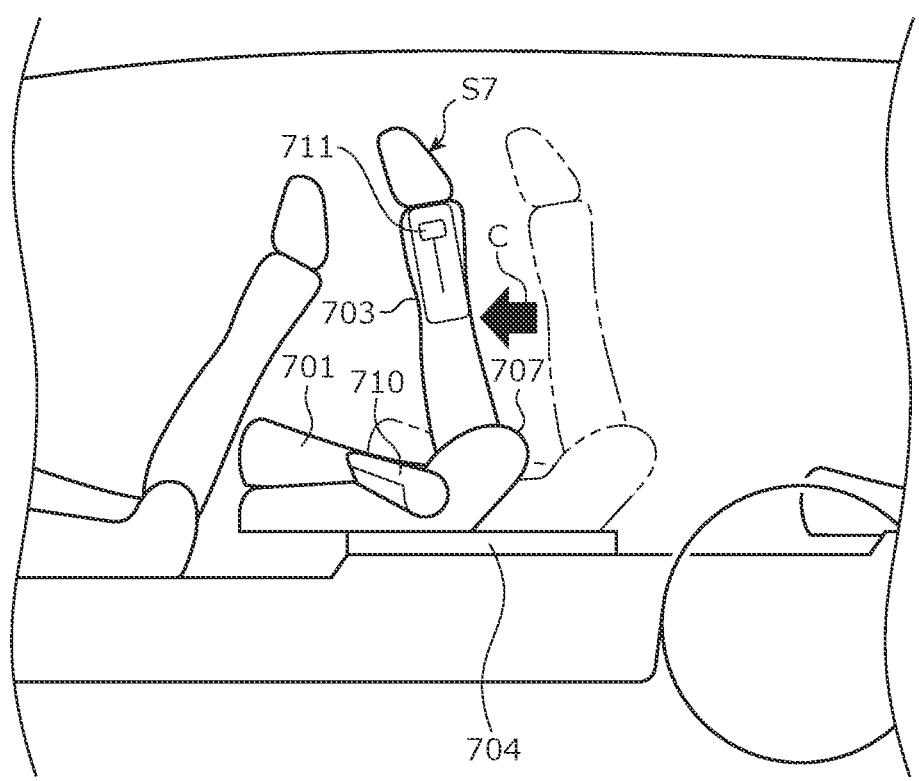
FIG. 31 is a diagram illustrating a vehicle seat that is in a walk-in state.

FIG. 31 is a diagram illustrating the vehicle seat S7 that is in a walk-in state. As a result of the third step, the entire seat becomes slidable forward and backward. By an occupant pushing out the vehicle seat S7 forward, the vehicle seat S7 moves forward. The seat shifts to the walk-in state by the movement being completed (fifth step).

Figure 32A:
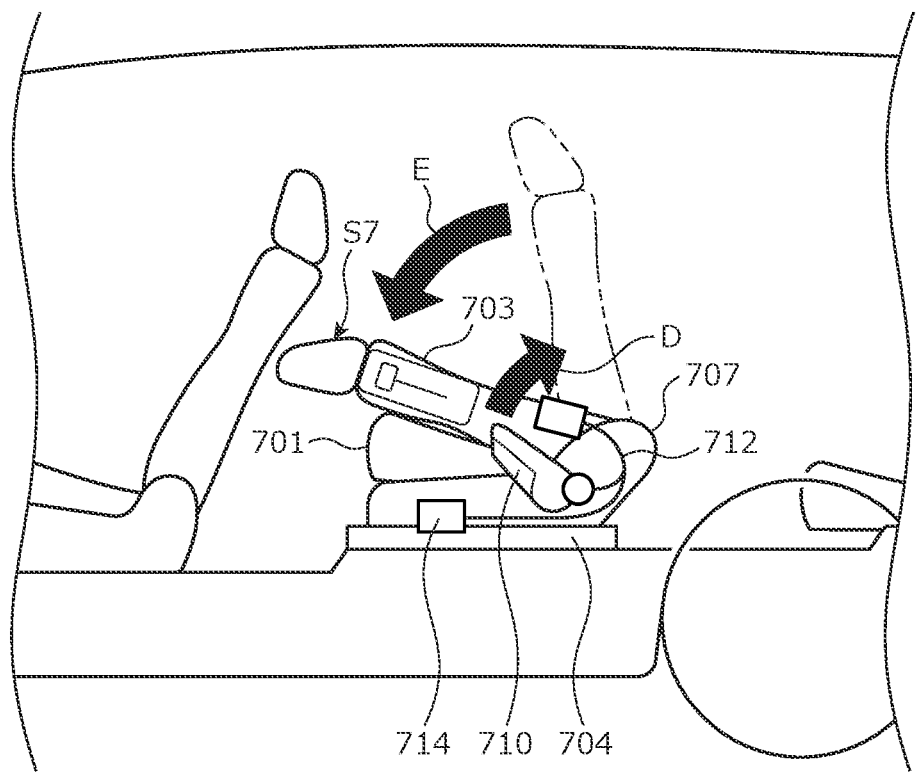
FIG. 32A is a diagram illustrating a state where a seat back is folded forward.

In addition, as illustrated in FIG. 32A, in the fifth step, the lever member is further operated (one-lever operation, pulling up in the arrow D direction in the drawing) after the fourth step. Then, the seat back 603 can be folded forward (arrow E in the drawing) (sixth step).

Figure 32B:
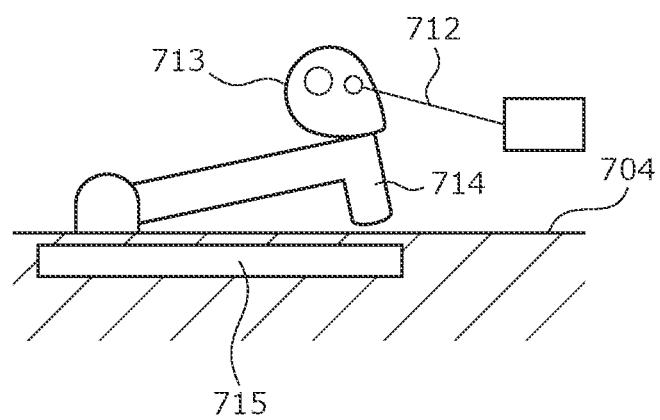
FIG. 32B is a diagram illustrating the slide lock that has been shifted to a lock state.

At this time, as illustrated in FIG. 32B, the cam 713 is further pulled and the slide lock release member 714 kicks the slide lock member 715 once, but it passes therethrough and the seat back 703 can be folded forward in the slide lock state. In other words, the cam 713 rotates and the slide is re-locked by the seat back 703 entering the forward folding state (fall-down).

Eighth Embodiment

Figure 33:
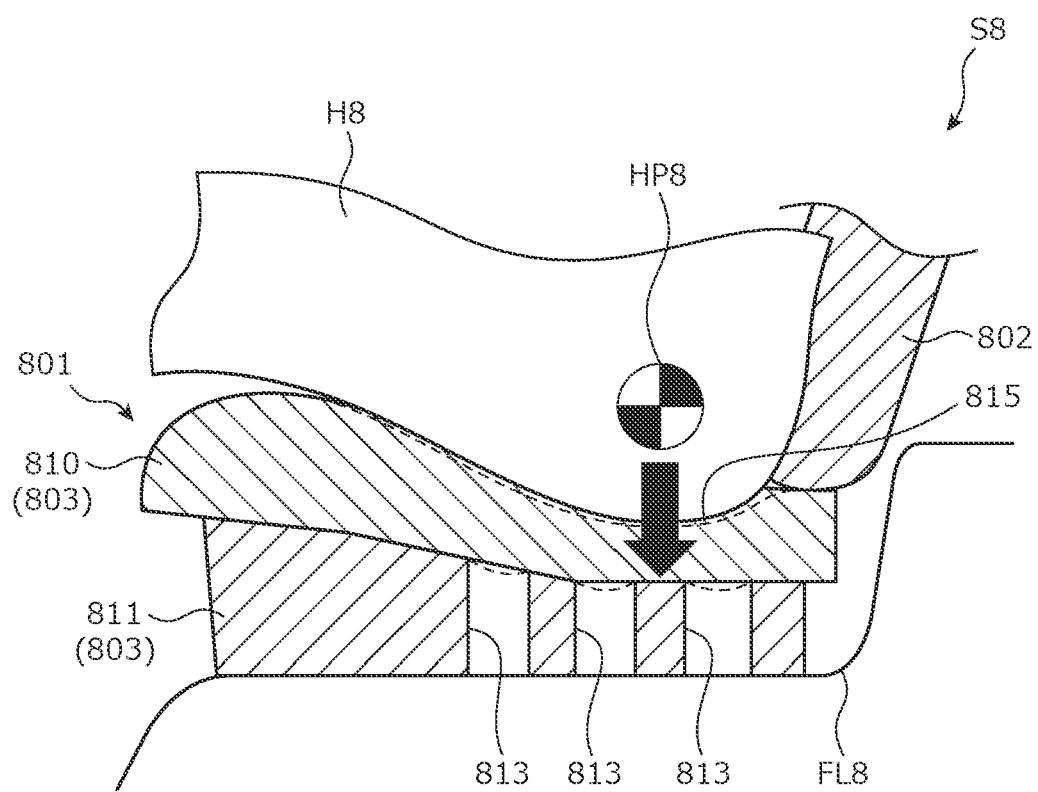
FIG. 33 is an explanatory diagram illustrating the configuration of a vehicle seat of an eighth embodiment.

Hereinafter, a vehicle seat S8 according to an eighth embodiment of the present invention will be described with reference to FIGS. 33 to 34. The vehicle seat S8 according to the eighth embodiment relates to a vehicle seat provided with a pad member and a bead foam molding member (expanded polypropylene (EPP)) for a conveyance seat.

Nowadays, bead foam molding members are used as seat cushion materials for vehicle seat weight reduction. Nowadays, seat cushions are used with urethane pads placed on bead foam molding members. However, the urethane pad is thin and the seating surface does not bend even with a seated occupant's load applied to the urethane pad, and thus a sufficient amount of sinking cannot be ensured and the seat is regarded as being poor in seating comfort and hard.

Although JP 2020-082992 A discloses a structure in which a bead foam molding member is used as a conveyance seat cushion material, a bottomed and substantially tubular lightening hole (recess) is provided, and thus the rigidity of the bead foam molding member itself may increase and a seated occupant's seating comfort may be impaired.

In addition, the cushion material as a whole does not sink simply by forming a through hole in the bead foam molding member, and thus improving a seated occupant's seating comfort is limited. Therefore, there has been a demand for a technique for improving a seated occupant's seating comfort while achieving weight reduction.

The above problems can be solved by means of a conveyance seat provided with a seat cushion having a seat pad made of a urethane pad and a bead foam molding member with an air gap provided between the urethane pad and the bead foam molding member.

Weight reduction is possible by means of the air gap between the urethane pad and the bead foam molding member. In addition, the urethane pad becomes easier to sink, and thus a seated occupant's seating comfort is improved.

In addition, in the conveyance seat described above, it is preferable that the bead foam molding member is formed with a through hole penetrating the bead foam molding member from a seating surface side to the side opposite to the seating surface and the air gap is provided at a position communicating with the through hole.

The air in the air gap can be released through the through hole when the through hole is crushed.

In addition, in the conveyance seat described above, it is preferable that the air gap is formed by a recess provided on the surface of the bead foam molding member that faces the surface of the urethane pad on the side opposite to the seating surface and the recess is formed continuously with the through hole.

The weight of the bead foam molding member can be reduced by forming the recess. In addition, by continuously providing the recess and the through hole, molding can be simplified and the air in the air gap can be released with ease.

Hereinafter, the vehicle seat S8 of the present embodiment will be described with reference to FIGS. 33 and 34. FIG. 33 is an explanatory diagram illustrating the configuration of the vehicle seat S8.

The vehicle seat S8 is configured from a seat cushion 801 and a seat back 802. The seat cushion 801 is configured from a seat pad 803 and a skin (not illustrated) covering the seat pad 803.

The seat pad 803 is configured from a bead foam molding member 811 and a urethane pad 810 placed thereon. The bead foam molding member 811 is a member harder than the urethane pad 810. In addition, as illustrated in FIG. 33, the bead foam molding member 811 is provided with a plurality of through holes 813, which penetrate the bead foam molding member 811 from a seating surface 815 side to the side opposite to the seating surface 815 (floor FL8 surface side). By forming the through holes 813, a partial rigidity of the bead foam molding member 811 decreases along the direction in which the load of a seated occupant H8 (hip point HP8) is applied. As a result, the urethane pad 810 becomes easier to sink, and thus seating comfort is improved.

Figure 34:
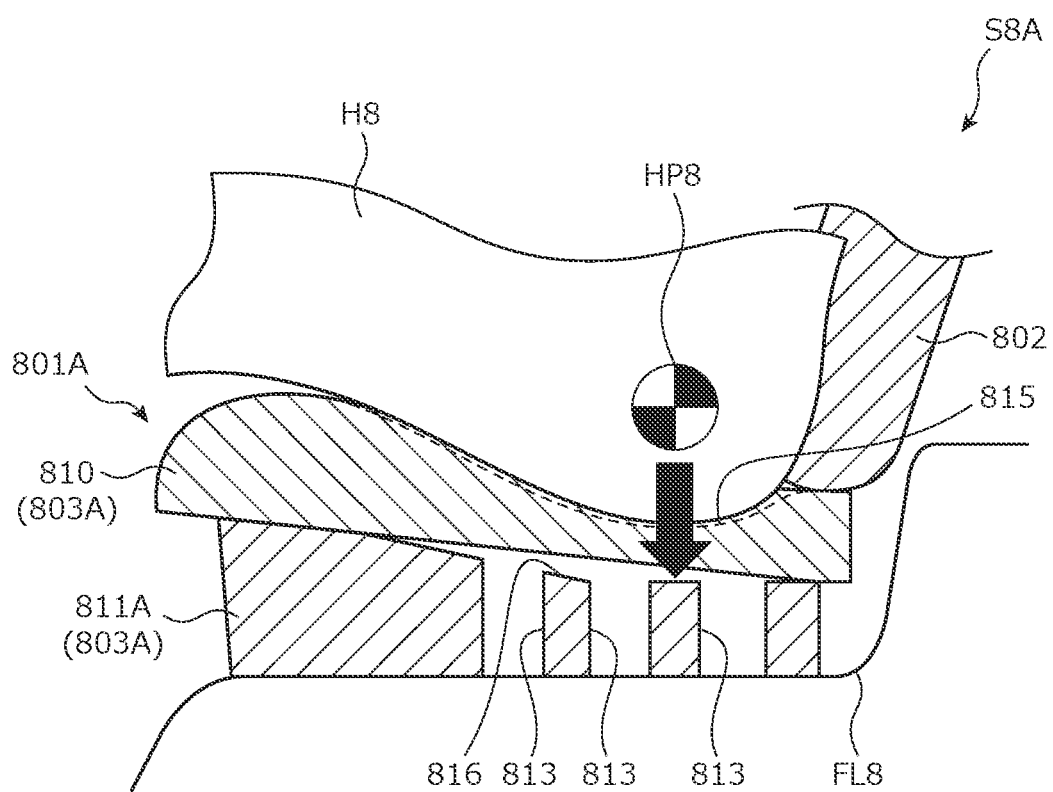
FIG. 34 is an explanatory diagram illustrating a configuration illustrating another example of the vehicle seat of the eighth embodiment.

In addition, as in a seat cushion 801A of a vehicle seat S8A illustrated in FIG. 34, an air gap 816 may be provided between the urethane pad 810 and a bead foam molding member 811A. In addition, the back surface of the urethane pad 810 may be provided with a plurality of recesses.

The weight of a seat pad 803A can be reduced by providing the air gap 816 or the recesses. In addition, the urethane pad 810 easily sinks by means of the air gap 816 or the recesses, and thus seating comfort is further improved.

Ninth Embodiment

Hereinafter, a vehicle seat S9 according to a ninth embodiment of the present invention will be described with reference to FIGS. 35 to 42.

In the related art, as in U.S. patent Ser. No. 10/086,727, a vehicle seat has a seat cushion provided with a seat cushion pad where urethane foam and a bead foam molding member are stacked in upper and lower layers, respectively. In addition, Japanese Patent No. 6263509 discloses a vehicle seat provided with a detection sensor detecting that a seated occupant is seated on the vehicle seat.

There has been a demand for means for fixing a vehicle seat to a vehicle body floor using a bead foam molding member harder than urethane foam.

The above problems can be solved by means of a conveyance seat of the ninth embodiment provided with a seat cushion having a urethane pad member provided in an upper layer and a bead foam molding member (EPP) provided in a lower layer and harder than the urethane pad member, in which the bead foam molding member is provided with a recess corresponding to a lateral bead formed on a vehicle body floor.

Further, in the conveyance seat described above, it is preferable that the recess is provided with a seat belt through hole.

In the conveyance seat described above, it is preferable that a side step portion formed at the side portion of the bead foam molding member is formed deeper than a recess formed on the vehicle body floor.

In the conveyance seat described above, it is preferable that the bead foam molding member is formed with a wire passage hole for a seat belt reminder.

In addition, in the conveyance seat described above, it is preferable to form three wire passage holes for the seat belt reminder and form grooves allowing each to pass at once.

In the conveyance seat described above, it is preferable that an insert wire for bead foam molding member molding is provided with a locking portion for skin hooking.

In the conveyance seat described above, a vehicle body fixing portion on the front side of the bead foam molding member and a belt through hole may overlap in the front to back direction. In addition, the vehicle body fixing portion and the belt through hole may not overlap.

In the conveyance seat described above, it is preferable that an insert wire positioned behind the seat cushion is continuous with a skin locking portion in front of the seat cushion.

In addition, the configuration of the seat cushion of the conveyance seat described above may be applied to a seat back cushion having a shape (recess or the like) corresponding to the vehicle body frame.

Figure 35:
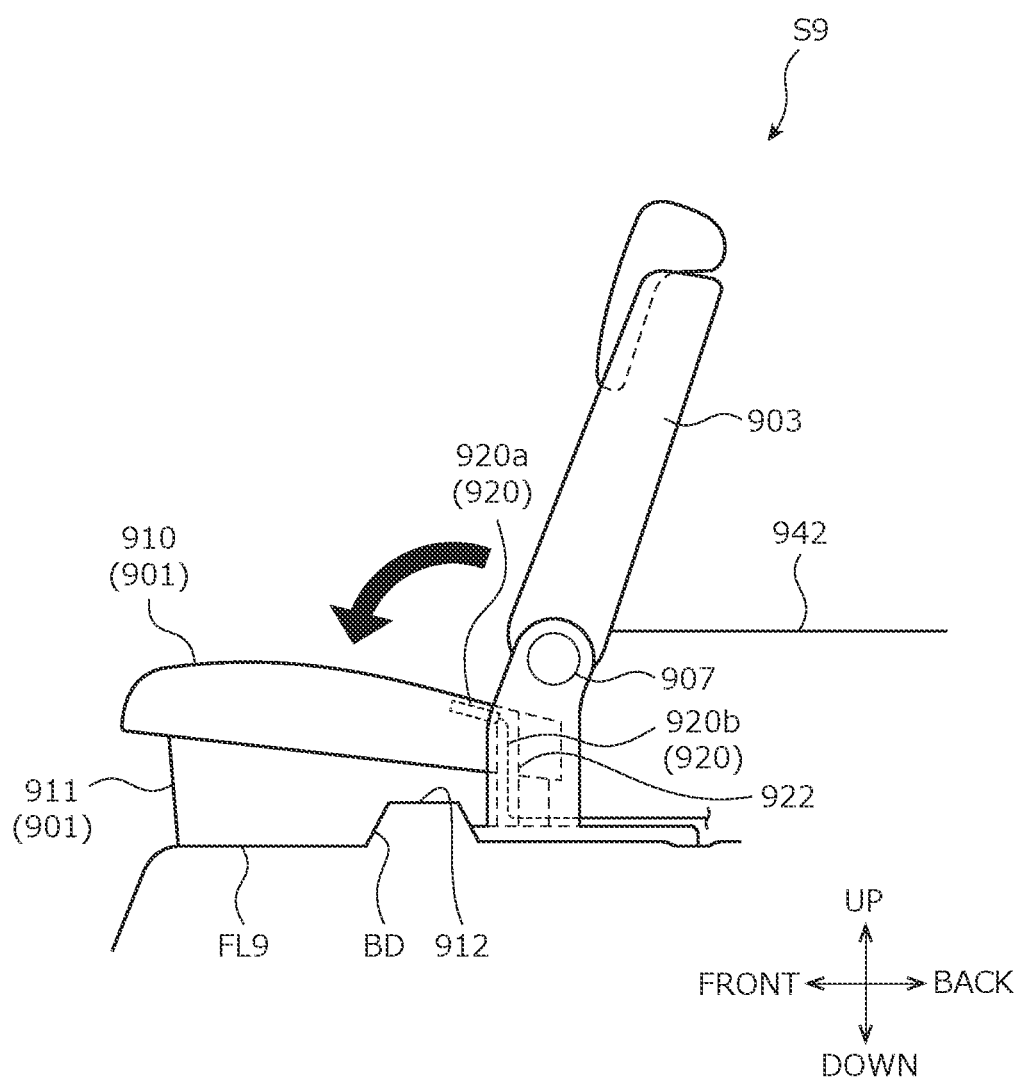
FIG. 35 is a side view of a vehicle seat according to a first example of a ninth embodiment.
Figure 36A:
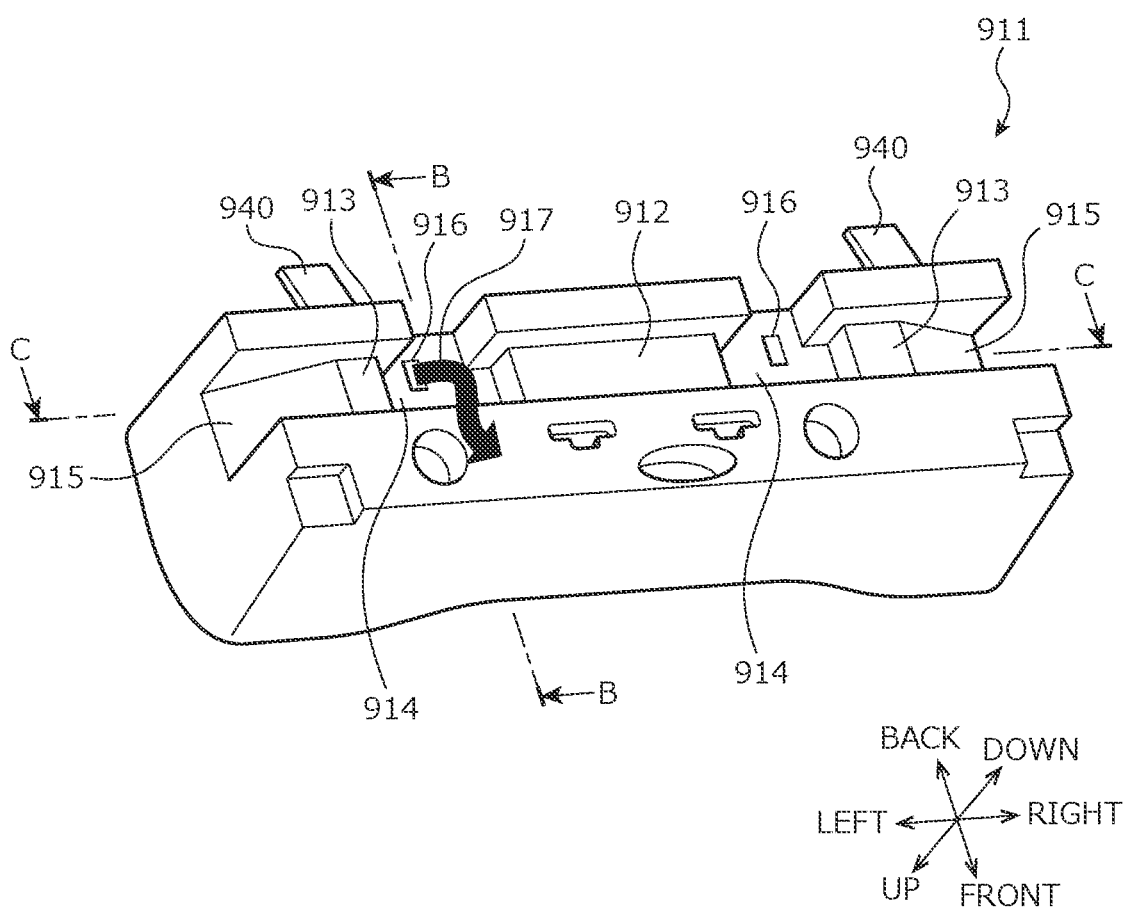
FIG. 36A is a perspective view in which a bead foam molding member is viewed from below.
Figure 36B:
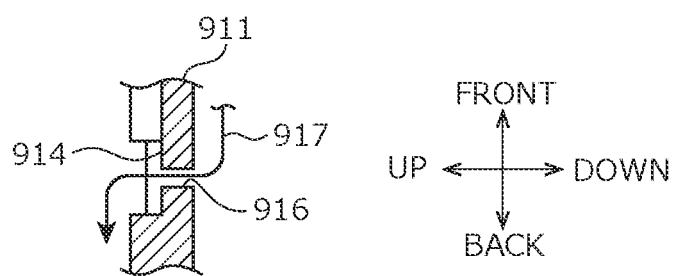
FIG. 36B is a schematic cross-sectional view taken along line B-B of FIG. 36A and is a diagram illustrating a belt through hole.
Figure 36C:
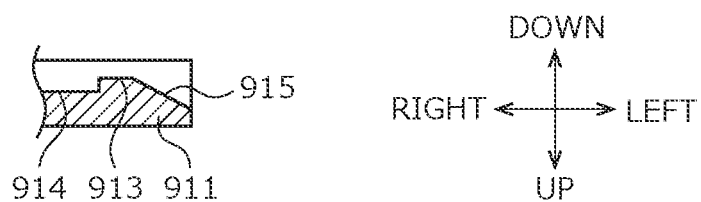
FIG. 36C is a schematic cross-sectional view taken along line C-C of FIG. 36A and is a diagram illustrating a side step portion.
Figure 37:
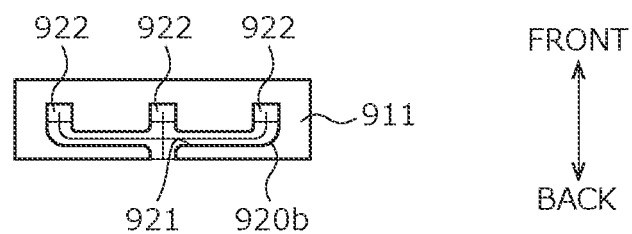
FIG. 37 is a schematic diagram illustrating a groove and a through hole for passing a seat belt reminder sensor cable.

FIGS. 35 to 42 relate to the ninth embodiment of the present invention, and FIG. 35 is a side view of the vehicle seat S9. FIG. 36 is a perspective view in which a bead foam molding member 911 configuring the seat pad of the vehicle seat S9 as a first example of the ninth embodiment is viewed from the back. FIG. 36B is a schematic cross-sectional view taken along line B-B of FIG. 36A and illustrating a belt through hole. FIG. 36C is a schematic cross-sectional view taken along line C-C of FIG. 36A and illustrating a side step portion. FIG. 37 is a schematic diagram illustrating a groove and a through hole for passing a seat belt reminder sensor cable.

Figure 38A:
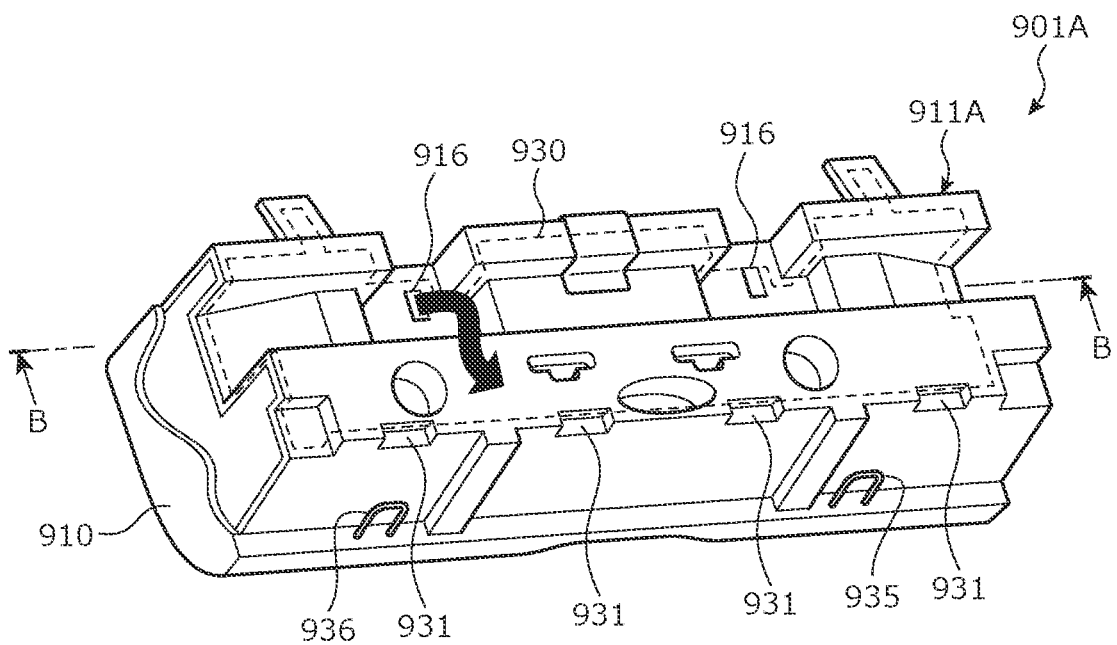
FIG. 38A is a diagram illustrating a second example of the ninth embodiment and is a perspective view in which a seat cushion is viewed from below.
Figure 38A:
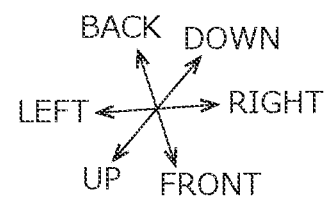
Figure 38B:
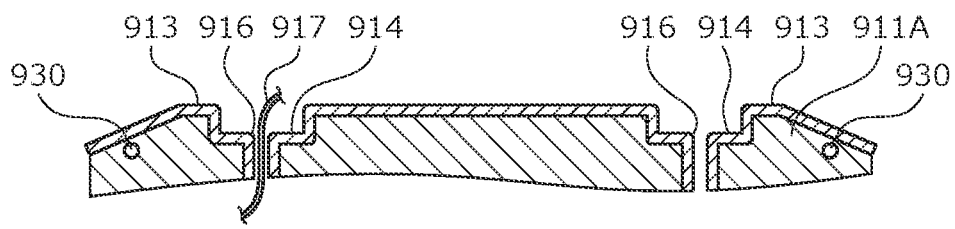
FIG. 38B is a schematic cross-sectional view taken along line B-B of FIG. 38A.
Figure 39:
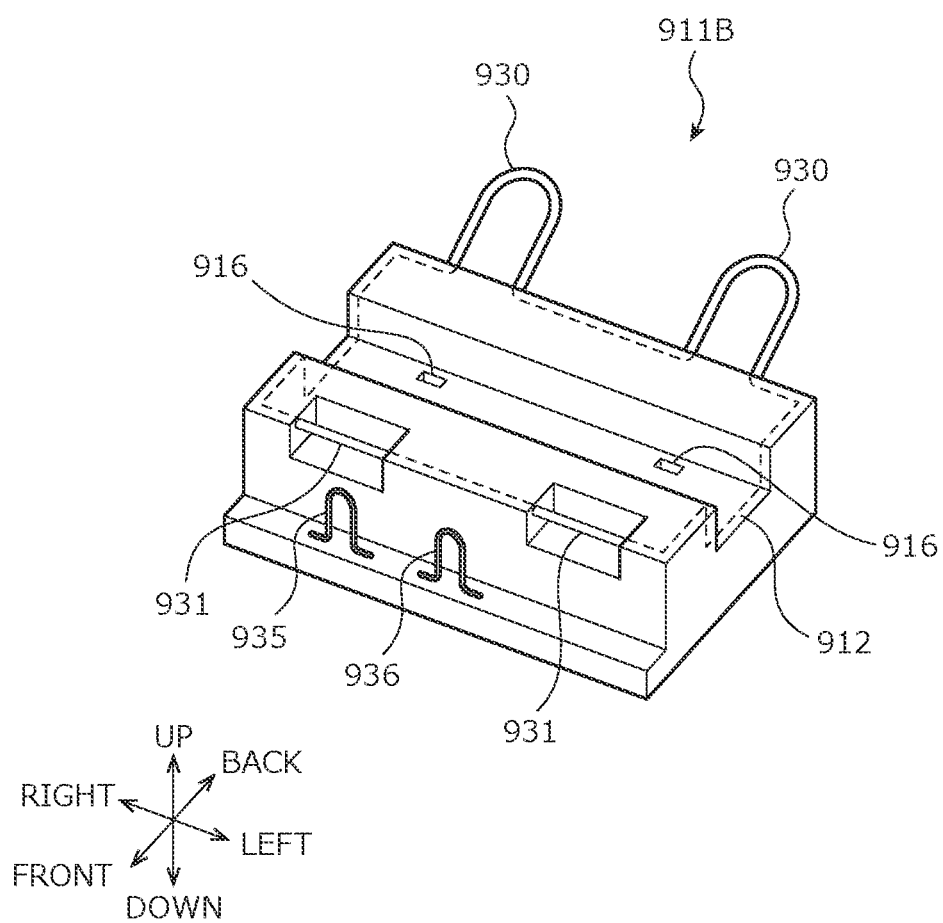
FIG. 39 is a perspective view in which a bead foam molding member used in a vehicle seat of a third example of the ninth embodiment is viewed from below.
Figure 40:
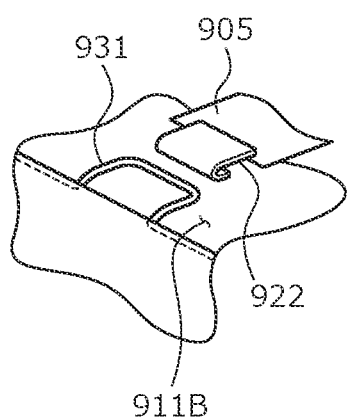
FIG. 40 is a perspective view illustrating a skin locking portion and a hook provided on a skin.
Figure 41:
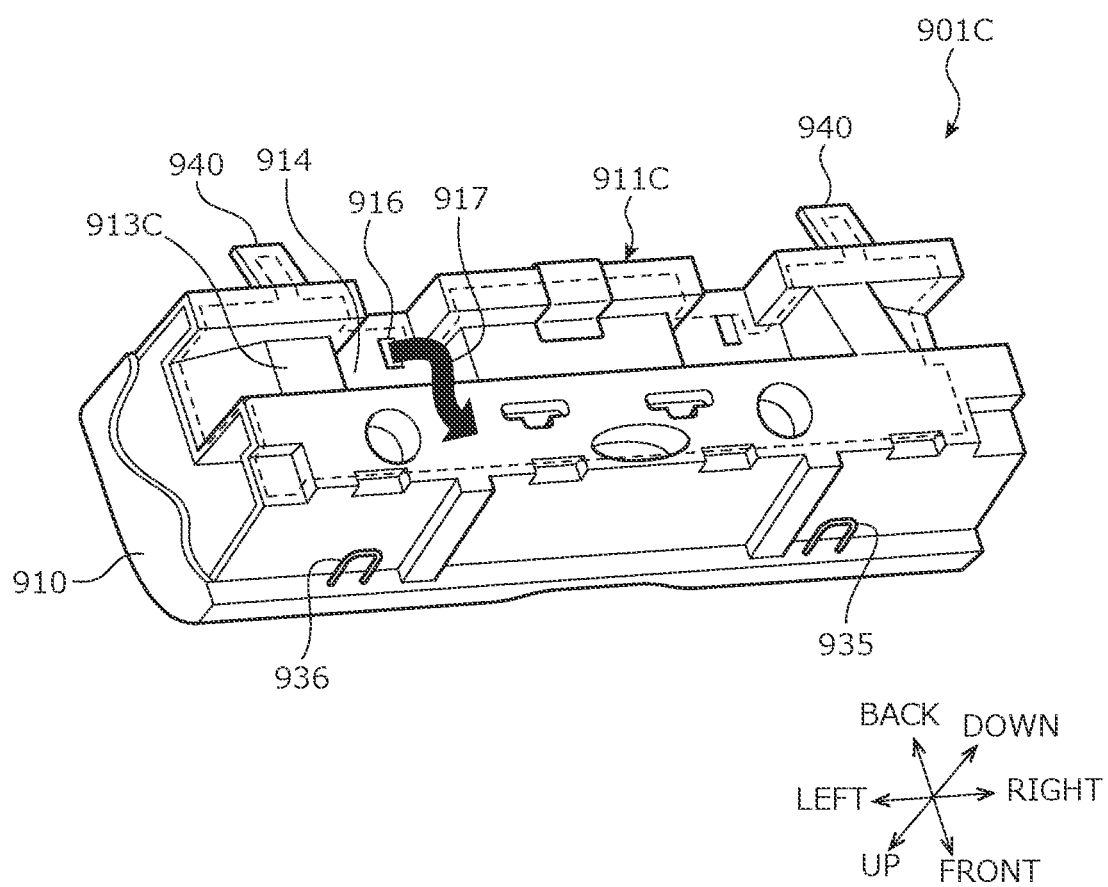
FIG. 41 is a bottom perspective view illustrating a bead foam molding member used in a vehicle seat that is a fourth example of the ninth embodiment.
Figure 42:
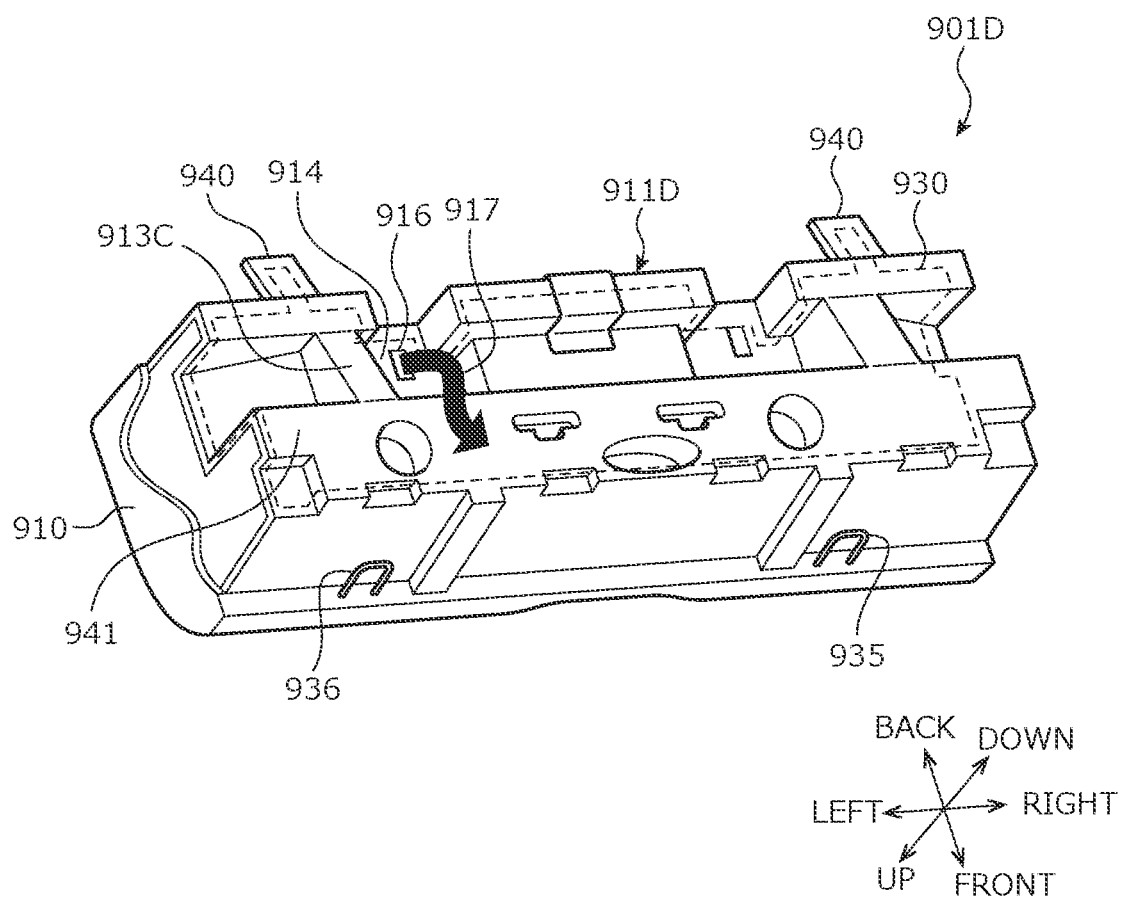
FIG. 42 is a bottom perspective view illustrating a bead foam molding member used in a vehicle seat that is a fifth example of the ninth embodiment.

FIG. 38A is a diagram illustrating a second example of the ninth embodiment and is a perspective view in which a seat cushion 901A is viewed from below, and FIG. 38B is a schematic cross-sectional view taken along line B-B of FIG. 38A. FIG. 39 is a perspective view in which a bead foam molding member 911B used in a vehicle seat of a third example of the ninth embodiment is viewed from below. FIG. 40 is a perspective view illustrating a skin locking portion 931 provided on the bead foam molding member 911B and a hook 932 provided on a skin 905. FIG. 41 is a bottom perspective view illustrating a bead foam molding member 911C used in a vehicle seat that is a fourth example of the ninth embodiment. FIG. 42 is a bottom perspective view illustrating a bead foam molding member 911D used in a vehicle seat that is a fifth example of the ninth embodiment.

As illustrated in FIG. 35, the vehicle seat S9 is configured from a seat cushion 901 and a seat back 903, and the seat cushion 901 is configured from a urethane pad member 910 provided in an upper layer and the bead foam molding member 911 (EPP) provided in a lower layer. The bead foam molding member 911 is a material harder than the urethane pad member 910.

The seat back 903 can be tilted forward by a reclining mechanism 907. By the seat back 903 being tilted forward, the back surface of the seat back 903 has the same height as a luggage compartment line 942.

A lateral bead BD is formed on a floor FL9 of the vehicle. A recess 912 corresponding to the shape of the lateral bead BD is formed in the bead foam molding member 911, and the vehicle seat S9 is attached by fitting the recess 912 into the lateral bead BD.

As illustrated in FIG. 35, a sensor main body portion 920a of a seat belt reminder 920 is placed beneath the seating surface of the urethane pad member 910. A through hole 922 for wire passage is formed through the urethane pad member 910 and the bead foam molding member 911, and a cable portion 920b extending from the sensor main body portion 920a is inserted and connected to an ECU.

As illustrated in FIG. 36A, the recess 912 is formed with a first recess 913 and a second recess 914 deeper than the first recess 913. In addition, a seat belt through hole 916 is formed in the second recess 914, and a seat belt 917 can be passed as illustrated in FIG. 36B.

In addition, side step portions 915 are formed at both right and left end portions of the recess 912 and are formed so as to be deeper than the other parts of the recess 912, that is, the first recess 913 and the second recess 914.

In addition, as illustrated in FIG. 37, the bead foam molding member 911 is formed with three through holes 922 for wire passage of the seat belt reminder 920, and a groove 921 for passing the cable portion 920b at once is formed in each of the through holes 922.

FIG. 38A illustrates the seat cushion 901A that is the second example of the present embodiment. An insert wire 930 is provided on the bottom surface of a bead foam molding member 911A to mold the bead foam molding member 911A (see FIG. 38B). Preferably, the insert wire 930 is provided with a locking portion for skin hooking.

FIG. 39 illustrates the bead foam molding member 911B used in a seat cushion 901B that is the second example. The bead foam molding member 911B is covered with the urethane pad member 910 softer than the bead foam molding member 911B. In other words, the seat cushion 901B is molded in two layers with the bead foam molding member 911B and the urethane pad member 910.

The insert wire 930 positioned behind the seat cushion 901A may be continuous with the skin locking portion 931 in front of the seat cushion as in the bead foam molding member 911B illustrated in FIG. 39. The hook 932 is provided at an end portion of the skin 905 as illustrated in FIG. 40. The skin 905 is attached by the hook 932 catching the skin locking portion 931 formed by the insert wire 930 exposed from the bead foam molding member 911B.

In addition, as illustrated in FIG. 39, a first vehicle body fixing portion 935 provided on the front side of the bead foam molding member 911D and the seat belt through hole 916 may overlap in the front to back direction. In addition, as in a second vehicle body fixing portion 936 and the seat belt through hole 916, those may not overlap in the front to back direction.

FIG. 41 illustrates the bead foam molding member 911C used in a seat cushion 901C of the vehicle seat that is the fourth example of the present embodiment. As illustrated in FIG. 41, it is preferable that the end portions in the right to left direction of a first recess 913C formed in the recess 912 of the bead foam molding member 911C are disposed outside the end portions of an insertion portion 940 in the right to left direction.

In addition, FIG. 42 illustrates the bead foam molding member 911D used in a seat cushion 901D of the vehicle seat that is the fifth example of the present embodiment. As illustrated in FIG. 42, it is preferable that the end portions in the front to back direction of a first recess 913D formed in the recess 912 are formed at the same height as a reference surface 941.

The seat cushion of the ninth embodiment has been described above with reference to the drawings. The configuration of the seat cushion may be applied to a seat back cushion that has a shape (recess or the like) corresponding to a vehicle body frame.

Tenth Embodiment

Hereinafter, a tenth embodiment will be described with reference to the drawings. The tenth embodiment relates to a conveyance seat, a sensor-equipped conveyance seat in particular.

Known in the related art is a vehicle seat that is installed in a conveyance such as an automobile and equipped with a pressure sensor or the like to estimate a seated occupant's state (see JP 2019-151251 A).

Meanwhile, another known vehicle seat includes a seat cushion that has a two-layer structure in which a seat pad made of expanded resin (EPP) is disposed below a seat pad made of urethane foam for seating comfort improvement (see JP 2018-158096 A).

In a case where a biosensor for biological information measurement is disposed at a cushion pad configured with a two-layer structure as in JP 2018-158096 A, depending on the shape of the seat pad made of EPP, the biosensor may not be firmly supported, the amount of deflection of the cushion pad in a case where pressure is applied may vary depending on the location, and measurement results of the biosensor may be affected.

The conveyance seat that is the tenth embodiment has been made in view of the above problems, and an object thereof is to provide a conveyance seat that has a sensor firmly supported on a cushion pad configured with a two-layer structure.

The above problems can be solved by the conveyance seat of the tenth embodiment including a seat cushion having a cushion pad and a sensor disposed on the cushion pad, in which the cushion pad has a first pad member and a second pad member disposed below and overlapping the first pad member and harder than the first pad member, the second pad member has a support portion abutting against the first pad member and supporting the first pad member, and the sensor at least partially overlaps the support portion of the second pad member in the up to down direction and is disposed on the first pad member.

According to the conveyance seat of the present invention configured as described above, a part of the sensor overlaps at least the support portion of the second pad member in the up to down direction, and thus the sensor is firmly supported. Therefore, it is possible to provide a conveyance seat that has a sensor firmly supported even on a cushion pad configured with a two-layer structure.

In the conveyance seat described above, it is preferable that the sensor is disposed on the first pad member with the entire surface of the sensor overlapping the support portion in the up to down direction.

The sensor is stably supported by the sensor being disposed with the entire surface of the sensor overlapping the support portion in the up to down direction.

In the conveyance seat described above, it is preferable that the support portion is divided into a plurality of portions by a hole portion formed in an abutting surface abutting against the first pad member and the sensor is disposed on the first pad member so as to span the adjacent support portions.

The sensor is stably supported by the sensor being disposed so as to span the adjacent support portions.

In the conveyance seat described above, it is preferable that the support portion is divided into a plurality of portions by a hole portion formed in an abutting surface abutting against the first pad member and the sensor is disposed on the first pad member so as to span the hole portion sandwiching the support portion.

The sensor is stably supported by the sensor being disposed on the first pad member so as to span the hole portion sandwiching the support portion.

In the conveyance seat described above, it is preferable that the abutting surface of the support portion abutting against the first pad member includes an inclined portion inclined with respect to a seat front to back direction and the sensor is disposed on the first pad member to overlap the inclined portion in the up to down direction.

By the sensor being disposed on the first pad member to overlap the inclined portion in the up to down direction, the range in which the sensor can be stably disposed is widened.

In the conveyance seat described above, it is preferable that the abutting surface of the support portion abutting against the first pad member includes a curved portion that is curved and the sensor is disposed on the first pad member to overlap the curved portion in the up to down direction.

By the sensor being disposed on the first pad member to overlap the curved portion in the up to down direction, the range in which the sensor can be stably disposed is widened.

In the conveyance seat described above, it is preferable that a harness connected to the sensor is provided and the harness is disposed on the first pad to overlap the support portion of the second pad member in the up to down direction.

Harness deflection is suppressed by the harness being disposed to overlap the support portion in the up to down direction.

In the conveyance seat described above, it is preferable that the conveyance seat has a sensor separate from the sensor and the separate sensor is disposed on the first pad member without overlapping the support portion of the second pad member in the up to down direction.

By the separate sensor being disposed without overlapping the support portion in the up to down direction, a sensor can be disposed at a position necessary for measurement.

In the conveyance seat described above, it is preferable that the first pad member is made of urethane foam and the second pad member is made of expanded polypropylene.

The seating comfort of the seat is improved by the first pad member being configured from urethane foam.

According to the conveyance seat of the tenth embodiment, a part of the sensor overlaps at least the support portion of the second pad member in the up to down direction, and thus the sensor is firmly supported. Therefore, it is possible to provide a conveyance seat that has a sensor firmly supported even on a cushion pad configured with a two-layer structure.

In addition, the sensor is stably supported by the sensor being disposed with the entire surface of the sensor overlapping the support portion in the up to down direction.

In addition, the sensor is stably supported by the sensor being disposed so as to span the adjacent support portions.

In addition, the sensor is stably supported by the sensor being disposed on the first pad member so as to span the hole portion sandwiching the support portion.

In addition, by the sensor being disposed on the first pad member to overlap the inclined portion in the up to down direction, the range in which the sensor can be stably disposed is widened.

In addition, by the sensor being disposed on the first pad member to overlap the curved portion in the up to down direction, the range in which the sensor can be stably disposed is widened.

Harness deflection is suppressed by the harness being disposed to overlap the support portion in the up to down direction.

In addition, by the separate sensor being disposed without overlapping the support portion in the up to down direction, a sensor can be disposed at a position necessary for measurement.

In addition, the seating comfort of the seat is improved by the first pad member being configured from urethane foam.

Hereinafter, the configuration of a conveyance seat according to the tenth embodiment (present embodiment) will be described with reference to the drawings. However, the embodiment described below is an example for easy understanding of the present invention and does not limit the present invention. In other words, the present invention can be modified and improved without departing from the spirit thereof, and it is a matter of course that the present invention includes equivalents thereof.

It should be noted that in the following description, a vehicle seat will be taken as an example of the conveyance seat and configuration examples thereof will be described. However, the present invention is not limited to the vehicle seat mounted in a wheeled ground conveyance such as automobiles and railway vehicles and may be a seat mounted in non-ground conveyances such as aircraft and ships.

In addition, in the following description, "front to back direction" is the front to back direction of the vehicle seat and coincides with the direction of travel of the vehicle that travels. In addition, "seat width direction" is the width direction of the vehicle seat and coincides with the right to left direction seen from an occupant seated in the vehicle seat. In addition, "up to down direction" is the up to down direction of the vehicle seat, which coincides with the vertical direction when the vehicle travels on a horizontal surface.

In addition, in the following description, in a case where various directions are described with "seat" as in "seat width direction" and "seat height direction", the directions are indicated with respect to the vehicle seat. In the case of descriptions with "vehicle" such as "vehicle inner side" and "vehicle outer side", the directions are indicated with respect to the vehicle.

In addition, unless otherwise specified, the shape, position, posture, and so on of each portion of the vehicle seat described below are on the assumption that the vehicle seat is in a seated state, which will be described later.

<Basic Configuration of Vehicle Seat>

Figure 43:
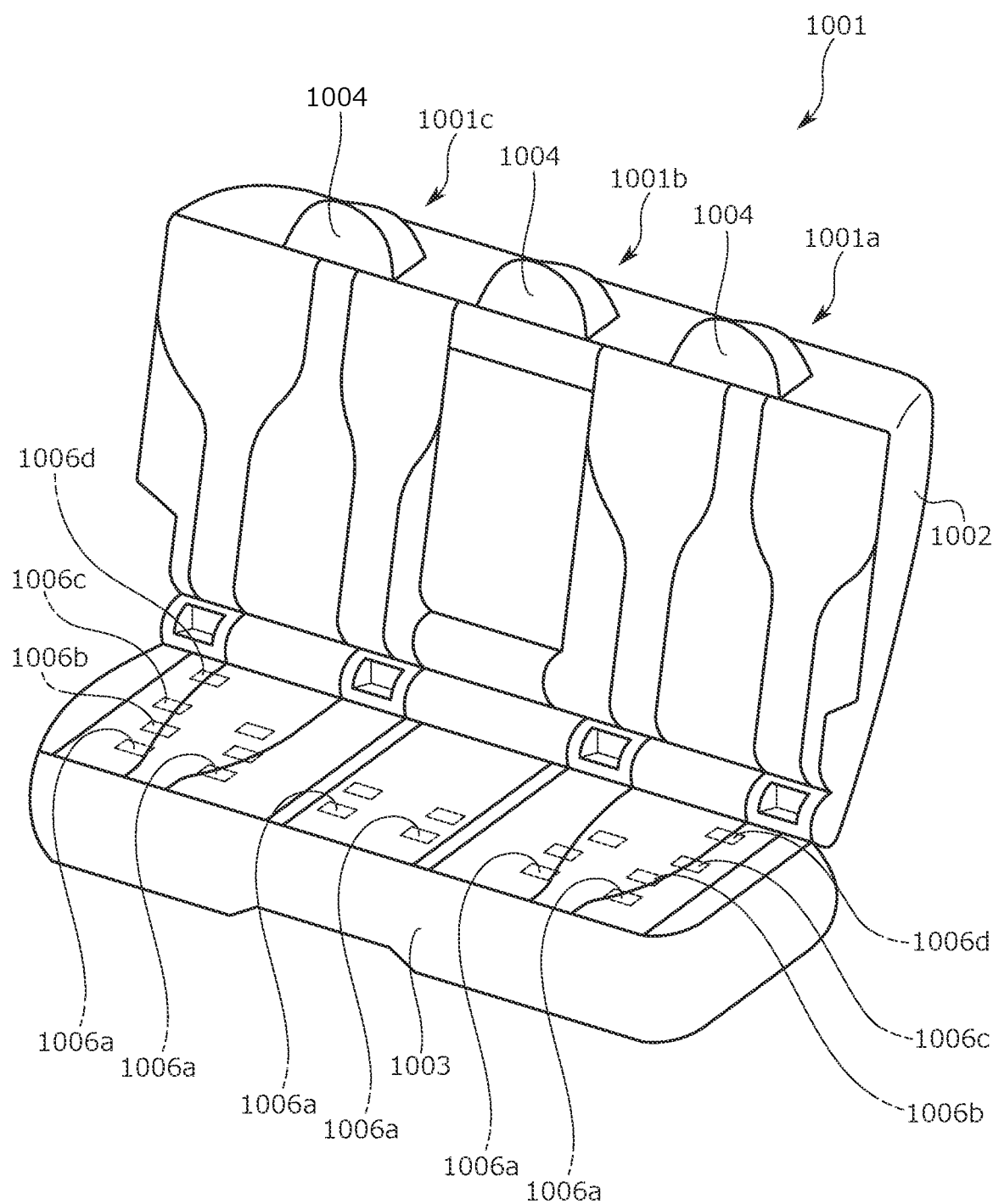
FIG. 43 is a perspective view illustrating a vehicle seat according to a tenth embodiment.

As illustrated in FIG. 43, a vehicle seat 1001 is an automotive rear seat where three persons can sit. The vehicle seat 1001 is configured from a left seat 1001a, a middle seat 1001b, and a right seat 1001c. Further, each of the seats 1001a to 1001c of the vehicle seat 1001 includes a seat back 1002, a seat cushion 1003, and a headrest 1004. It should be noted that the vehicle seat 1001 is not limited to the rear seat. The vehicle seat 1001 may be a front seat corresponding to a front seat of a vehicle and can also be used as a second-row middle seat or a third-row rear seat in a vehicle that has three rows of seats in the front to back direction.

The seat back 1002 is a part of the vehicle seat 1001 and supports an occupant's back and lumbar. The seat cushion 1003 is a part of the vehicle seat 100 and supports a seated occupant's buttocks and thighs. The headrest 1004 is a part of the vehicle seat 1001 and supports a seated occupant's head.

Figure 44:
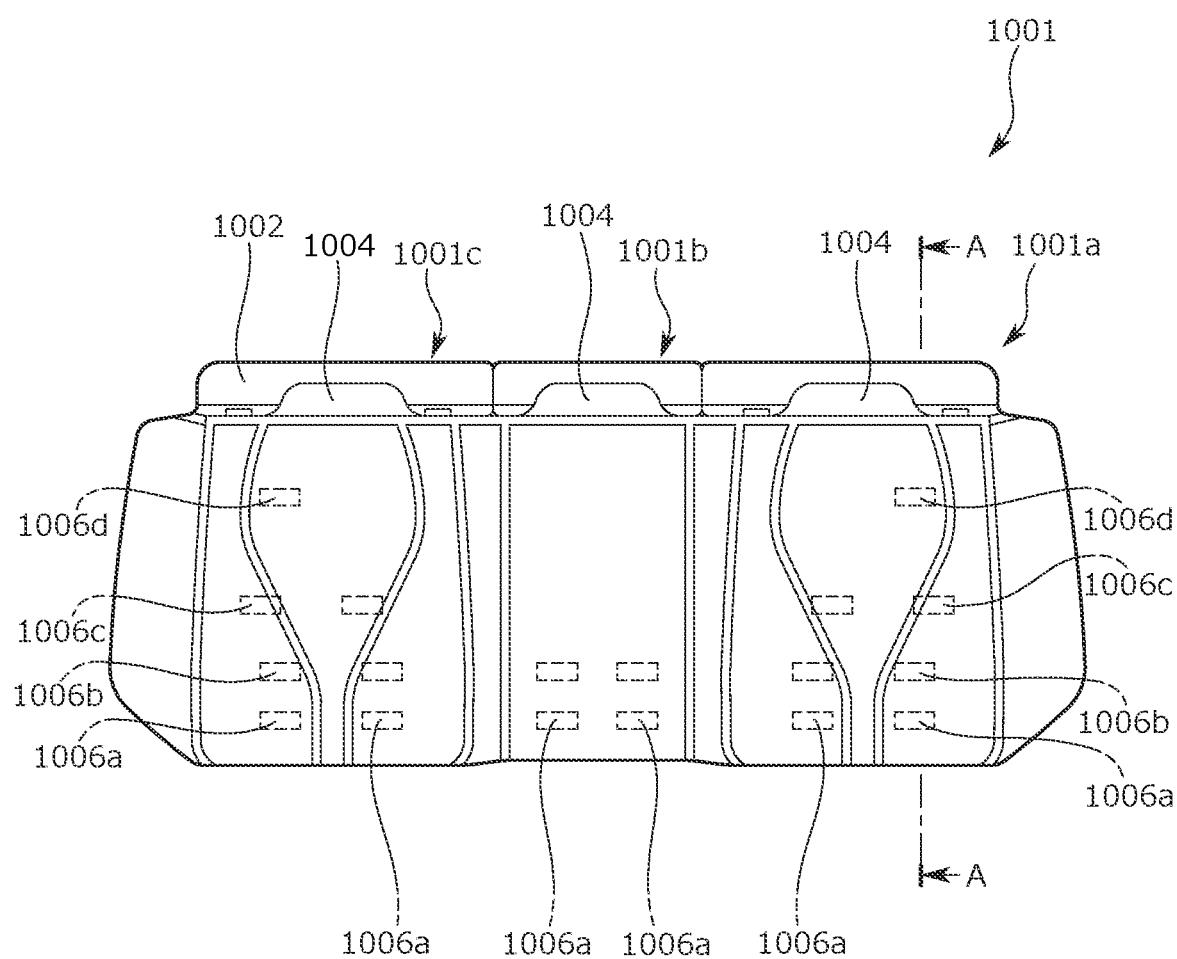
FIG. 44 is a top view of the vehicle seat.
Figure 45:
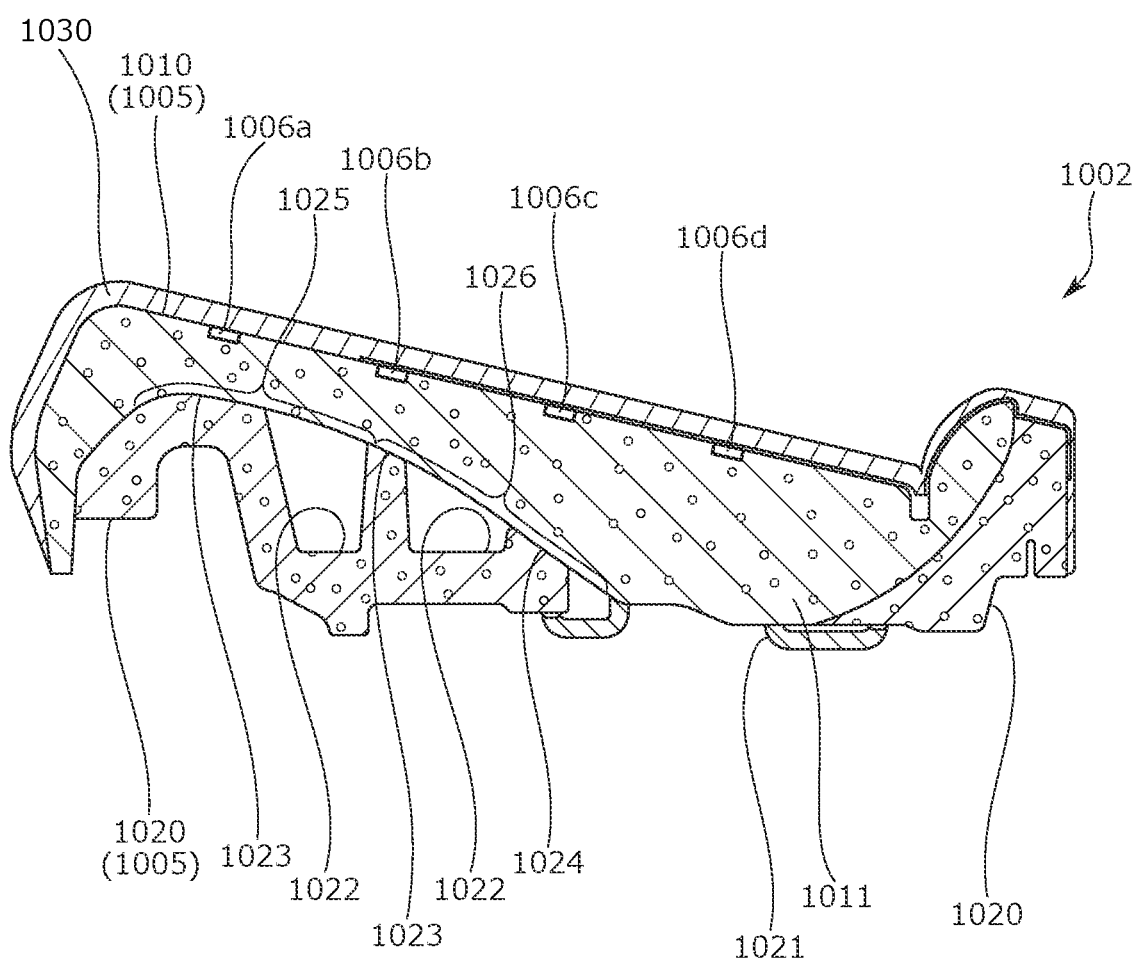
FIG. 45 is a cross-sectional view taken along line A-A of FIG. 44.

As illustrated in FIGS. 44 and 45, the seat cushion 1003 is configured mainly from a cushion pad 1005, a skin 1030, and a plurality of biosensors 1006a to 1006d disposed on the cushion pad 1005. Specifically, the seat cushion 1003 is configured by the skin 1030 covering the cushion pad 1005 having an upper surface where the biosensors 1006a to 1006d are placed.

As illustrated in FIG. 45, the cushion pad 1005 is configured from a first pad member 1010 and a second pad member 1020 made of a material harder than the first pad member 1010. It should be noted that the first pad member 1010 is disposed on the second pad member 1020. In other words, the first pad member 1010 is supported by the second pad member 1020 from below.

<First Pad Member>

Here, the configuration of the first pad member 1010 of the cushion pad 1005 will be described.

Figure 46:
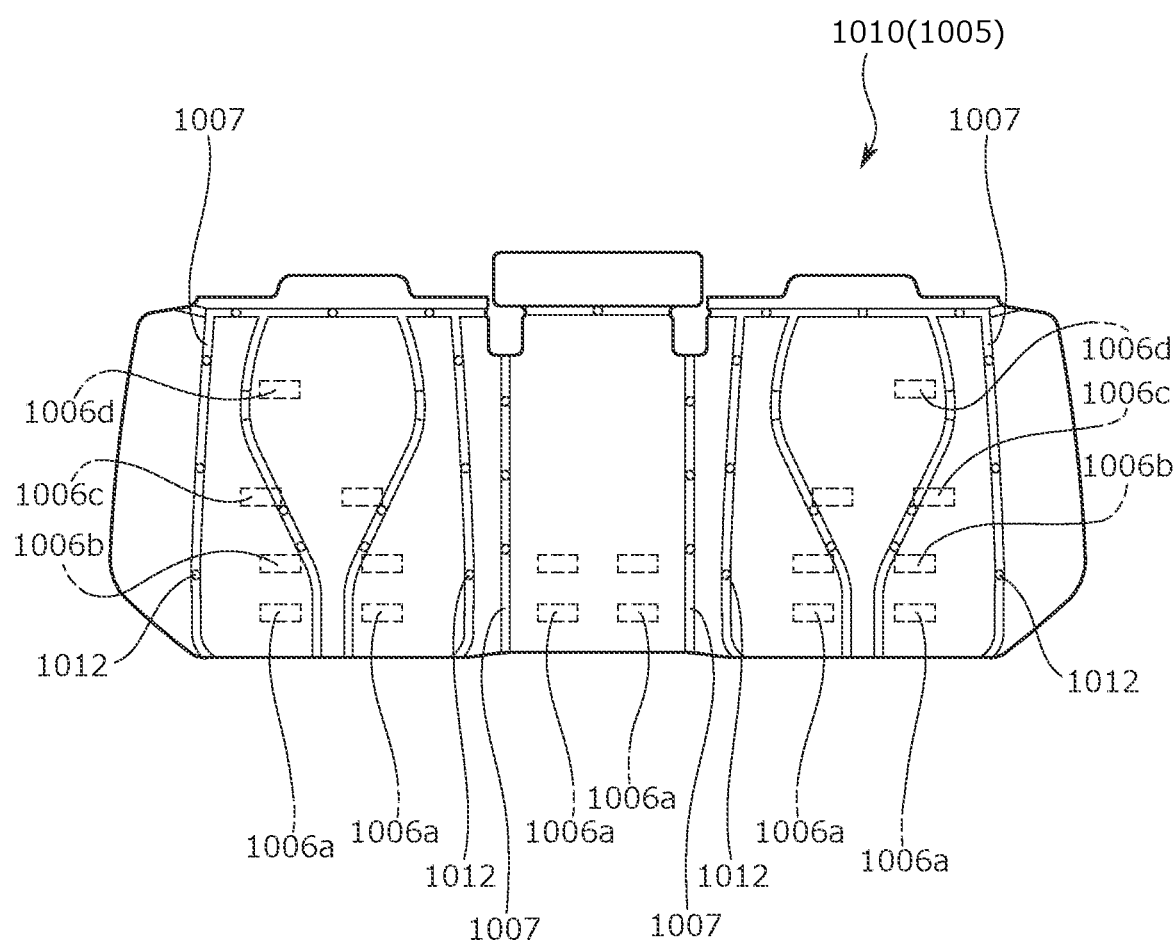
FIG. 46 is a top view illustrating a first pad member.

The first pad member 1010 is, for example, a cushioning member configured from expanded resin such as urethane foam. As illustrated in FIGS. 45 and 46, a bulging portion 1011, where the bottom surface portion of the first pad member 1010 bulges downward, is a part supporting an occupant's buttocks. It should be noted that in a case where the first pad member 1010 is disposed on the second pad member 1020, the bottom surface portion of the bulging portion 1011 fits into an opening portion 1021 (example of hole portion) of the second pad member 1020.

In addition, in the vehicle seat 1001, the first pad member 1010 disposed on the side of the cushion pad 1005 that is close to an occupant is configured by urethane foam, and thus the seating comfort of the seat can be improved.

In addition, as illustrated in FIG. 46, a pull-in hole 1012 is formed at a part of the groove portion that is formed in the first pad member 1010, and the skin end portion of the skin 1030 is drawn into the back surface side of the first pad member 1010 through the pull-in hole 1012.

<Second Pad Member>

Next, the configuration of the second pad member 1020 of the cushion pad 1005 will be described.

The second pad member 1020 is, for example, a support member configured from expanded resin such as expanded polypropylene (EPP) and supporting the first pad member 1010 from below. It should be noted that the second pad member 1020 may be configured by a foam-molded body or a three-dimensional mesh structure higher in compressive strength than the first pad member 1010 as well as EPP. For example, thermoplastic resins such as polystyrene-based resins, polyolefin-based resins, and composite resins thereof may be used for the foam-molded body.

Figure 47:
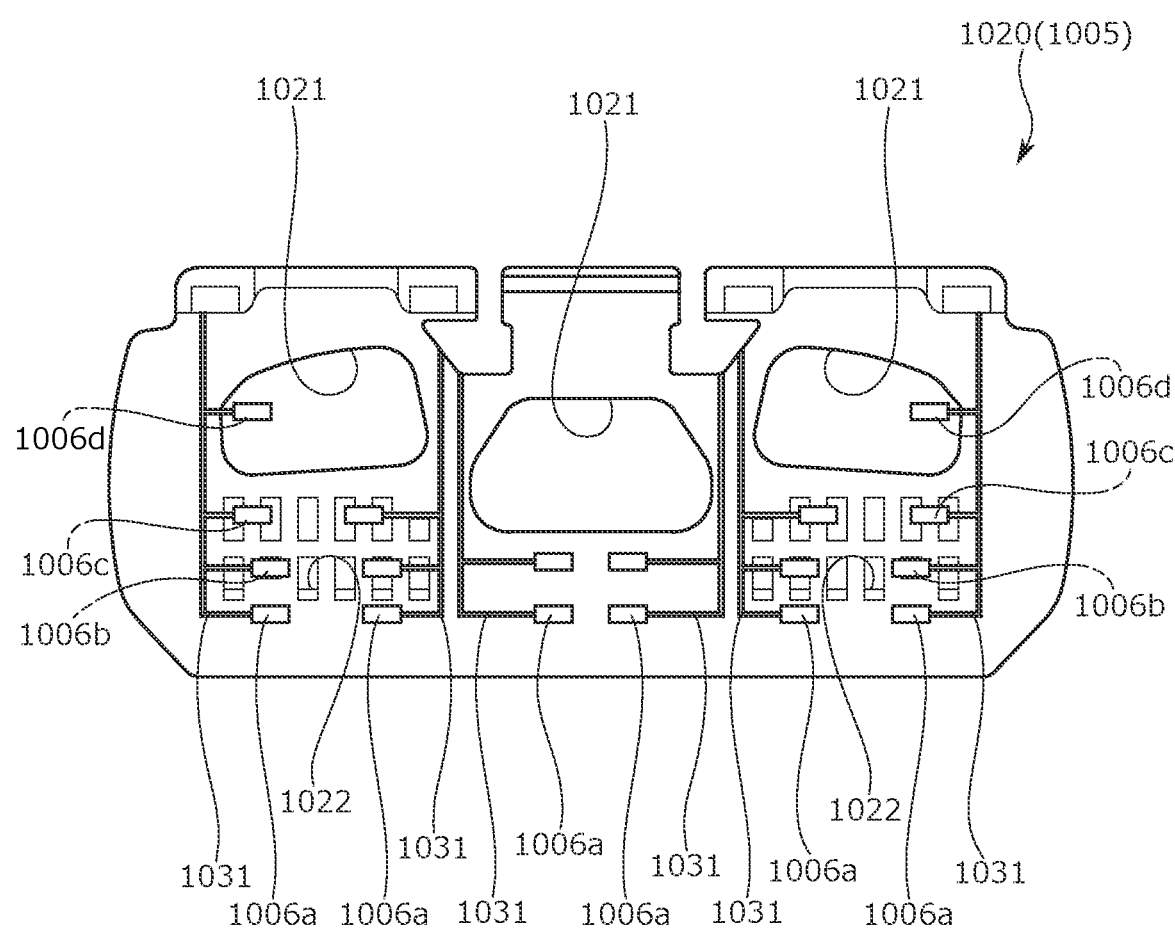
FIG. 47 is a top view illustrating a second pad member.

As illustrated in FIGS. 45 and 47, the upper surface of the second pad member 1020 is formed with the opening portion 1021 (hole portion) at the position that faces the seating surface portion where an occupant sits.

Further, as illustrated in FIGS. 45 and 47, recesses 1022 recessed downward are formed in front of the right and left opening portions 1021. The plurality of recesses 1022 are formed side by side in the width direction and the front to back direction of the seat. By the second pad member 1020 being provided with the plurality of recesses 1022, a space can be formed between the recesses 1022 and the weight of the second pad member 1020 can be reduced as a result.

<Biosensor>

As illustrated in FIGS. 43 to 47, the plurality of biosensors 1006a to 1006d (hereinafter, referred to as a biosensor 1006 unless particularly distinguished) are provided between the skin 1030 and the first pad member 1010. The biosensor 1006 is a sensor that acquires a measured value for identifying a motion of a seated occupant seated on the vehicle seat 1001. Specifically, the biosensor 1006 is a pressure sensor that acquires a pressure value from a seated occupant seated on the seat cushion 1003. The biosensor 1006 is connected to an ECU (not illustrated). The ECU acquires a pressure value from each biosensor 1006. It should be noted that although a pressure sensor is used as the biosensor 1006, the biosensor 1006 may be a capacitance sensor. In addition, the biosensor 1006 may be a temperature sensor that measures the seated occupant's body temperature.

The biosensor 1006 is provided at each seat configuring the vehicle seat 1001 (left seat 1001a, middle seat 1001b, and right seat 1001c).

The part of the first pad member 1010 that is supported by the second pad member 1020 sinks downward by a small amount. On the other hand, the part of the first pad member 1010 that is placed on the recess 1022 or the opening portion 1021 of the second pad member 1020 is not supported in a case where an occupant is seated and pressure is applied, and thus the amount of sinking thereof is larger than that of the supported part.

Therefore, disposing the biosensor 1006 at the unsupported part may result in an error in acquired pressure value due to the large amount of sinking. Therefore, the biosensor 1006 is disposed in view of the shape of the second pad member 1020 as will be described below such that the pressure value acquired by the biosensor 1006 is error-free.

As described above, the cushion pad 1005 of the seat cushion 1003 is configured by the first pad member 1010 and the second pad member 1020 made of EPP, disposed in an overlapping manner below the first pad member 1010, and harder than the first pad member 1010.

The second pad member 1020 supports the first pad member 1010 with a support portion 1023 directly abutting against the lower surface of the first pad member 1010.

Further, as illustrated in FIG. 45, the biosensors 1006a to 1006c of the present embodiment at least partially overlap the support portion 1023 of the second pad member 1020 in the up to down direction and are disposed on the first pad member 1010. Since the biosensors 1006a to 1006c partially overlap at least the support portion 1023 in the up to down direction, the amount of deflection of the first pad member 1010 is small and firm support is performed. Therefore, the effect on the acquired pressure value is suppressed and the occurrence of measurement errors is also suppressed.

More specifically, as in the biosensor 1006a, the biosensor may be disposed on the first pad member 1010 such that the entire surface thereof overlaps the support portion 1023 in the up to down direction. Biological information can be measured more stably by supporting the entire surface.

In addition, as in the second pad member 1020 illustrated in FIGS. 45 and 47, an abutting surface 1024 of the support portion 1023 abutting against the first pad member 1010 is divided into a plurality of surfaces by the opening portion 1021 or the recess 1022.

Therefore, the biosensors 1006b and 1006c are disposed so as to partially overlap the support portion 1023 without the entire surfaces thereof being at positions overlapping the support portion 1023. For example, as in the biosensor 1006b, the biosensor may be disposed on the first pad member 1010 so as to span adjacent support portions. In addition, as in the biosensor 1006c, the biosensor may be disposed on the first pad member 1010 so as to span the recess 1022 sandwiching the support portion 1023.

In addition, as illustrated in FIG. 45, the second pad member 1020 is provided with an inclined portion 1026, which is inclined with respect to the seat front to back direction, at a part of the abutting surface 1024 abutting against the first pad member 1010. As in the biosensors 1006b and 1006c, the biosensor may overlap the inclined portion in the up to down direction and be disposed on the first pad member 1010.

In addition, as illustrated in FIG. 3, the second pad member 1020 is provided with a curved portion 1025, which curves upward, at a part of the abutting surface abutting against the first pad member 1010. As in the biosensor 1006a, the biosensor may overlap the curved portion 1025 in the up to down direction and be disposed on the first pad member 1010.

Stable measurement is possible and the range in which the biosensor 1006 can be disposed widens even with the biosensors 1006a to 1006c disposed above the inclined portion 1026 and/or the curved portion 1025.

In addition, a harness 1031 connected to an electronic control unit (ECU) in order to transmit data is connected to each biosensor 1006. As illustrated in FIG. 47, the harness 1031 overlaps the support portion 1023 of the second pad member 1020 in the up to down direction and is disposed on the first pad member 1010. By the harness 1031 being disposed to overlap the support portion 1023, deflection of the harness 1031 or the like is prevented.

It should be noted that in a case where the seat cushion 1003 is provided with the plurality of biosensors 1006 with the main biosensor 1006 supported by the support portion 1023, some of the sensors may be disposed such that the entire surfaces thereof do not overlap the support portion 1023 in the up to down direction. For example, as in the biosensor 1006d (separate sensor) illustrated in FIG. 47, the biosensor may be disposed on the first pad member 1010 overlapping the opening portion 1021. In view of the position where the biosensor 1006 is disposed, the second pad member 1020 may not be formed with the opening portion 1021, the recess 1022, or the like. Therefore, in a case where the plurality of biosensors 1006 are provided, biological information can be measured even with a part of the biosensor 1006 (biosensor 1006d) not overlapping the support portion 1023.

The conveyance seat according to the tenth embodiment has been described above with reference to the drawings.

Although a seat cushion where a biosensor is disposed has been described as an example in the embodiment described above, it is an example and the configuration according to the tenth embodiment may be applied to a seat back.

Eleventh Embodiment

Hereinafter, an eleventh embodiment of the present invention will be described with reference to the drawings. The eleventh embodiment relates to a conveyance seat, a sensor-equipped conveyance seat in particular.

Known in the related art is a vehicle seat that is installed in a conveyance such as an automobile and equipped with a pressure sensor or the like to estimate a seated occupant's state (see JP 2019-151251 A).

Meanwhile, a known conveyance seat that is a vehicle seat can be switched between seated, tip-up, and storage states and arranged. More specifically, in a known conveyance seat (so-called tip-up seat), the seat cushion is stored by flipping (tipping) up the seat cushion and aligning the backrest surface of the seat back with the seating surface of the seat cushion. In addition, in another known conveyance seat (so-called dive-down seat), the seat back is laid down and falls (dives) down on a vehicle body floor together with the seat cushion and the backrest surface of the seat back and the seating surface of the seat cushion are stored in a state of being put together (see JP 2020-11588 A).

Nowadays, attempts have been made to mount pressure sensors or the like even at conveyance seats that can be arranged in a tip-down or dive-down state. However, when pressure sensors or the like are disposed at an arrangeable vehicle seat with the seat back and the seat cushion arranged, the respectively disposed pressure sensors may collide with each other to cause failure.

The present embodiment has been made in view of the above problems, and an object thereof is to provide a conveyance seat in which failure attributable to sensors provided at the seat back and the seat cushion colliding with each other when the seat is arranged is suppressed.

The above problems can be solved by means of the conveyance seat of the present embodiment including a seat back on which an occupant leans, a seat cushion on which the occupant sits, a first sensor provided on a backrest surface of the seat back, and a second sensor provided on a seating surface of the seat cushion, in which the seat back and the seat cushion are arrangeable such that the seating surface and the backrest surface face each other, and the first sensor and the second sensor in a state where the seat back and the seat cushion are arranged are disposed at the seat back and the seat cushion in a positional relationship in which at least a main part of the first sensor and a main part of the second sensor do not face each other.

According to the conveyance seat of the present embodiment, even with the seat arranged, the main part of the first sensor (for example, base including pressure-sensitive element) and the main part of the second sensor do not face each other, and thus the sensors do not directly collide with each other and failure is suppressed.

In the conveyance seat described above, it is preferable that the seat back and the seat cushion are connected at respective end portions and, with the seat back and the seat cushion arranged, the first sensor and the second sensor are disposed away from each other in the direction in which the seat back and the seat cushion extend from the connected end portions.

By the first sensor and the second sensor being disposed away from each other in the direction in which the seat back and the seat cushion extend, the sensors do not collide with each other and failure is suppressed.

In the conveyance seat described above, it is preferable that with the seat back and the seat cushion arranged, the first sensor and the second sensor are disposed away from each other in the seat width direction.

By the first sensor and the second sensor being disposed away from each other in the seat width direction, the sensors do not collide with each other and failure is suppressed.

In the conveyance seat described above, it is preferable that with the seat cushion and the seat back arranged, the first sensor and the second sensor are disposed at the seat cushion and the seat back in a non-coplanar positional relationship.

The first sensor and the second sensor are not positioned on the same plane, and thus the sensors do not collide with each other and failure is suppressed.

In the conveyance seat described above, it is preferable that the seat cushion has a first recess at the position where the occupant sits, the seat back has a second recess at the position where the occupant leans, the first sensor is disposed at the first recess, and the second sensor is disposed at the second recess.

By the first sensor and the second sensor being disposed at the recesses formed in the seat, the sensors are separated from each other even in the arranged state, and thus the sensors do not collide with each other and failure is suppressed.

It is preferable that the conveyance seat described above has a first harness disposed at the seat cushion and connected to the first sensor and a second harness disposed at the seat back and connected to the second sensor and, with the seat cushion and the seat back arranged, the first harness and the second harness are disposed in a positional relationship in which the first harness and the second harness are separated from the first sensor and the second sensor.

By the first harness and the second harness being disposed to be separated from the first sensor and the second sensor, the first harness and the second harness do not collide with the first sensor and the second sensor in the arranged state and failure is suppressed.

In the conveyance seat described above, it is preferable that with the seat cushion and the seat back arranged, the first harness and the second harness are disposed in a positional relationship in which the first harness and the second harness do not face each other.

By the first harness and the second harness being disposed in the positional relationship in which the first harness and the second harness do not face each other, the first harness and the second harness do not collide with each other even in the arranged state and failure is suppressed.

In the conveyance seat described above, it is preferable that with the seat cushion and the seat back arranged, the first sensor and the second sensor are disposed in a positional relationship in which the entire surface of the first sensor and the entire surface of the second sensor do not face each other.

By the first sensor and the second sensor being disposed in the positional relationship in which the entire surface of the first sensor and the entire surface of the second sensor do not face each other, the first harness and the second harness do not collide with each other even in the arranged state and failure is suppressed.

According to the conveyance seat of the present embodiment, even with the seat arranged, the main part of the first sensor and the main part of the second sensor do not face each other, and thus the sensors do not directly collide with each other and failure is suppressed.

In addition, by the first sensor and the second sensor being disposed away from each other in the direction in which the seat cushion and the seat back extend, the sensors do not collide with each other and failure is suppressed.

In addition, by the first sensor and the second sensor being disposed away from each other in the seat width direction, the sensors do not collide with each other and failure is suppressed.

In addition, the first sensor and the second sensor are not positioned on the same plane, and thus the sensors do not collide with each other and failure is suppressed.

In addition, by the first sensor and the second sensor being disposed at the recesses formed in the seat, the sensors are separated from each other even in the arranged state, and thus the sensors do not collide with each other and failure is suppressed.

In addition, by the first harness and the second harness being disposed to be separated from the first sensor and the second sensor, the first harness and the second harness do not collide with the first sensor and the second sensor in the arranged state and failure is suppressed.

In addition, by the first harness and the second harness being disposed in the positional relationship in which the first harness and the second harness do not face each other, the first harness and the second harness do not collide with each other even in the arranged state and failure is suppressed.

In addition, with the seat arranged, the first sensor and the second sensor are disposed in the positional relationship in which the entire surface of the first sensor and the entire surface of the second sensor do not face each other, and thus the first harness and the second harness do not collide with each other even in the arranged state and failure is suppressed.

Hereinafter, the configuration of a conveyance seat according to an eleventh embodiment (present embodiment) of the present invention will be described with reference to the drawings. However, the embodiment described below is an example for easy understanding of the present invention and does not limit the present invention. In other words, the present invention can be modified and improved without departing from the spirit thereof, and it is a matter of course that the present invention includes equivalents thereof.

It should be noted that in the following description, a vehicle seat will be taken as an example of the conveyance seat and configuration examples thereof will be described. However, the present invention is not limited to the vehicle seat mounted in a wheeled ground conveyance such as automobiles and railway vehicles and may be a seat mounted in non-ground conveyances such as aircraft and ships.

In addition, in the following description, "front to back direction" is the front to back direction of the vehicle seat and coincides with the direction of travel of the vehicle that travels. In addition, "seat width direction" is the width direction of the vehicle seat and coincides with the right to left direction seen from an occupant seated in the vehicle seat. In addition, "up to down direction" is the up to down direction of the vehicle seat, which coincides with the vertical direction when the vehicle travels on a horizontal surface.

In addition, in the following description, in a case where various directions are described with "seat" as in "seat width direction" and "seat height direction", the directions are indicated with respect to the vehicle seat. In the case of descriptions with "vehicle" such as "vehicle inner side" and "vehicle outer side", the directions are indicated with respect to the vehicle.

In addition, "outer side of the vehicle" in the seat width direction means the side that is closer to the outside of the body of the vehicle (to make it easier to understand, side close to the nearest door), and "inner side of the vehicle" means the side that is closer to the inside of the body of the vehicle (to make it easier to understand, side away from the nearest door).

In addition, unless otherwise specified, "pivoting" in the following description means pivoting about an axis along the seat width direction.

It should be noted that unless otherwise specified, the shape, position, posture, and so on of each portion of the seat described below are on the assumption that the vehicle seat is in a seated state, which will be described later.

<Basic Configuration of Vehicle Seat>

Figure 48:
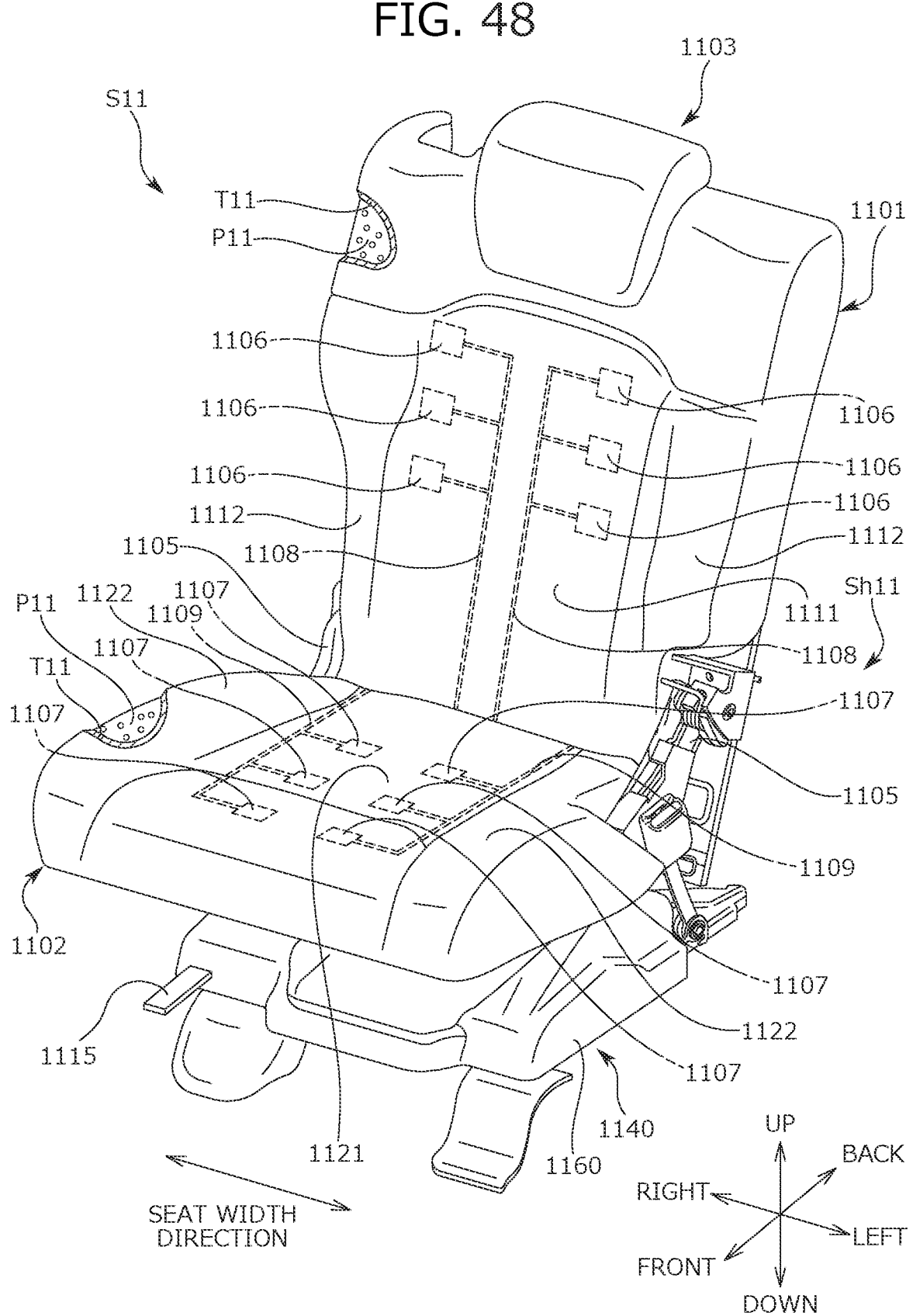
FIG. 48 is a perspective view illustrating a vehicle seat according to one embodiment of the present invention.

A basic configuration of the vehicle seat according to the present embodiment (hereinafter, vehicle seat S11) will be described with reference to FIG. 48. FIG. 48 is a perspective view of the vehicle seat S11.

As illustrated in FIG. 48, the vehicle seat S11 is a seat that is placed on a vehicle body floor and on which a vehicle occupant sits. In the present embodiment, the vehicle seat S11 is used as a rear seat corresponding to a rear seat of a vehicle. However, the vehicle seat S11 is not limited thereto. The vehicle seat S11 can also be used as a second-row middle seat or a third-row rear seat in a vehicle that has three rows of seats in the front to back direction.

As illustrated in FIG. 48, the vehicle seat S11 has a seat main body Sh11 forming the main body part thereof. As illustrated in FIG. 48, the seat main body Sh11 includes a seat back 1101, a seat cushion 1102, and a headrest 1103. The seat back 1101 is attached in a state of being pivotable with respect to the vehicle body floor via a support base 1140.

In addition, the rear end portion of the seat cushion 1102 is connected to the lower end portion of the seat back 1101. It should be noted that a connecting member 1105 is interposed between the rear end portion of the seat cushion 1102 and the lower end portion of the seat back 1101 as illustrated in FIG. 1. The connecting member 1105 is attached in a state of being pivotable with respect to the seat back 1101. As a result, the seat cushion 1102 is capable of pivoting with respect to the seat back 1101 together with the connecting member 5.

A slide rail mechanism 1104, which will be described later, is installed in the lower portion of the seat main body Sh11. By means of the slide rail mechanism 1104, the seat main body Sh11 is attached to the vehicle body floor in a state of being slidable in the front to back direction.

In addition, the seat main body Sh11 can be stored in a state of being folded on a storage floor F11 formed in front thereof. The storage floor F is a recessed space formed by a part of the vehicle body floor (specifically, the part of the vehicle body floor that is positioned in front of the seat main body Sh11 when the seat main body Sh11 is in a seated state) being recessed downward.

<Regarding Change in State of Seat Main Body>

Figure 49:
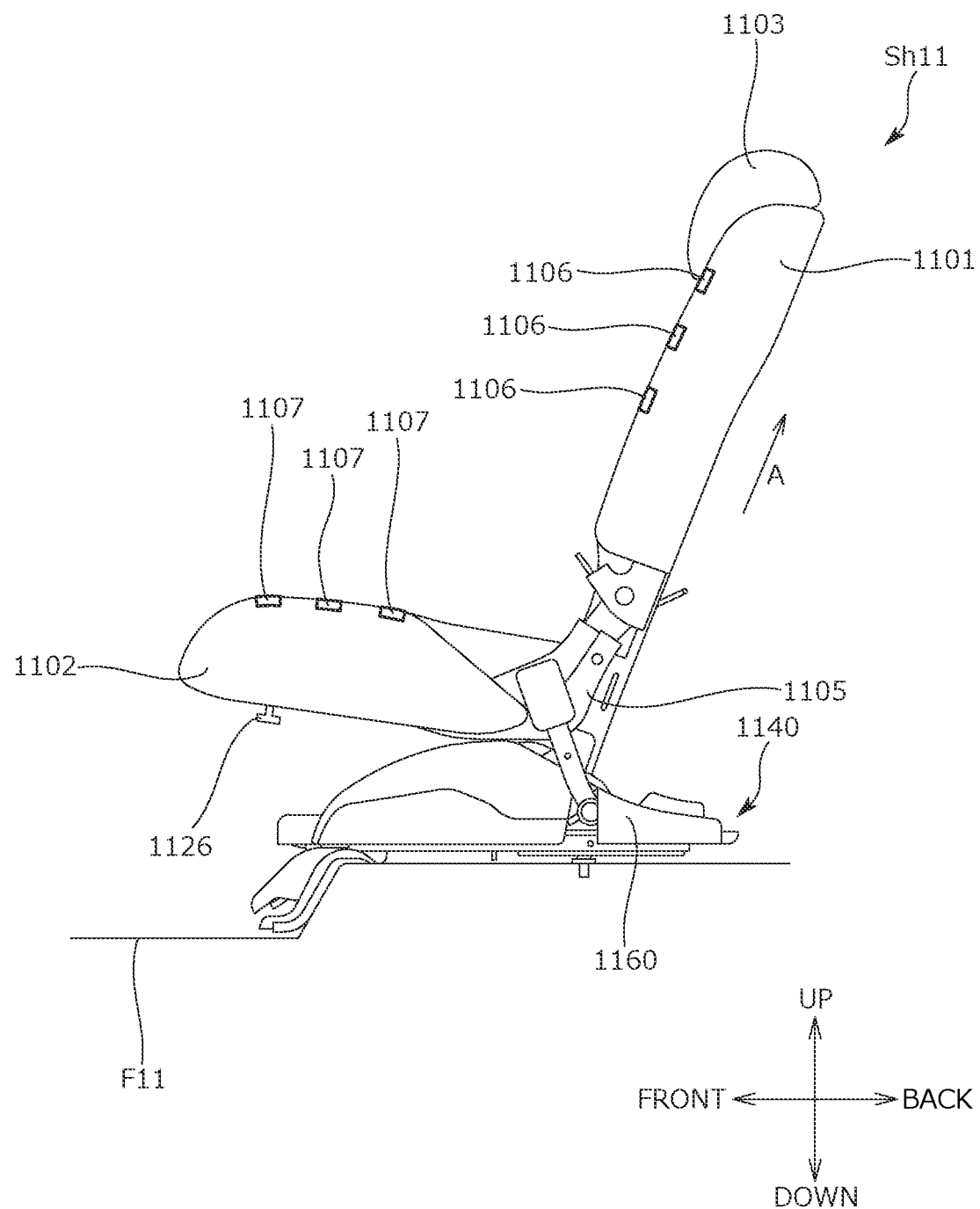
FIG. 49 is a side view of the vehicle seat in a seated state and is a diagram illustrating the positional relationship of biosensors.
Figure 50:
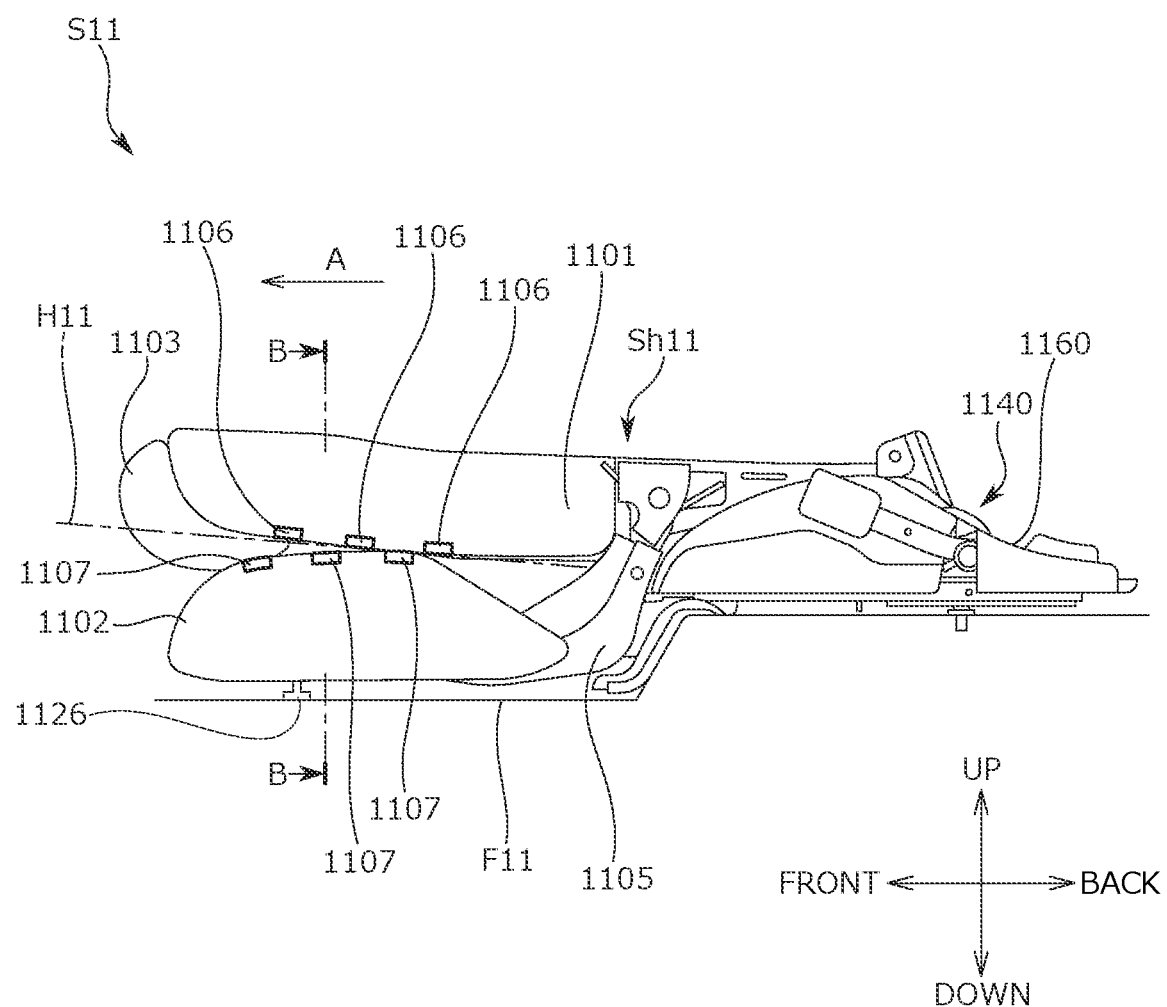
FIG. 50 is a side view of the vehicle seat at a time when the state of the seat is a storage (dive-down) state and is a diagram illustrating the positional relationship of the biosensors.
Figure 51:
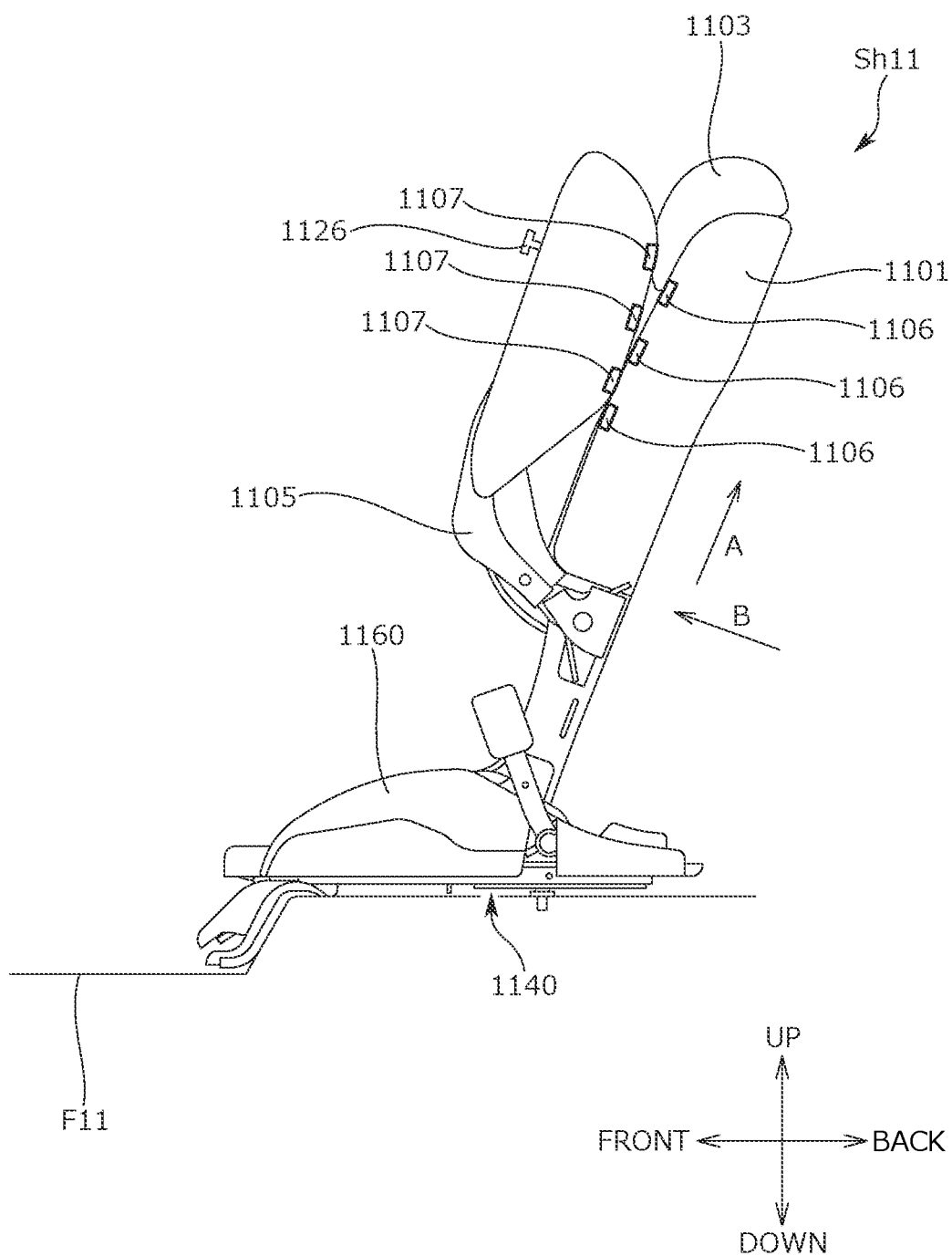
FIG. 51 is a side view of the vehicle seat at a time when the seat state is a tip-up state and is a diagram illustrating the positional relationship of the biosensors.
Figure 52:
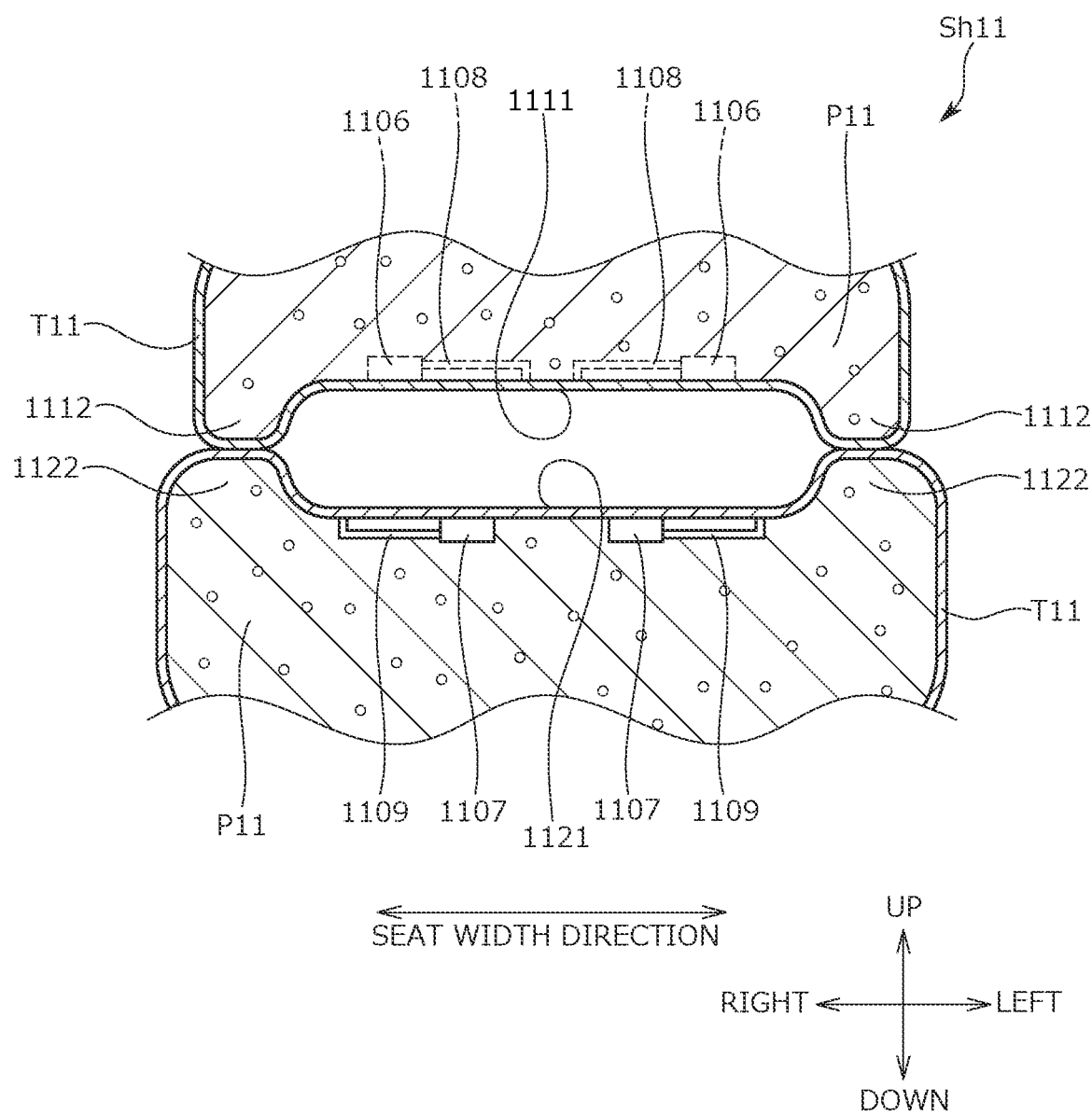
FIG. 52 is a cross-sectional view taken along line B-B of FIG. 50 and is a diagram illustrating the positional relationship of the biosensors.

In the present embodiment, the state of the seat main body Sh11 (hereinafter, seat state) can be changed. Changes in seat state will be described below with reference to FIGS. 49 to 51. FIGS. 49 to 51 are side views of the vehicle seat S11. The seat state is a seated state in FIG. 49. The seat state is a storage state (dive-down state) in FIG. 50. The seat state is a tip-up state in FIG. 51. FIG. 52 is a front view of the seat that is in the storage state.

<Seated State>

In the seated state illustrated in FIG. 44, the seat back 1101 stands with respect to the vehicle body floor and an occupant who is a seated occupant can be seated on the seat cushion 1102. When the seat state is a seatable state, as illustrated in FIGS. 48 and 49, the seat back 1101 is slightly tilted backward and the seat cushion 1102 is in a posture in which the seating surface thereof (surface on which the occupant's buttocks and thighs rest) faces upward.

<Storage State>

In the storage state illustrated in FIG. 50 (so-called dive-down state), the seat main body Sh11 that is folded is stored in the storage floor F. When the seat main body Sh11 shifts to the storage state, the seat back 1101 is laid down forward with respect to the vehicle body floor and the seat cushion 1102 pivots toward the seat back 1101. Then, with the seat in the storage state, as illustrated in FIG. 50, the rear surface (back surface) of the seat back 1101 is at the same height (level) as the surroundings of the storage floor F11 of the vehicle body floor and the seat cushion 1102 is disposed between the seat back 1101 and the vehicle body floor.

<Tip-Up State>

As illustrated in FIG. 51, in the tip-up state, the seat cushion 1102 is flipped up toward the seat back 1101 while the seat back 1101 stands with respect to the vehicle body floor.

The vehicle seat S11 is provided with a lock device for locking the seat in the tip-up state. In addition, the vehicle seat S11 includes a cushion lock device 1125 (see FIG. 53) locking the seat cushion 1102 when the seat state is the seated state and when the seat state is the tip-up state.

The movement of each portion of the seat main body Sh11 in switching the seat state will be roughly described. When the seat state is the seated state, the seat back 1101 is in a standing posture with respect to the vehicle body floor and the seat cushion 1102 is in a substantially horizontal posture with respect to the vehicle body floor. When the seat state is the seated state, the seat cushion 1102 is held in a seatable state by the cushion lock device 1125. Here, when a reclining operating lever (not illustrated) is operated, the reclining device is unlocked and, at the same time, the cushion lock device 1125 is also unlocked by a cable (not illustrated). As a result, the seat back 1101 can be pivoted and it is possible to allow the seat cushion 1102 to rotate relative to the seat back 1101. By pivoting the seat back 1101 within a predetermined range with the cushion lock device 1125 unlocked, the occupant can adjust the position of the seat back 1101 to a desired position.

In the case of seat state switching from the seated state (FIG. 49) to the storable state (FIG. 50), first, the cushion lock device 1125 is unlocked as described above. As a result, the seat back 1101 pivots with respect to the vehicle body floor so as to be laid down forward by a biasing force from a biasing member (not illustrated). In addition, the seat cushion 1102 pivots together with the connecting member 1105 toward the seat back 1101 while moving forward as the seat back 1101 is folded forward. At this time, the lower surface of the connecting member 1105 of the seat main body Sh11 comes into sliding contact with a predetermined point of a base cover 11060 disposed at a position below the seat main body Sh11. As a result, the seat cushion 1102 smoothly moves forward and enters the storage floor F11 soon.

Then, the seat back 1101 is further folded forward, the seat back 1101 enters the storage floor F, and the seat cushion 1102 moves forward along the bottom surface of the storage floor F. Finally, the seat state becomes the storage state (FIG. 45) when the seat back 1101 is folded over the seat cushion 1102 in the storage floor F11.

In the case of seat state switching from the storage state (FIG. 50) to the tip-up state, an occupant manually raises the seat main body Sh11 that is stored on the storage floor F11. At this time, the seat cushion 1102 is in a folded posture with respect to the seat back 1101 (that is, posture in which it is flipped up with respect to the seat back 1101). Therefore, by raising the seat main body Sh11 until the seat back 1101 reaches the standing position (that is, position of the seat back 1101 at a time when the seat state is the seated state), the seat state is switched to the tip-up state (FIG. 51). It should be noted that with the seat state switched to the tip-up state, the seat back 1101 is locked in a standing posture with respect to the vehicle body floor.

In the case of seat state switching from the tip-up state to the seated state, the occupant performs an operation for unlocking the seat cushion 1102. In the present embodiment, the seat cushion 1102 is unlocked by operating a damper 1126 provided on the back surface of the seat cushion 1102. When the seat cushion 1102 is unlocked, the seat cushion 1102 is pivoted together with the connecting member 1105 away from the seat back 1101 by a biasing force from a biasing member (not illustrated). Then, the seat state is switched to the seatable position when the seat cushion 1102 reaches the seatable position (that is, position of the seat cushion 1102 at a time when the seat state is the seated state).

<Configuration of Each Portion of Seat>

Figure 53:
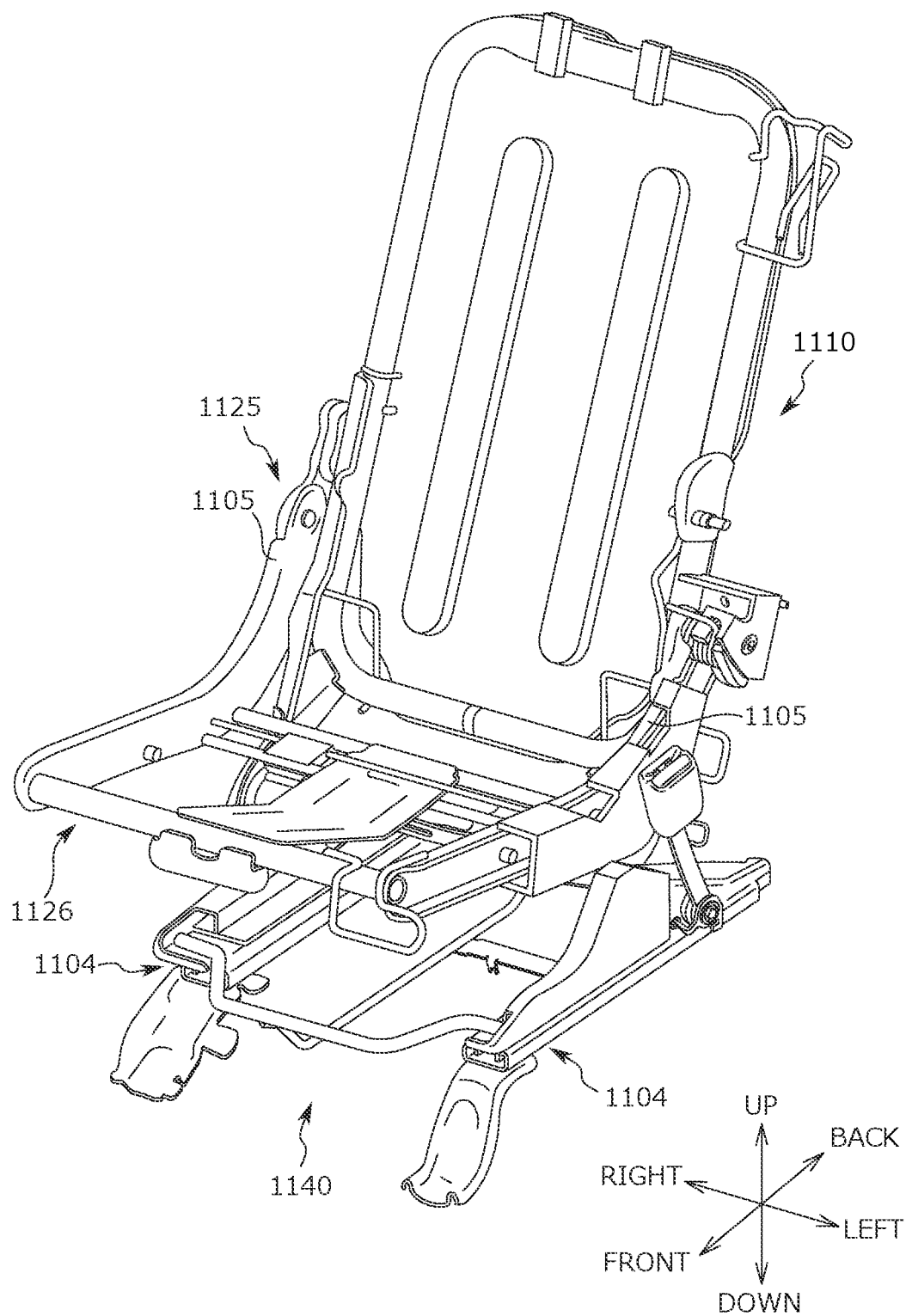
FIG. 53 is a perspective view illustrating a vehicle seat frame.

Hereinafter, the configuration of each portion of the vehicle seat S11 will be described with reference to FIG. 53 together with FIGS. 48 to 52 already described. FIG. 53 is a perspective view of a seat frame forming the skeleton of the vehicle seat S11.

The vehicle seat S11 includes the seat main body Sh11 as illustrated in the drawings including FIG. 48. The seat main body Sh11 includes the seat back 1101 and the seat cushion 1102. The seat back 1101 and the seat cushion 1102 respectively include the frames that are illustrated in FIG. 53 (specifically, seat back frame 1110 and seat cushion frame 1120).

In addition, the seat back 1101 and the seat cushion 1102 are connected by the connecting member 1105. The connecting member 1105 is a substantially L-shaped member in a side view and extends in the seat front to back direction. It should be noted that the connecting member 1105 also functions as a side frame of the seat cushion 1102. The connecting member 1105 is configured by processing a metal plate and connects the seat back frame 1110 and the seat cushion frame 1120 at the end portion of the seat main body Sh11 in the seat width direction. In addition, the rear end portion of the connecting member 1105 is attached to the seat back frame 1110 in a pivotable state. In other words, the seat cushion 1102 pivots together with the connecting member 1105 with respect to the seat back 1101 by the rear end of the connecting member 1105 pivoting with respect to the seat back frame 1110.

In addition, the cushion lock device 1125 as a lock device is attached to the rear end portion of the connecting member 1105 as described above. The cushion lock device 1125 is disposed at the position that is sandwiched between the connecting member 1105 and the side end of the seat back frame 1110 in the seat width direction. When the seat state is the seated state, the cushion lock device 1125 locks the seat cushion 1102 at the position at that point in time. In addition, when the seat state is the tip-up state, the cushion lock device 1125 locks the seat cushion 1102 at the position at that point in time. As will be described in detail below, the cushion lock device 1125 is capable of switching the state between lock and unlock states.

In addition, the vehicle seat S11 has the slide rail mechanism 1104 illustrated in FIG. 53 as peripheral equipment of the seat main body Sh11. The slide rail mechanism 1104 is equipment for sliding the seat main body Sh11 along the front to back direction and has a known structure (general slide rail mechanism structure). In other words, the slide rail mechanism 1104 includes a pair of lower rails fixed on the vehicle body floor and a pair of upper rails slidable with respect to the lower rails. The seat main body Sh11 is attached to the upper rails and moves forward and backward as the upper rails slide.

It should be noted that the upper rail is normally locked in a non-slidable state. When an occupant performs a predetermined operation, the upper rail is unlocked and becomes slidable. More specifically, in the present embodiment, an operating strap 1115 illustrated in FIG. 48 is provided as an operating member operated in order to unlock the upper rail. The operating strap 1115 is an endless belt-shaped member. As illustrated in FIG. 48, the operating strap 1115 is positioned below the seat cushion 1102 when the seat state is the seated state. In addition, in the present embodiment, the operating strap 1115 is provided at the end portion of the vehicle seat S11 that is one of the two end portions of the vehicle seat S11 in the seat width direction and is on the outer side of the vehicle. As a result, an upper rail 1104b can be unlocked by operating the operating strap 1115 from the outer side of the vehicle with the door open.

The operating strap 1115 is connected to a slide lock mechanism via a cable (not illustrated). General equipment for locking the upper rail can be used as the slide lock mechanism, and thus description and illustration thereof will be omitted. Further, when the operating strap 1115 is pulled forward, the cable is pulled and, as a result, the slide lock mechanism operates to unlock the upper rail.

<Sensor Disposition>

The seat back 1101 includes a pad P11 and a skin T11 as illustrated in FIG. 48. Further, as illustrated in FIGS. 48 to 52, a plurality of back side sensors 1106 (first sensors) are disposed between the pad P11 and the skin T11.

In addition, the seat cushion 1102 also includes the pad P11 and the skin T11. As illustrated in FIGS. 48 to 52, a plurality of cushion side sensors 1107 (second sensors) are disposed between the pad P11 and the skin T11.

It should be noted that the back side sensor 1106 and the cushion side sensor 1107 are hidden by the skin T11 and cannot be seen from the outside. However, in FIGS. 49 to 51, the back side sensor 1106 and the cushion side sensor 1107 are indicated by solid lines such that the positional relationship thereof is clarified.

In addition, the pad P11 is configured from expanded resin such as urethane foam, and the skin T11 is configured by, for example, fabric, film, cloth, leather, sheet, or the like.

The back side sensor 1106 and the cushion side sensor 1107 are biosensors that acquire measured values for identifying a motion of a seated occupant seated on the vehicle seat S11. More specifically, each of the back side sensor 1106 and the cushion side sensor 1107 is a pressure sensor that acquires a pressure value at a time when a seated occupant is seated. For example, the result measured by the pressure-sensitive element of the pressure sensor is converted into an electric signal, output, and transmitted to an ECU (not illustrated) via a connected harness. In the middle of each of the back side sensor 1106 and the cushion side sensor 1107, a base including the pressure-sensitive element is disposed as a main part.

It should be noted that although a pressure sensor is used as the biosensor, the biosensor may be a capacitance sensor. In addition, the biosensor may be a temperature sensor that measures the seated occupant's body temperature.

The plurality of back side sensors 1106 are provided at the seat back 1101 in bilateral symmetry with respect to the right to left center. In addition, the plurality of cushion side sensors 1107 are provided in bilateral symmetry with respect to the right to left center of the seat cushion 1102.

In the present embodiment, the back side sensor 1106 and the cushion side sensor 1107 are disposed in view of the position in a case where the vehicle seat S11 is arranged in the storage state or the tip-up state. The disposition will be described below.

As described above, in the vehicle seat S11, the arrangement of the seat back 1101 and the seat cushion 1102 is changeable. In the storage state and the tip-up state, the backrest surface of the seat back 1101 and the seating surface of the seat cushion 1102 are disposed so as to face each other.

In this state, as illustrated in FIGS. 50 to 52, the back side sensor 1106 and the cushion side sensor 1107 are disposed so as not to face each other.

More specifically, the back side sensor 1106 and the cushion side sensor 1107 are disposed away from each other in each direction of extension from the connecting part between the seat back 1101 and the seat cushion 1102 (hereinafter, extension direction).

It should be noted that the extension direction in the seated state illustrated in FIG. 49 is the diagonally upward direction (arrow A direction) as to the seat back 1101 and the forward direction as to the seat cushion 1102. In the storage state of FIG. 50, the extension direction is the forward direction. In the tip-up state of FIG. 51, the extension direction is the diagonally upward direction (arrow A direction).

As illustrated in the drawings, the back side sensor 1106 and the cushion side sensor 1107 are disposed so as not to face each other. As a result, the back side sensor 1106 and the cushion side sensor 1107 do not overlap in the direction (arrow B direction in FIG. 51) perpendicular to the extension direction (arrow A direction). Therefore, when the vehicle seat S11 is, for example, shifted from the seated state to the tip-up state, direct collision between the back side sensor 1106 and the cushion side sensor 1107 is suppressed although the positions of the back side sensor 1106 and the cushion side sensor 1107 are close to each other, and the occurrence of failure attributable to the collision is suppressed.

In addition, as illustrated in FIG. 52, the back side sensor 1106 and the cushion side sensor 1107 may be disposed away from each other in the seat width direction (right to left direction) as well as the extension direction. By the back side sensor 1106 and the cushion side sensor 1107 being disposed away from each other in the seat width direction as well as the extension direction, the back side sensor 1106 and the cushion side sensor 1107 are disposed in a zigzag pattern. Therefore, the possibility of collision between the back side sensor 1106 and the cushion side sensor 1107 that are in the arranged state is further reduced.

In addition, the back side sensor 1106 and the cushion side sensor 1107 that are in the arranged state are disposed in a positional relationship in which the back side sensor 1106 and the cushion side sensor 1107 are not on the same plane (plane H illustrated in FIG. 50). By not being on the same plane, the back side sensor 1106 and the cushion side sensor 1107 are in a positional relationship in which the sensors are away from each other, and collision between the sensors is suppressed.

<Recess>

As can be seen from FIGS. 48 and 52, the seat back 1101 has a recess 1111 (first recess) formed at the part where an occupant leans. Although bank portions 1112 are provided on both side portions of the recess 1111 to suppress the seated occupant swinging in the right to left direction, disposing the back side sensor 1106 at the bank portion 1112 results in hitting a bank portion 1122 of the seat cushion 1102, and thus the bank portion 1122 may cause a push in the arranged state and failure may arise. Therefore, the back side sensor 1106 is disposed in the recess 1111 to suppress a push attributable to the seat cushion 1102.

Likewise, the seat cushion 1102 has a recess 1121 (second recess) formed at the part where an occupant sits, and the bank portions 1122 are provided on both side portions of the recess 1121. Disposing the cushion side sensor 1107 at the bank portion 1122 of the seat cushion 1102 results in hitting a bank portion 11012 of the seat back 1101 in the arranged state, and the bank portion 1112 may cause a push and failure may arise. Therefore, the cushion side sensor 1107 is disposed in the recess 1121 to suppress a push attributable to the bank portion 1112 of the seat back 1101.

<Harness>

As illustrated in FIGS. 48 and 52, a back side harness 1108 (first harness) and a cushion side harness 1109 (second harness) are connected to the back side sensor 1106 and the cushion side sensor 1107, respectively. The back side harness 1108 is disposed so as not to face the cushion side harness 1109 and the cushion side sensor 1107 disposed on the cushion side in the arranged state.

In addition, the cushion side harness 1109 is disposed so as not to face the back side harness 1108 and the cushion side sensor 1107 disposed on the back side in the arranged state. Failure such as disconnection can be suppressed by the harnesses or the harness and the sensor being disposed so as not to collide with each other.

It should be noted that in the present embodiment, each of the back side sensor 1106 and the cushion side sensor 1107 is disposed in a positional relationship in which the entire surface of the back side sensor 1106 and the entire surface of the cushion side sensor 1107 do not face each other.

However, depending on the layout, it may be difficult to dispose the back side sensor 1106 and the cushion side sensor 1107 in the positional relationship in which the entire surface of the back side sensor 1106 and the entire surface of the cushion side sensor 1107 do not face each other.

Therefore, the main parts of the pressure sensors such as the base parts required for measurement may be disposed in a positional relationship in which the main parts of the pressure sensors do not face each other, but the other parts maybe disposed so as to face each other. In other words, a part of the back side sensor 1106 and a part of the cushion side sensor 1107 that are non-main parts may be disposed to overlap in the direction perpendicular to the extension direction. By allowing the sensors to overlap in part, the width of the layout of the back side sensor 1106 and the cushion side sensor 1107 can be widened.

The vehicle seat according to the present embodiment has been described above with reference to the drawings. Although a seat that can be arranged in storage and tip-up states has been described as an example in the above embodiment, the seat is an example and the present invention may be applied to a seat that is tilted forward by a reclining seat back. In addition, the present invention may be applied to a fall-down seat with a foldable seat back and a seat that can only be tipped up.

REFERENCE SIGNS LIST

S1: vehicle seat
F1: frame
10 seat cushion frame
11: side frame
12: front connecting frame
13: rear connecting frame
14: submarine prevention member
15 reinforcement wire
16, 16A, 16B: pressure receiving member
17: front fixed portion
18: rear fixed portion
19: holding portion
20 seating sensor
   20*a* sensor main body portion
   20*b* cable portion
21: sensor support portion
22: reinforcement support portion
23: front reinforcement wire
24: through hole
S2, S2A to S2F: vehicle seat
FL2: floor
H2: hip point
201, 201A: seat cushion
202: cushion pad
203: seat back
210: urethane pad member
211: bead foam molding member
212: skin material
213: through hole
216: gap
217: groove portion
220: seating sensor
   220*a*: sensor main body portion
221: accommodating recess
222: bracket
223: positioning portion
224: upper bottom point
225: sensor support member
   225*a*: sensor holding portion
   225*b*: hooking portion
226: insert wire
S3, S3A, S3B: vehicle seat
FL3: floor
H2: hip point
W: protrusion
301, 301A, 301B, 301C: seat cushion
302: cushion pad
303: seat back
310: urethane pad member
311: bead foam molding member
312: skin material
313, 313*a*: EPP through hole (second through hole)
314: urethane through hole (first through hole)
316: gap
317: groove portion 320: seating sensor
    320a: sensor main body portion
    320b: cable portion
    320c: connector portion
    320d: sensor base portion
340: seat buckle
341: bolt
342: bracket
S4: vehicle seat
F4: frame
410: seat cushion frame
411: side frame
412: front connecting frame
413: rear connecting frame
414: submarine pipe
415: upper rail
416: towel bar
417: two-ply position
418: front foot plate
419: rear foot plate
S5: vehicle seat
FL5: floor
510, 510A: bracket
511: fixing member
511A: front bracket
511B: rear bracket
512: reinforcement plate
513: lightening hole
514: slit
517: reinforcement portion
520: fitting groove
521: plate escape step
522: escape groove
523: recess
S6: vehicle seat
601: seat cushion
603: seat back
605: reclining cover
610: operating lever
611: gripping margin
612: stopper
S7: vehicle seat
701: seat cushion
703: seat back
704: rail member
707: reclining device
710: reclining lever (lever member)
711: shoulder lever (lever member)
712: cable (transmission member)
713: cam
714: slide lock release member
715: slide lock member
S8, S8A: vehicle seat
HP8: hip point
H8: seated occupant
FL8: floor
801, 801A: seat cushion
802: seat back
803, 803A: seat pad
810: urethane pad
811, 811A: bead foam molding member
813: through hole
815: seating surface
816: air gap S9: vehicle seat
FL9: floor
BD: lateral bead
901, 901A, 901C, 901D: seat cushion
903: seat back
905: skin
910: urethane pad member
911, 911A, 911B, 911C, 911D: bead foam molding member
912: recess
913, 913C, 913D: first recess
914: second recess
915: side step portion
916: seat belt through hole
917: seat belt
920: seat belt reminder (seating sensor)
    920a: sensor main body portion
    920b: cable portion
921: groove
922: through hole
930: insert wire
931: skin locking portion
932: hook
935: first vehicle body fixing portion
936: second vehicle body fixing portion
940: insertion portion
941: reference surface
942: luggage compartment line
1001: vehicle seat
    1001a: left seat
    1001b: middle seat
    1001c: right seat
1002: seat back
1003: seat cushion
1004: headrest
1005: cushion pad
1006, 1006a to 1006c: biosensor
1010: first pad member
1011: bulging portion
1012: pull-in hole
1020: second pad member
1021: opening portion (hole portion)
1022: recess (hole portion)
1023: support portion
1024: abutting surface
1025: curved portion
1026: inclined portion
1030: skin
1031: harness
1101: seat back
1102: seat cushion
1103: headrest
1104: slide rail mechanism
1105: connecting member
1106: back side sensor (first sensor)
1107: cushion side sensor (second sensor)
1108: back side harness (first harness)
1109: cushion side harness (second harness)
1110: seat back frame
1111: recess
1112: bank portion
1115: operating strap
1120: seat cushion frame
1121: recess
1122: bank portion 1125: cushion lock device
1140: support base
1160: base cover
S11: vehicle seat
Sh11: seat main body
F11: storage floor
T11: skin
P11: pad

The invention claimed is:

1. A conveyance seat, comprising a seat cushion including a urethane pad member, a bead foam molding member harder than the urethane pad member, a skin material, and a seating sensor sensing a seated occupant's seating load, wherein
the urethane pad member is formed with a first through hole penetrating the urethane pad member in a height direction,
the bead foam molding member is formed with a second through hole penetrating the bead foam molding member in the height direction and at least a part of the second through hole is at a position overlapping the first through hole in a top view,
the seating sensor includes at least a sensor main body portion and a cable portion energizing the sensor main body portion or transmitting a signal of the sensor main body portion,
the cable portion is inserted through the first through hole and the second through hole,
the first through hole and the second through hole are tapered and increase in width downward from above, and
a lower end of the first through hole and an upper end of the second through hole are formed to be substantially equal in width to each other.

2. The conveyance seat according to claim 1, wherein
a lower surface portion of the urethane pad member and an upper surface portion of the bead foam molding member form a gap between the urethane pad member and the bead foam molding member, and
the first through hole and the second through hole are formed to communicate with the gap.

3. The conveyance seat according to claim 1, wherein
the second through hole is formed to be at least two in number, and
a through hole that is one of the second through holes and through which the cable portion is inserted is disposed behind a through hole that is one of the second through holes and through which the cable portion is not inserted.

4. The conveyance seat according to claim 1, wherein the second through hole has an opening portion formed on an upper surface of the bead foam molding member and another opening portion formed on a rear surface of the bead foam molding member.

5. The conveyance seat according to claim 1, wherein
on a floor where the conveyance seat is placeable, the conveyance seat is disposed in front of a protrusion formed on an upper surface of the floor, and
the second through hole is disposed above the protrusion.

6. The conveyance seat according to claim 1, wherein
on a floor where the conveyance seat is placeable, the conveyance seat is disposed in front of a protrusion formed on an upper surface of the floor,
the second through hole is disposed at a position overlapping the protrusion in a front view, and
an end portion of the cable portion is accommodated in the protrusion.

7. A conveyance seat, comprising a seat cushion including a urethane pad member, a bead foam molding member harder than the urethane pad member, a skin material, and a seating sensor sensing a seated occupant's seating load, wherein
the urethane pad member is formed with a first through hole penetrating the urethane pad member in a height direction,
the bead foam molding member is formed with a second through hole penetrating the bead foam molding member in the height direction and at least a part of the second through hole is at a position overlapping the first through hole in a top view,
the seating sensor includes at least a sensor main body portion and a cable portion energizing the sensor main body portion or transmitting a signal of the sensor main body portion,
the cable portion is inserted through the first through hole and the second through hole,
the second through hole is formed to be at least two in number, and
a through hole that is one of the second through holes and through which the cable portion is inserted is disposed behind a through hole that is one of the second through holes and through which the cable portion is not inserted.

8. A method of manufacturing a conveyance seat, comprising:
preparing a urethane pad member formed with a first through hole penetrating the urethane pad member in a height direction, a bead foam molding member formed with a second through hole penetrating the bead foam molding member in the height direction and harder than the urethane pad member, a skin material, and a seating sensor sensing a seated occupant's seating load which includes at least a sensor main body portion and a cable portion energizing the sensor main body portion or transmitting a signal of the sensor main body portion,
disposing the bead foam molding member on the urethane pad member so that at least a part of the second through hole is at a position overlapping the first through hole in a top view, and
inserting the cable portion through the first through hole and the second through hole,
wherein the first through hole and the second through hole are tapered and increase in width downward from above, and
a lower end of the first through hole and an upper end of the second through hole are formed to be substantially equal in width to each other.

* * * * *